US009990391B1

(12) United States Patent
Cole et al.

(10) Patent No.: US 9,990,391 B1
(45) Date of Patent: Jun. 5, 2018

(54) TRANSACTIONAL MESSAGES IN JOURNAL-BASED STORAGE SYSTEMS

(71) Applicant: Amazon Technologies, Inc., Seattle, WA (US)

(72) Inventors: Timothy Daniel Cole, Seattle, WA (US); John Michael Morkel, Seattle, WA (US); Christopher Richard Jacques De Kadt, Seattle, WA (US); Artem Danilov, Kirkland, WA (US); Allan Henry Vermeulen, Corvallis, OR (US); Tate Andrew Certain, Seattle, WA (US); Andrew Wayne Ross, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 466 days.

(21) Appl. No.: 14/833,001

(22) Filed: Aug. 21, 2015

(51) Int. Cl.
*G06F 7/00* (2006.01)
*G06F 17/00* (2006.01)
*G06F 17/30* (2006.01)

(52) U.S. Cl.
CPC .. *G06F 17/30371* (2013.01); *G06F 17/30383* (2013.01); *G06F 17/30578* (2013.01)

(58) Field of Classification Search
None
See application file for complete search history.

(56) References Cited

U.S. PATENT DOCUMENTS

| 5,335,343 | A | 8/1994 | Lampson et al. |
|---|---|---|---|
| 7,127,716 | B2 | 10/2006 | Jin et al. |
| 7,668,876 | B1 | 2/2010 | Kulkarni |
| 7,730,034 | B1 | 6/2010 | Deflaux |
| 7,792,693 | B2 | 9/2010 | Bultmeyer et al. |
| 7,908,311 | B2 | 3/2011 | O'Loughlin et al. |
| 7,949,662 | B2 | 5/2011 | Farber et al. |
| 8,019,849 | B1 | 9/2011 | Lopilato et al. |
| 8,055,711 | B2 | 11/2011 | Fachan et al. |
| 8,078,582 | B2 | 12/2011 | Wang et al. |
| 8,108,343 | B2 | 1/2012 | Wang et al. |
| 8,209,213 | B2 | 6/2012 | Raisanen |

(Continued)

OTHER PUBLICATIONS

International Search Report and Written Opinion, dated Dec. 7, 2015, Amazon Technologies, Inc., pp. 1-11.

(Continued)

*Primary Examiner* — James Trujillo
*Assistant Examiner* — John J Morris
(74) *Attorney, Agent, or Firm* — Robert C. Kowert; Meyertons, Hood, Kivlin, Kowert & Goetzel, P.C.

(57) ABSTRACT

A journal manager of a multi-data-store storage system receives a transaction which includes a message to be stored in the storage system's journal if the transaction request is accepted for commit. The journal manager performs a conflict detection operation, accepts the transaction request, and stores a corresponding committed transaction entry including the message in the journal. A write applier associated with a registered materialization node of the journal reads the committed transaction entry and applies a write indicated in the entry. A registered message subscriber of the journal reads the committed transaction entry asynchronously with respect to the write applier, and reads the contents of the message without applying the write.

20 Claims, 29 Drawing Sheets

(56) References Cited

U.S. PATENT DOCUMENTS

| | | | |
|---|---|---|---|
| 8,510,270 | B2 | 8/2013 | Pareek et al. |
| 8,548,945 | B2 | 10/2013 | Dwyer et al. |
| 8,650,155 | B2 | 2/2014 | Corbin et al. |
| 8,676,752 | B2 | 3/2014 | Kundu et al. |
| 2007/0162516 | A1 | 7/2007 | Thiel et al. |
| 2009/0077164 | A1 | 3/2009 | Phillips et al. |
| 2010/0057826 | A1 | 3/2010 | Chow et al. |
| 2011/0161391 | A1 | 6/2011 | Araujo et al. |
| 2011/0276977 | A1 | 11/2011 | van Velzen et al. |
| 2012/0079490 | A1 | 3/2012 | Bond et al. |
| 2012/0166407 | A1* | 6/2012 | Lee ................. G06F 9/466 707/703 |
| 2014/0250436 | A1* | 9/2014 | Tang ............... G06F 9/45533 718/1 |
| 2014/0304380 | A1 | 10/2014 | Waas et al. |
| 2014/0324785 | A1* | 10/2014 | Gupta ............ G06F 17/30368 707/689 |
| 2015/0058306 | A1* | 2/2015 | Earl ................ H04L 67/1097 707/703 |

OTHER PUBLICATIONS

U.S. Appl. No. 14/316,680, filed Jun. 26, 2014, Allan Henry Vermeulen.
U.S. Appl. No. 14/316,674, filed Jun. 26, 2014, Allan Henry Vermeulen et al.
U.S. Appl. No. 14/316,630, filed Jun. 26, 2014, Allan Henry Vermeulen.
U.S. Appl. No. 14/491,454, filed Jun. 26, 2014, Allan Henry Vermeulen et al.
U.S. Appl. No. 14/316,622, filed Jun. 26, 2015, Allan Henry Vermeulen et al.
U.S. Appl. No. 14/316,619, filed Jun. 26, 2015, Allan Henry Vermeulen.
U.S. Appl. No. 14/482,661, filed Sep. 10, 2014, Allan Henry Vermeulen.
U.S. Appl. No. 14/482,677, filed Sep. 10, 2014, Allan Henry Vermeulen et al.
U.S. Appl. No. 14/482,668, filed Sep. 10, 2014, Allan Henry Vermeulen et al.
U.S. Appl. No. 14/491,444, filed Sep. 19, 2014, Allan Henry Vermeulen et al.
U.S. Appl. No. 14/491,371, filed Sep. 19, 2014, Allan Henry Vermeulen et al.
U.S. Appl. No. 14/537,788, filed Nov. 10, 2014, Lei Ye et al.
U.S. Appl. No. 14/579,742, filed Dec. 12, 2014, Christopher Richard Jacques De Kadt et al.
U.S. Appl. No. 14/657,043, filed Mar. 13, 2015, Upendra Bhalchandra Shevade et al.
U.S. Appl. No. 14/753,475, filed Jun. 29, 2015, Allan Henry Vermeulen et al.
U.S. Appl. No. 14/753,484, filed Jun. 29, 2015, John Michael Morkel et al.
U.S. Appl. No. 14/753,495, filed Jun. 29, 2015, Timothy Daniel Cole et al.
U.S. Appl. No. 14/753,505, filed Jun. 29, 2015, Allan Henry Vermeulen et al.
U.S. Appl. No. 14/868,275, filed Sep. 28, 2015, Timothy Daniel Cole et al.
U.S. Appl. No. 14/868,271, filed Sep. 28, 2015, Timothy Daniel Cole et al.
U.S. Appl. No. 14/833,000, filed Aug. 21, 2015, Timothy Daniel Cole et al.
U.S. Appl. No. 14/833,005, filed Aug. 21, 2015, John Michael Morkel et al.
U.S. Appl. No. 14/833,003, filed Aug. 21, 2015, Timothy Daniel Cole et al.
U.S. Appl. No. 14/833,009, filed Aug. 21, 2015, Andrew Wayne Ross et al.
U.S. Appl. No. 14/833,008, filed Aug. 21, 2015, John Michael Morkel et al.
Sergio Almeida, et al., "ChainReaction: A Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.
Robbert Van Renesse, et al., "Chain Replication for Supporting High Throughput and Availability", 2004, pp. 91-104.
"Blackboard System", Wikipedia, Accessed Dec. 3, 2014, pp. 1-5.
Wikipedia, "Apache Wave", Downloaded May 8, 2015, pp. 1-9.
"Git-Rewriting History", http://gitscm.com/book/en/v2/Git-ToolsRewritingHistory, Downloaded May 8, 2015, pp. 1-10.
David Roundy, "Dares User Manual", http://darcs.net/maunual/bigpage.html, Downloaded May 7, 2015, pp. 1-87.
Wikipedia, "Operational Transformation", Downloaded May 8, 2015, pp. 1-9.
"Samza", http://samza.apached.org/, Downloaded Jun. 3, 2015, p. 1.
Wikipedia:"Sipldash", Downloaded May 31, 2015, pp. 1-3.
U.S. Appl. No. 14/868,267, filed Sep. 28, 2015, Timothy Daniel Cole et al.
Invitation to Pay Additional Fees for PCT/US2015/049470, dated Dec. 1, 2015, Amazon Technologies, Inc., pp. 1-10.
Ozgur Ulusoy, "Processing Real-Time Transactions in a Replicated Datebase System", Distributed and Parallel Datebases, vol. 2, No. 4, Sep. 10, 1993, pp. 405-436.
Philip A. Bernstein, et al., "Concurrency Control and Recovery in Database Systems", Retrieved from the Internet URL: https://courses.cs.washington.edu/courses/cse490h/11wi/CSE490H_files/CSE550BHG-Ch7.pdf, Jan. 1987, pp. 1-58.

* cited by examiner

TRANSACTIONAL MESSAGES IN JOURNAL-BASED STORAGE SYSTEMS

BACKGROUND

In recent years, more and more computing applications are being implemented in distributed environments. A given distributed application may, for example, utilize numerous physical and/or virtualized servers spread among several data centers of a provider network, and may serve customers in many different geographical locations. In many cases, particularly in cloud-based computing environments, a given application may involve performing reads and writes at several different data stores, such as various instances of relational databases, non-relational databases, and the like. Some commonly used data store architectures may support the traditional ACID (atomicity, consistency, isolation and durability) properties associated with the relational data model for operations within a given data store, but may not support such properties for groups of operations involving multiple data stores. Other data store architectures may not natively support the ACID property even within groups of operations directed to a single data store instance.

Developers of applications that would benefit from support for transactions that cross data store boundaries are sometimes forced to implement their own transaction management mechanisms. Such ad-hoc mechanisms are often hard to maintain, especially as the set of object types at the different data stores evolve based on changing application requirements, and as more features are added to the distributed applications themselves. In some cases, not all the data stores may provide support for the same sets of primitive types, or the same kinds of data manipulation operations, which may further complicate the task of managing complex transactions. Furthermore, given the network delays and various types of failures that may be encountered in typical distributed environments over time, some transaction management techniques may not be robust enough to support the service levels required for mission-critical operations.

Figure 1:
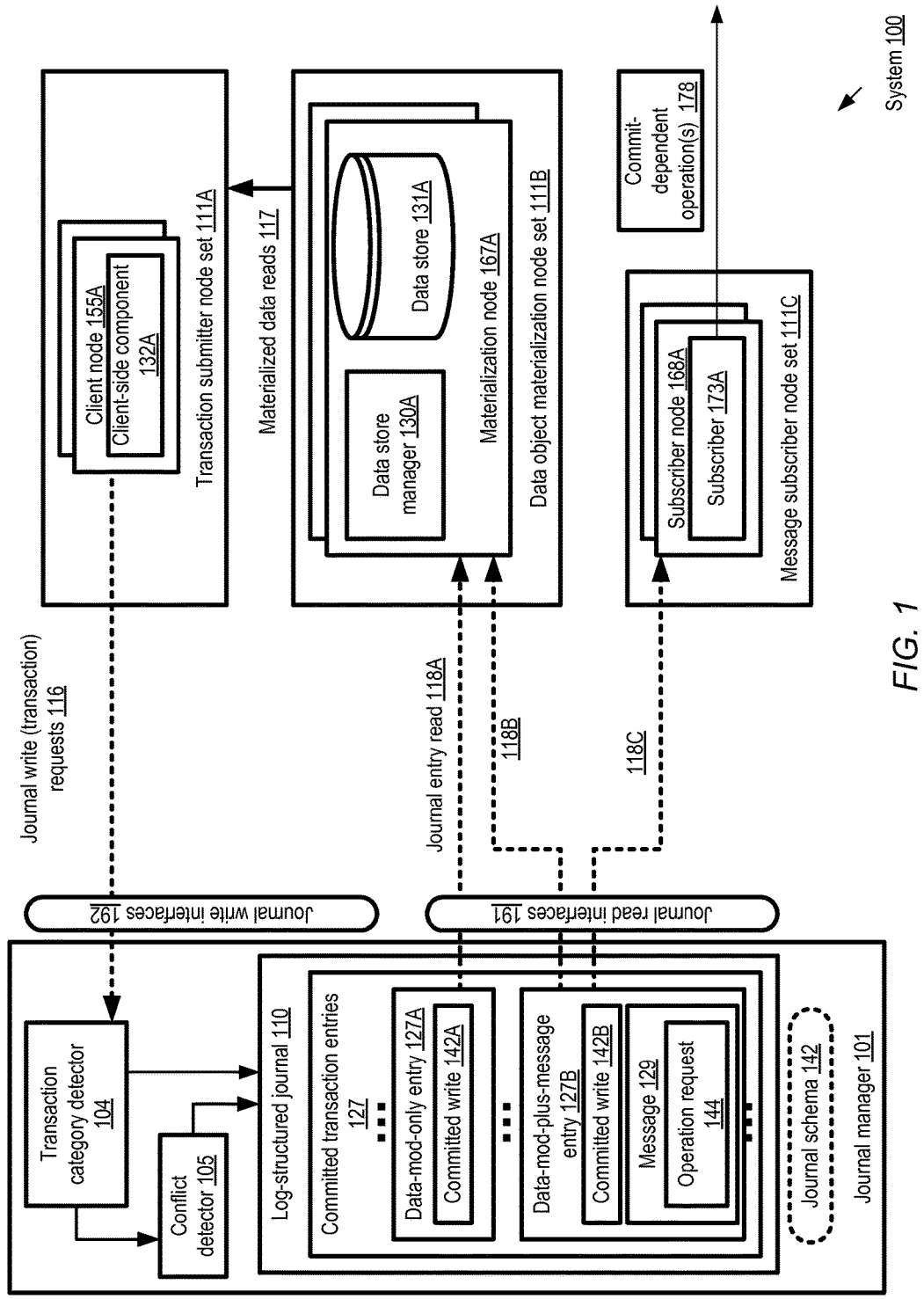
FIG. 1 illustrates an example system environment in which a journal-based multi-data-store database which supports transactional messages may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing transactional messages and replicated deterministic value generators at a journal-based multi-data-store database are described. In at least some embodiments, a plurality of data stores, some of which may implement different data models and data manipulation languages than others, and some of which may materialize different subsets of the database content than others, may be registered as respective materialization nodes or members of the database. In various embodiments, client-side components of the database may prepare transaction requests representing proposed state changes to the database locally, and submit the transaction requests to a journal manager. The journal manager may perform read-write conflict detection, for example, to determine whether objects read during the preparation of a transaction request may have been modified by subsequently-committed transactions (whose write sets are indicated in respective committed transaction entries appended to the journal). If no conflict is detected, a transaction request may be accepted for commit, and a new committed transaction entry corresponding to the transaction request may be appended to the journal. Each materialization node or data store manager may have an associated write applier responsible for examining the entries of the journal sequentially and propagating the relevant writes (i.e., those writes which are to be recorded at that materialization node) to the materialization node. The optimistic concurrency control algorithm implemented by the journal manager may enable higher transaction rates to be sustained for at least some types of applications than would have been possible using traditional locking-based concurrency control techniques.

In various embodiments, in addition to being used to manage concurrent read and write operations, the journal of the multi-data-store database may also be used as a mechanism for transmitting messages which are logically associated with the outcomes of commit decisions made by the journal manager. For example, a client-side component of the database may propose a transaction T1 (which would result in a write operation W1 if T1 is accepted for commit), together with a message M1, such that M1 is only to be made available to some set of recipients in the event that T1 is accepted for commit. The message M1 may contain a request to perform some set of operations O1 which are to be performed if T1 is committed, and which are not be performed if T1 is not committed. Such messages, whose delivery is conditional upon the successful commit of an associated transaction, may be referred to as "transactional messages" herein. In at least some embodiments, in addition to indicating various other component elements of a particular transaction request, such as read set and write sets, a transaction request submitter such as a client-side component of the database may include the contents of one or more transactional messages within the transaction request. In some cases, as discussed below, a given transactional message may simply indicate one or more work operations that are to be initiated in the event that the transaction request is accepted for commit, without necessarily indicating any specific message recipient; in other cases, one or more intended, preferred, or required recipients of the message may be indicated in the transaction request. The requested operations may, in some cases, be directed to other objects or entities indicated in the transaction itself: for example, a transaction T1 may result in a write to a data object D1, and a message M1 associated with T1 may request that an operation be initiated on D1.

Upon receiving a conditional-message-containing transaction request, the journal manager may perform its normal commit analysis, e.g., to detect potential read-write conflicts. The message included in the transaction request may play no role in the commit analysis in at least some cases; that is, the journal manager may use a set of previously-stored committed transaction entries as well as the read set of the proposed transaction for conflict detection, regardless of the message contents. If the transaction is accepted for commit, in various embodiments, the journal manager may add a new committed transaction entry and the message to the journal. In some implementations, the message may be included in the committed transaction entry. In other implementations a pointer to the message may be stored in the committed transaction entry, and the message itself may be stored in a different journal entry or in a different storage location. In one implementation, a commit-dependent message may be received by the journal manager in a separate communication from the transaction request on whose commit the message depends (e.g., in a message request that includes an identifier of the transaction request and is received before or after the transaction request).

In various embodiments, at least some of the messages may be intended to be read by, or be of interest to, entities which do not necessarily materialize database contents. For example, in one embodiment, a set of programmatic interfaces may be implemented (e.g., by the journal manager) to enable message subscription requests to be submitted, and one or more nodes of a distributed system at which the journal is implemented may be added or registered as message subscribers in response to requests received via such interfaces. Such subscriber nodes may, for example, include workflow processing components of an application whose data is managed at least in part using the optimistic concurrency control algorithm of the journal manager. Just as materialization nodes may process the journal entries in sequential order, applying a subset (or all) of the writes indicated in the entries, a message subscriber may also examine the entries of the journal sequentially in some embodiments, reading a subset (or all) of the messages and initiating operations requested in some or all of the messages. At least some of the message subscribers may not be responsible for materializing or storing any of the data objects of the database in some embodiments. In one embodiment, a materialization node may also be permitted to register as a message subscriber node—that is, the roles of materialization node and message subscriber node may not be mutually exclusive. The journal manager (which appends committed transaction entries to the journal, some of which may indicate or include transactional messages), the materialization nodes (which read entries from the journal and apply writes to their respective data stores) and the subscriber nodes (which read messages indicated in the journal entries) may act asynchronously of each other in at least some embodiments. Journal managers, materialization nodes, subscribers and transaction-submitting components may collectively be referred to as the nodes of the multi-data-store database.

In at least one embodiment, message-only transaction requests (i.e., transaction requests that need not necessarily indicate a read set or a write set) may be submitted by a client, and the journal manager may append a new committed transaction entry containing/indicating the message in response to such a message-only transaction request. Such message-only transaction requests may be transmitted via the journal, for example, for ordering purposes: e.g., to ensure that the contents of the message are observed by subscribers only after some set of other transactions have been committed (and the sender of the message has confirmed that the set of transactions have been committed). Message-only transactions may also be used in some journal-based storage systems because of the data durability and availability properties of the journal—e.g., as described below, in some embodiments journal entries may be replicated at several nodes of a replication graph, and messages indicated in such journals would share the high levels of data durability and availability characteristic of such journal implementations.

A given transactional message, indicated in a particular journal entry, may be examined by several different subscribers in various embodiments, some of which may take different actions in response to the message than others. Thus, several different operations may be triggered by a single transactional message in such embodiments. The relative timing of the operations may vary, depending on when the message is read and acted upon by each of the subscribers—e.g., there may be some degree of overlap in some cases, or no overlap at all. In some embodiments, an operation requested in a transactional message may be idempotent, such that if several different subscribers initiate the operation, the net result would be the same as if just one subscriber had initiated the operation. Some commit-dependent transactional messages may be informational rather than actionable—that is, a message subscriber may not necessarily have to initiate any actions after reading the contents of such messages.

A common journal schema may be employed in some embodiments, indicating rules regarding acceptable transaction requests which can be submitted to the journal manager by various nodes of the system. Such rules may, for example, indicate the syntax of a transaction language (including the syntax for expressing messages), the kinds of transactions which can be submitted (such as data modification transactions, schema modifying transactions, and so on). With respect to acceptable values for the attributes of data objects, the journal schema may support "maximally-overlapping" attribute value ranges with respect to the individual data stores of the materialization nodes. For example, if one data store supports 64-bit integers, and another member data store supports only 32-bit integers, the journal schema may only permit 32-bit integers. The journal schema may also be referred to as the abstract or generic schema of the database, while the respective schemas of the individual data stores, from which the journal schema may be derived in some embodiments, may be referred to as "concrete" or data-store-specific schemas. As described below in further detail, the journal schema of the storage system itself may evolve over time, e.g., as new data objects and/or new object attributes are added, or if new features or capabilities (such as changes to the message language) are added to the data-store-independent transaction language. A set of interested parties may participate in a proactive acceptability verification protocol in some embodiments before changes to the journal schema are committed. For example, before a change to the message language is implemented, at least a subset of the registered message subscribers may have to indicate that the change would be acceptable. If a proposed change to the message language were to potentially result in an inability to parse subsequent messages at a given message subscriber, for example due to a character encoding change, the message subscriber may veto the change as part of the proactive acceptability verification protocol.

In at least some embodiments, an algorithm to reduce contention associated with certain kinds of write operations may be implemented at a multi-data-store database. In various applications, unique identifiers may have to be assigned to new instances of various data objects. For example, a virtual computing service may be implemented in some networks, in which new guest virtual machines (GVMs) may be set up at various hosts in response to client requests, and each GVM may be assigned a new unique identifier. Similarly, in a content-management application or a social media application, each new social media post or piece of content may require a new unique identifier to be generated. In high-throughput applications, the rate at which such identifiers have to be generated (e.g., tens of thousands of times a second) may reach such high levels that the components responsible for generating the identifiers may become bottlenecks. Consider a simple scenario in which each new identifier is to be obtained by incrementing a value used for a previously-generated identifier—so that, for example, if the previous identifier was 10000, the next identifier should be assigned the value 10001. In some traditional implementations, the procedure used for generating the new identifier may include determining the last value generated by the counter and then incrementing the value, while ensuring that no other entity is concurrently incrementing the value to generate their own new identifier. To avoid concurrent updates resulting in duplicate identifiers, exclusive locks (or their logical equivalents) may have to be used, which can sometimes result in contention bottlenecks. In many cases, the entity requesting a new unique identifier may not necessarily be concerned with the actual value assigned to the identifier, as long as the value meets the uniqueness requirement and conforms to any other application-dependent rules.

In journal-based storage systems of the kind described herein, the materialization of the data (i.e., the storage of the values assigned to various object attributes) is separated from the representation of state changes being performed on the data (which are indicated in journal entries). In at least some embodiments, a given transaction request at a journal-based system may include a directive indicating that a new value with a particular set of characteristics (e.g., uniqueness with respect to some previously generated set of values) is to be assigned to a particular attribute of a data object (e.g., to an identifier attribute), without actually indicating the exact value to be assigned. The desired characteristics of the new value may be indicated, for example, by referring to a previously-defined deterministic value generator—e.g., a logical integer counter whose successive value are to be obtained by incrementing the previously-generated value, with each change to the value of the counter being implemented as a state change of the storage system as a whole. Any of several approaches towards executing the directive may be taken in different embodiments. The approaches may differ, for example, in the kind of entity which is responsible for computing the new value to be assigned to the attribute: e.g., whether the new value is determined by the data store managers at the materialization nodes, or by the journal manager.

In some embodiments in which the first of these two types of approaches is used, when a given transaction request containing an attribute value-setting directive is approved for commit, the journal manager may append a corresponding committed transaction entry which also includes the directive and does not include an actual value to be assigned to the attribute. Each materialization node responsible for storing the attribute value, may, for example, maintain a respective local implementation or replica of the deterministic value generator. The local version or replica of the deterministic value generator may have only a single concurrent user (i.e., the component of the materialization node which obtains the new value of the attribute) in at least some embodiments, and may therefore require no concurrency control. The state of the local replica of the deterministic value generator may thus be changed in a contention-free manner based on the directives observed in committed transaction entries. Because each materialization node implements the state changes indicated in the journal in the same order, the values assigned to the attribute based on the directives indicated in a given journal entry would be identical at the different materialization nodes at which that attribute is stored. As a result, new attribute values with the desired characteristics may be assigned at various materialization nodes without the kind of contention discussed above.

Consider an example journal-based multi-data-store storage system with which two materialization nodes MN1 and MN2, each of which are responsible for materializing data object Object1 with several attributes including Object1.IDattribute. A deterministic value generator DVG1 such as an integer counter may be established for the system, e.g. in accordance with a journal schema. Each of the materialization nodes MN1 and MN2 may pre-approve DVG1, indicating that they have local versions or replicas of the generator (e.g., DVG1.1 at MN1, and DVG1.2 at MN2). The identical initial value (e.g., zero in the case of an integer counter which is to produce successive positive values by incrementing the previous value by one) may be assigned to the DVGs, prior to the approval of any transaction requests referring to DVG1. A new transaction request TR1 may be received at the journal manager, including an attribute value-setting directive AVD1, requesting that a particular attribute of a data object (e.g., Object1.IDattribute) be set to a value to be obtained from DVG1, without actually indicating the value. After performing commit analysis, the journal manager may append a new committed transaction entry CTE1 to the journal, also containing AVD1 (and also not containing an actual value to be assigned to Object1.IDattribute). When, as part of its sequential analysis of the journal, MN1 examines CTE1, it may obtain the next value NV (e.g., 1 if the previous value was 0) from the local replica DVG1.1 and assign NV to Object1.IDattribute. Similarly, when MN2 examines CTE2, MN2 may also obtain the next value (also NV, since the same set of committed transaction entries are examined in the same order by both MN1 and MN2) from its local replica DVG1.2, and assign that value to Object1.IDattribute. In this way, consistent and unique values may be assigned to Object1.IDattribute in a distributed, asynchronous manner while avoiding contention.

In some embodiments, the journal manager may maintain local versions of at least some deterministic value generators, instead of the materialization nodes having to implement respective versions of all the deterministic value generators. In some implementations as discussed below, the specification of a given deterministic value generator may indicate whether the generator is to be implemented at the journal manager or at the materialization node(s). In one embodiment, when a transaction request containing an attribute value-setting directive involving the use of a particular deterministic value generator DVG-k which is implemented at the journal manager is received, the journal manager may obtain the next value NV-k from its (the journal-manager's) local version or replica of DVG-k. As the journal manager processes transaction requests one at a time (as indicated by the commit sequence numbers of committed transactions), there would be no contention for DVG-k, just as there would be no contention in the scenarios in which the deterministic value generator is implemented at the materialization node (s). If the transaction is accepted for commit, the new value NV-k may be included in the committed transaction entry appended to the journal, together with the attribute-setting directive (e.g., without altering the write set descriptor, write payload, read set descriptor and/or other elements that are copied from the transaction request into the committed transaction entry). NV-k may be considered one example of supplemental information computed by the journal manager for a committed transaction and inserted in the committed transaction's journal entry; a commit sequence number may be considered another example of supplemental information. Materialization nodes that examine the committed transaction entry may extract the directive and the value of NV-k, and store NV-k as the materialized value of the attribute indicated in the directive. In some cases, the values obtained from deterministic value generators and included in the committed transaction entries by the journal manager may play a role in commit analysis—e.g., the values may be considered part of the write sets of committed transactions, with respect to which read-write conflict detection is performed. In at least some embodiments, it may be the case that after obtaining the next value NV-k using its local value generator based on a directive in a given transaction request TR-j, the journal may discover a conflict with a previously-committed transaction's write set, and TR-j may therefore be rejected. A number of variations on the basic scheme outlined here for deterministic value generators implemented by journal managers may be employed in different embodiments—e.g., in some embodiments, the journal manager may use the next value to modify the write payload of the transaction request, instead of including the write payload of the transaction request in unmodified form in the committed transaction entry. In at least some embodiments, only one of the two approaches with respect to deterministic value generators may be supported—e.g., either all the value generators may be implemented at the journal manager, or all the value generators may be implemented at materialization nodes.

In some embodiments in which journal-based value generators are supported, a transaction request may include a commit condition expressed in terms of the value to be obtained from a value generator—e.g., the logical equivalent of "commit this transaction only if the next value from generator DVG-k meets criterion X" may be included in a transaction request. Such commit conditions may be used to handle overflow or out-of-range errors in some implementations: e.g., the transaction submitter may indicate that the transaction request should not be committed if the next value obtained from the DVG falls out of an allowed or expected range of values of the DVG. When a transaction containing a commit condition expressed using a DVG is received, the journal manager may obtain the value from the specified generator and determine whether the commit condition is met (e.g., prior to performing other commit analysis operations such as read-write conflict detection). If the value generator-based commit condition is not met, the transaction may be rejected. Various aspects of the algorithms which may be used to generate and use values from deterministic value generators in different embodiments are described in greater detail below.

State changes corresponding to a particular committed transaction may be materialized at several different data stores independently in at least some embodiments—e.g., one data store may be updated before another. The entries in the journal may collectively represent the authoritative state of the database in various embodiments, with individual journal entries representing respective state changes. In at least some embodiments, a given journal entry may indicate an approved or committed operation which changes the state (e.g., the equivalent of "add X to Y"), and may not necessarily indicate the data values resulting from the state change (e.g., with respect to the state change indicated by "add X to Y", a record indicating Y's value may not be stored in the journal). In various embodiments, once an entry has been made persistent by storing at one or more storage devices of the journal, that entry may no longer be modified or overwritten in place.

A wide variety of data store types may be registered as members of such a journal-based system in different embodiments, including for example one or more instances of relational databases, non-relational or NoSQL databases, in-memory databases, object-oriented databases, storage services which provide web-service interfaces to data objects, storage services which provide block-level programmatic interfaces, and the like. Each data store instance or materialization node may have a corresponding data store manager, implemented for example using some collection of hardware and/or software components, configured to support a respective set of programmatic interfaces in accordance with the syntax and semantics of the associated data store type. In at least some embodiments, for example, some data stores may present different interfaces for read operations, and a client-side component may submit reads to different data stores via their respective read interfaces when preparing a transaction request. The data stores registered at a given time for transaction management via a given logical instance of a journal of a multi-data-store database may be referred to as "member" data stores of that database as of that time. Generally speaking, multiple logical journal instances may be used simultaneously, each associated with a corresponding multi-data-store database with its own member data stores. The terms "multi-data-store database" and "multi-data-store storage system" may be used synonymously herein. Of course, a given storage system or database may, at least at some points in time, comprise just a single member data store—that is, while multiple members may be permitted, the storage system may not be required to have multiple members.

In various embodiments, as indicated earlier, some of the primitive data types supported at one data store may not be supported at another. For example, integer values may be stored using 64 bits in one data store, and using 32 bits in another. Similarly, the implementation and precision of real numbers may differ from one data store to another. With respect to deterministic value generators, each data store may have to implement the data types indicated for the value generators in the agreed-upon journal schema—e.g., if a 64-bit integer counter is to be used to generate identifiers, a member data store which natively supports integers no larger than 32 bits may use two 32-bit integers in combination to implement the 64-bit integer counter. The manner in which text variables or attributes are handled may differ across data stores in some cases—e.g., the maximum supported length of a character array may differ, support for variable-length character arrays or strings may differ, and so on. The details of the implementation of binary objects (e.g., "blobs"), such as the maximum size of binary objects, etc., may differ from one store to another. Some data stores may not offer the same kinds of data manipulation operations as others. Furthermore, in at least some embodiments, the kinds of indexes, constraints and/or other metadata objects which may be supported may differ from one data store to another. In various embodiments, a data-store-independent or data-store-agnostic transaction language may be employed for transaction requests submitted to the journal manager, e.g., to ensure that such differences among the different data stores can be managed.

In some embodiments, each journal entry may include an indication of a commit sequence number, indicative of an order in which the corresponding request was approved by the journal manager. In one simple example implementation, an integer counter may be incremented by the journal manager every time a transaction request (e.g., either a data modification request, or a journal schema modification request) is approved, and the value of that counter may be included in the commit record entry added to the journal for that request. In some such embodiments, a conflict check delimiter (expressed as a sequence number corresponding to the most-recently-applied commit at a data store from which data was read when preparing the transaction) may be included in a transaction request. The conflict check delimiter may be used by the journal manager to identify the subset of commit records of the journal (i.e., those commit records which have higher sequence numbers than the conflict check delimiter) whose write set descriptors are to be examined to detect conflicts with the transaction proposed in the request. In at least one embodiment, if that subset of commit records includes a particular record corresponding to a journal schema modification, the transaction request may be rejected (e.g., because the version of the journal schema currently in effect differs from the version which was used to prepare the transaction).

Example System Environment

FIG. 1 illustrates an example system environment in which a journal-based multi-data-store database which supports transactional messages may be implemented, according to at least some embodiments. System 100 shows a journal manager 101 of a log-structured journal 110 that may be used to store records of state changes of a multi-data-store database. The journal manager may be implemented using one or more computing devices in various embodiments. The journal may be described as being log-structured in the depicted embodiment in that it may comprise an append-only sequence of entries, with in-place modification of entries not permitted. The journal may comprise committed transaction entries 127 stored in the order in which the corresponding transactions or state changes were approved, e.g., in increasing order of commit sequence numbers. The journal manager may implement at least two kinds of programmatic interfaces in the depicted embodiment: journal write interfaces 192, and journal read interfaces 191. Programmatic interfaces 191 and 192 may, for example, comprise respective collections of APIs (application programming interfaces) in various embodiments, although access to the journal may also be provided using web-based consoles, command-line tools, and the like in some embodiments.

Three sets of nodes may interact with the journal manager in the depicted embodiment using programmatic interfaces 192 and/or 191: transaction-submitter node set 111A, data object materialization node set 111B, and message subscriber node set 111C. The three sets of nodes 111 may also interact with one another in at least some embodiments, as discussed below in further detail: e.g., transaction submitter nodes may read materialized data from the materialization nodes via read interfaces of the data stores, or transaction submitters may query a message subscriber node to determine how much of the journal has been examined thus far by the subscriber. A transaction submitter node, such as client node 155A with a client-side component 132A implemented at one or more computing devices, may prepare transaction requests 116 locally, and submit the transaction requests to the journal manager for commit analysis. Transaction requests 116 may be considered one example of journal write requests, as a committed transaction entry 127 may be written to the journal for each transaction accepted for commit (e.g., based on operations performed by conflict detector 105). A given transaction request may indicate zero or more proposed writes in the depicted embodiment, and zero or more messages. For a transaction request which includes one or more proposed writes and one or more messages, the journal manager may determine whether the message is to be added to the journal based on the results of the commit analysis of the transaction request in the depicted embodiment. If the transaction is accepted for commit, the message as well as the writes may be included in a transaction entry appended to the journal; if the transaction request is rejected (e.g., due to a conflict identified by conflict detector 105), neither the writes nor the message may be indicated in the journal. As mentioned earlier, such messages, whose insertion into the journal of the multi-data-store is dependent on a successful commit of a proposed transaction, may be referred to as "transactional" messages.

In FIG. 1, two examples of committed transaction entries are shown, corresponding to respective transaction requests: data-modification-only (shortened as "data-mod-only") transaction entry 127A, and data-modification-plus-message ("data-mod-plus-message") entry 127B. Entry 127A is appended to the journal 101 in response to a transaction request which indicates one or more proposed writes to data objects of the database, but does not indicate any messages. Entry 127A indicates that the write 142A has been committed. Entry 127B includes both a committed write 142B and a commit-dependent message 129. Message 129 includes a request 144 for an operation which is to be performed only if the transaction request containing message 129 is committed.

At each node of the materialization node set, such as node 167A, at least a subset of the database contents may be materialized in the depicted embodiment. Each materialization node may include a respective data store 131 (e.g., data store 131A) and a corresponding data store manager (DSM) 130 (e.g., DSM 130A) implemented at one or more computing devices. A respective concrete schema (not shown in FIG. 1) may govern the data object types, attribute types and allowed values, and various other aspects of each of the data stores. A journal schema 142 (which may be compatible with each of the concrete schemas of the data stores 131) may specify or govern various aspects of transaction management in system 100—e.g., the syntax of a data-store-independent transaction language in which state change requests are to be submitted to the journal manager by client-side components 132, the data-store-independent language to be used for messages 129, and/or the data types and attributes which can be referenced in transaction requests. Each data store manager may ensure that changes made to the journal schema 142 are compatible with the local concrete schema in various embodiments, e.g., as part of a proactive acceptability verification protocol for potential journal schema changes, and thus may have access to both types of schemas. In at least some embodiments, the current journal schema may be stored in materialized form at some or all data stores. Various additional details regarding the journal schema and its relationship with the concrete schemas are provided below.

The data stores 131 may be referred to as member data stores of the database or storage system. The member data stores 131 may differ from each other in various characteristics such as their supported data models and/or data manipulation languages, level of data consistency supported, transaction support, data persistence/durability level, and the like. For example, one data store may comprise an instance of a NoSQL or non-relational database that does not implement a standard version of the structured query language (SQL)), while a second data store may comprise an instance of a relational database, and a third data store may comprise an instance of an in-memory database. Each of the data stores may be registered for transaction management by the journal manager 101 in the depicted embodiment, e.g., in response to programmatic registration requests. The terms "concurrency control" and "transaction management" may be used as synonyms herein with respect to the state change management functionality provided by the journal manager. In effect, the journal manager may be responsible for implementing a replicated state machine corresponding to a collection of data objects indicated in a journal schema, with the committed transaction entries expressing state changes in a data-store-independent language in the depicted embodiment. In some embodiments, several different types of entries may be stored in the journal corresponding to respective transaction requests, including entries representing data modifications, journal schema modifications, redactions of other entries (i.e., operations to instruct journal entry consumers such as write appliers to skip the processing of earlier-inserted entries), and the like. Some transaction requests may require conflict detection, while others may not. A transaction category detector 104 may receive the transaction requests in some embodiments, and pass those transaction requests requiring conflict detection to the conflict detector 105; for other transaction requests (including message-only requests), respective entries may be added to the journal without analysis by the conflict detector 105.

In the depicted embodiment, after a given data-modifying or schema-modifying transaction is committed and its entry is stored at the journal, at least some of the writes of the transaction may be applied or propagated to one or more of the materialization nodes 167, e.g., by write appliers or cursors issuing journal entry read requests 118 (e.g., 118A or 118B). Different subsets of the committed writes may be of interest to, or relevant to, different materialization nodes in some embodiments. In various embodiments, the respective data store managers 130 at the materialization nodes may verify that a given write is compliant with the journal schema 142 (and therefore with the concrete schema of the data store) before the write is applied. In some implementations, the writes may be applied in an asynchronous fashion at the materialization nodes. Thus, in such implementations, there may be some delay between the time at which the transaction is committed and the time at which the payload of a particular write operation of the committed transaction reaches the corresponding data store. In various embodiments, respective asynchronous write appliers may be used to propagate some or all of the writes to relevant data stores. In some embodiments, the write appliers may be components of the journal manager 101, while in other embodiments the write appliers may be components of the data store managers 130, and may represent respective cursors on the journal. After the data written during a transaction is applied to the corresponding data stores, client-side components may be able to read the updated data using the respective read interfaces supported by the data store managers 130. In some embodiments, at least one of the write appliers may be capable of performing synchronous writes (e.g., either when explicitly directed to do so by the journal manager or a data store manager, or for all the writes for which the applier is responsible).

In contrast to materialization nodes 167, at least some message subscriber nodes such as 168A may not be responsible for materializing or storing persistent versions of data objects defined in the journal schema 142 in the depicted embodiment. Like materialization nodes, a given subscriber node such as 168A may maintain a cursor onto the journal, and examine the entries sequentially using the read interfaces 191. If a given transaction entry (such as 127B) contains or points to a message, the message subscriber may read the contents of the message. For example, as indicated by arrow 118C, message subscriber may examine message 129 of entry 127B in the depicted embodiment, and initiate commit-dependent operations 178 in accordance with the request 144 contained in the message 129. In some embodiments, message subscribers such as 168A may only be able to read the message portions of committed transaction entries. For example, in one such embodiment, none of the content of entry 127A (which does not include a message) may be accessible to a message subscriber, and/or committed write 142B may not be read by the message subscriber. In other embodiments, message subscribers may be permitted to read non-message content, either of the journal entries that include messages (such as 127B), or of other journal entries such as 127A which do not include messages. In at least some embodiments as discussed below, some messages may indicate target recipients, while others may be available to any registered message subscriber. A given message such as 129 may be examined by multiple subscribers in some embodiments, and one or more of the subscribers may take actions (such as initiating operations 178) in response to the message. In some cases, a message subscriber may also be permitted to submit transaction requests (which may or may not include messages) to the journal manager—e.g., the role of transaction submitter may be granted to a message subscriber in such embodiments. In one such embodiment, a message subscriber may respond to a given message 129 by submitting a transaction request, e.g., to indicate that the operations requested in the message have been initiated or completed.

In general, in at least some embodiments, a given data-modifying or journal schema-modifying transaction request 116 may include a read set descriptor indicating one or more reads 117 of materialized versions of data objects at one or more data stores, and a write set descriptor indicating proposed writes which may eventually be propagated to one or more data stores, where the set of data stores that are read in the transaction may or may not overlap with the set of data stores affected by the writes. The reads may be performed using the native programmatic read interfaces of the data stores in some embodiments. The transaction requests 116 may be formatted in accordance with a data-store-independent transaction language indicated or referenced in journal schema 142 in various embodiments. The client-side components 132 may obtain the latest version of the journal schema 142 directly from the journal manager (e.g., via read interfaces 191) and/or via reads from the materialization nodes 167. In at least one embodiment, a journal manager 101 may maintain a materialized version of the journal schema which can be obtained by various client-side components 132. In some embodiments, a client-side component 132 may itself include a module capable of materializing a journal schema 142 after examining a set of journal entries indicating respective journal schema changes. In at least some embodiments, the journal manager may not necessarily check whether a submitted transaction request is compliant with the current version of journal schema 142— instead, the client-side components 132 may be responsible for ensuring that their requests are formatted in accordance with the journal schema. In other embodiments, the journal manager may verify that a transaction request complies with the current version of the journal schema, and may reject requests that do not comply. In at least one embodiment, transaction requests that do not include any writes but do include messages may be supported by the journal schema's transaction language. If such a message-only transaction request is received, the journal manager may append a message-only committed transaction entry to the journal in some embodiments, e.g., without performing conflict detection.

At least some of the writes indicated in a given write-containing transaction request may be dependent on the results of one or more of the reads in some embodiments. For example, a requested transaction may involve reading one value V1 from a location L1 at a data store DS1, a second value V2 from a second location L2 at a data store DS2, computing a function F(V1, V2) and storing the result of the function at a location L3 at some data store DS3. In some locking-based concurrency control mechanisms, exclusive locks may have to be obtained on L1 and L2 to ensure that the values V1 and V2 do not change before L3 is updated. In contrast, an optimistic concurrency control mechanism may be used by the journal manager 101 of FIG. 1, in which no locks may have to be obtained. Instead, in the depicted embodiment, the conflict detector 105 may determine, based at least in part on the contents of the transaction request and on a set of committed transaction entries of the journal 110, whether one or more of the data items read in the requested transaction may have been updated since they were read from their respective data stores. A sequence number based technique may be used to determine whether such read-write conflicts exist in at least some embodiments, as described below in further detail. If the conflict detector 105 determines that none of results of the proposed transaction's reads have been affected by subsequently committed writes, the requested transaction may be accepted for commit, and records representing such accepted-for-commit transactions may be added to the journal 110. The terms "approve" and "accept" may be used as synonyms herein with respect to requested transactions that are not rejected.

If some of the transaction's read data was updated since the corresponding reads occurred (or if a probability that the data was updated is estimated by the conflict detector to be greater than a threshold), a requested transaction may instead be rejected or aborted in the depicted embodiment. This type of approach to concurrency control may be deemed optimistic in that decisions as to whether to proceed with a set of writes of a transaction may be made initially under the optimistic assumption that read-write conflicts are unlikely. As a result, in scenarios in which read-write conflicts are in fact infrequent, higher throughputs and lower response times may be achieved than may be possible if more traditional locking-based techniques are used. In the case where a transaction is accepted for commit, in some embodiments contents of a corresponding journal entry 127 may be replicated at some number of nodes of a replication graph (as described below in further detail with respect to FIG. 16) in the depicted embodiment before the commit is considered successful. In some embodiments, the requesting client-side component 132 may be notified when the requested transaction is committed. In at least one embodiment, the client-side component 132 may be informed when a transaction is rejected, so that, for example, a new transaction request may be generated and submitted for the desired updates.

For each transaction that is committed, in at least some embodiments a commit sequence number (or some other identifier indicative of the commit) may be generated and stored as part of the corresponding journal entry. Such a commit sequence number may, for example, be implemented as a counter or as a logical timestamp. The commit sequence number may be determined, for example, by the conflict detector 105 or the transaction category detector 104 in some embodiments, or at a different component associated with the journal (such as the committer node of a replication graph being used) in other embodiments.

In at least some embodiments, as described below in further detail, in addition to a read set descriptor and a write set descriptor, a given transaction request 116 which modifies a data object may include the write payload (i.e., the set of data bytes that are to be stored for each write), a conflict check delimiter (an indication of a subset of the committed transaction entries that should be examined to accept/reject the transaction), and/or other elements such as a transaction type indicator. Some or all of these constituent elements of a transaction request may be stored within the corresponding journal entry together with the commit sequence number for the transaction. In at least one embodiment, the journal manager 101 may provide an indication of the latest committed state of the database (such as the highest commit sequence number generated thus far), e.g., in response to a query from a data store manager, a client-side component or a message subscriber. The write appliers may indicate the commit sequence numbers corresponding to the writes that they apply in various embodiments. Thus, at any given point in time, a client-side component may be able (e.g., by querying the data store managers) to determine the commit sequence number corresponding to the most-recently-applied write at a given materialization node 167. Similarly, in at least some embodiments, a client-side component may be able to determine the commit sequence number of the most-recently-read message at a given message subscriber. In one embodiment, a message subscriber may implement a set of programmatic interfaces to support such queries and/or other requests. For example, in one embodiment a client-side component may submit a "sync-to-sequence-number" request to a message subscriber, indicating that the client-side component should be informed when the subscriber has read all the messages with commit sequence numbers up to a specified value.

In at least some embodiments, during the generation of a transaction request 116, the most-recently-applied commit timestamps may be obtained from the data stores that are accessed during the transaction, and one or more of such commit sequence numbers may be indicated in the transaction request as the conflict check delimiter. For example, consider a scenario in which, at the time that a particular client-side component 132 initiates a transaction that includes a read of a location L1 at a data store DS1, the commit sequence number corresponding to the most recently applied write at DS1 is SN1. Assume further that in this example, the read set of the transaction only comprises data of DS1. In such a scenario, SN1 may be included in the transaction request 116. The conflict detector 105 may identify journal entries with sequence numbers greater than SN1 as the set of entries to be examined for read-write conflicts for the requested transaction. If any of the write sets of the identified commit records overlaps with the read set of the requested transaction, the transaction may be rejected/aborted; otherwise, the transaction may be approved for commit in this example scenario. Details regarding the manner in which conflict detection operations may be implemented in various embodiments are provided below.

The optimistic concurrency control mechanism illustrated in FIG. 1 may allow more complex types of atomic operations to be supported than may have been possible using the underlying data stores' concurrency control mechanisms in at least some scenarios. For example, some high-performance non-relational data stores may only allow single-item transactions (i.e., writes may be permitted one at a time, but if multiple writes are submitted in a single batch update, atomicity/consistency guarantees may not be provided for the multiple writes taken together). With the journal-based approach described above, a single transaction that encompasses writes to multiple locations of the non-relational data store (and/or other data stores as well) may be supported with relative ease. In addition, the transactional messaging capability described above may help in the implementation of complex workflows in which certain types of operations may be initiated conditionally, as discussed below in further detail.

Example Workflow Implementation Using Transactional Messages

In some distributed applications, several types of nodes may be capable of performing tasks to implement various portions of the application's business logic, while only a few nodes may need to materialize data representing the state of the application. The journal-based transactional messaging techniques described above, in which data materialization and associated message processing are logically separable, may be particularly well suited to such applications. FIG. 2-FIG. 7 collectively illustrate an example of a multi-step workflow which may be implemented at a set of nodes of a journal-based distributed system using transactional messages indicated in committed transaction entries, according to at least some embodiments. Each iteration or execution of multi-step workflow 205 includes three operations 206A, 206B and 206C in the depicted embodiment. During a given execution of workflow 205, operation 206B is only to be initiated if operation 206A is successfully completed or committed, and operation 206C is only to be initiated if operation 206B is successfully completed or committed. Respective worker pools WP1, WP2 and WP3 of the application each comprise a set of worker nodes capable of performing one of the three kinds of operations. For example, workers 210 (e.g., 210A) of pool WP1 can perform operations 206A for various executions of workflow 205, workers 211 (e.g., 211A) of pool WP2 can perform operations 206B, and workers 212 (e.g., 212A) of pool WP3 can perform operations 206C. A log-structured journal 201 is used to store committed transaction entries representing state changes of the application of which workflow 205 forms a part. The materialized version of the state of the application is stored at nodes 202A (e.g. in a table T1) and 202B (in table T2) in the depicted embodiment. The worker nodes of pools WP1-WP3 do not materialize tables T1 or T2, and have been granted the authorizations or permission required to submit transaction requests to the journal manager of journal 201 and to read messages from journal 201.

Figure 2:
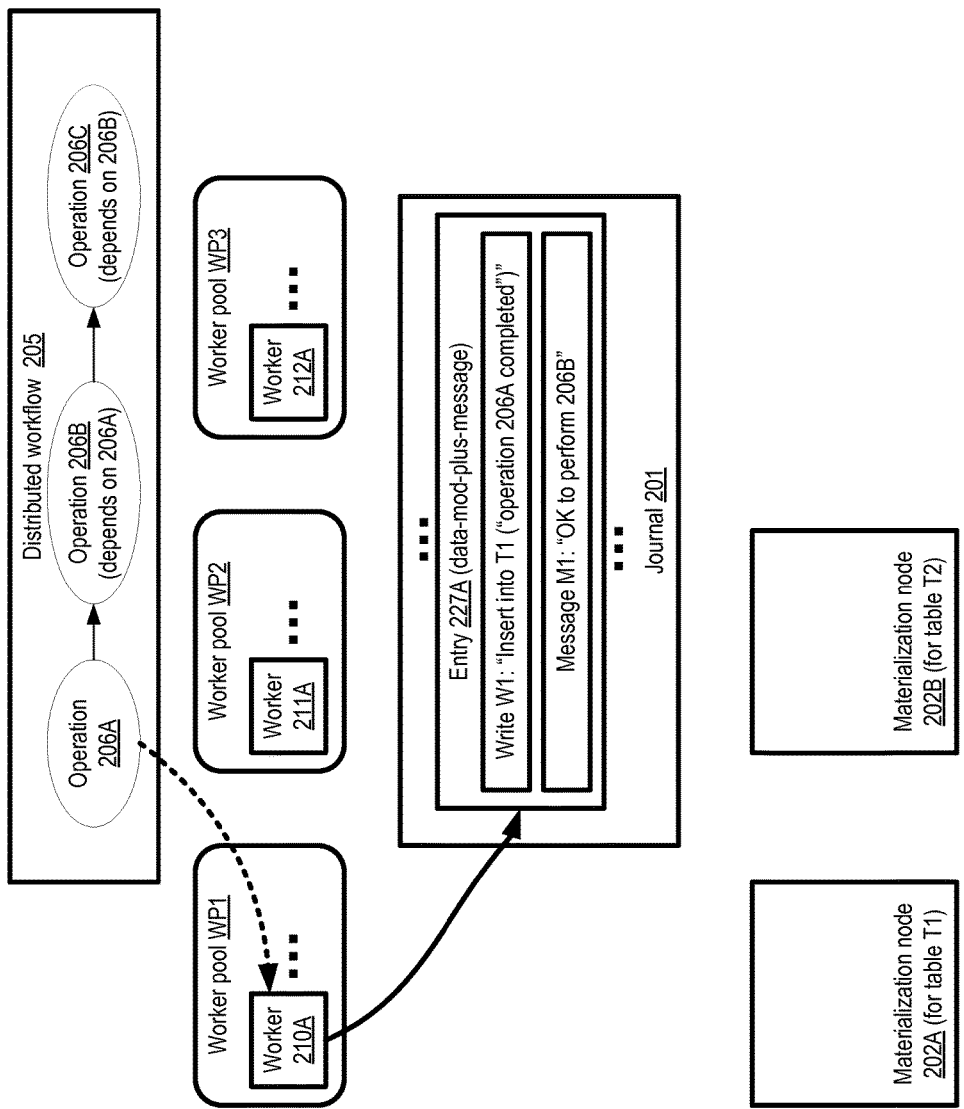
FIG. 2-FIG. 7 collectively illustrate an example of a multi-step workflow which may be implemented at a set of nodes of a journal-based distributed system using transactional messages indicated in committed transaction entries, according to at least some embodiments.

Worker 210A has performed operation 206A for one iteration of workflow 205 at the point of time illustrated in FIG. 2. Worker 210A has submitted a transaction request to the journal manager of journal 201, indicating (in the form of a write W1 directed to table T1, such as the logical equivalent of "insert into T1 (operation 206A completed)") that operation 206A has been performed. The transaction request also includes a commit-dependent message M1, indicating that if the requested transaction is committed, the preconditions for initiating operation 206B have been met (the logical equivalent of "OK to perform 206B"). The transaction request may also have included other components not shown in FIG. 2, such as a read set and/or a conflict check delimiter which may be used for commit analysis by the journal manager. The journal manager has appended committed data-modification-plus-message transaction entry 227A, comprising the write W1 and the message M1, to the journal 201.

In the embodiment depicted in FIG. 2-FIG. 7, write appliers affiliated with materialization nodes 202A and 202B may have established respective cursors on journal 201, and may examine the appended journal entries in sequence, materializing the appropriate subset of writes indicated in the entries at their respective nodes. For example, the write applier of materialization node 202A may propagate writes directed to table T1 to the storage devices of node 202A, while the write applier of node 202B may propagate writes directed to table T2 to the storage devices of node 202B. Worker nodes 211 (e.g., 211A) of pool WP2 and 212 (e.g., 212A) of pool WP3 may have been registered as subscribers to journal 201, e.g., by the journal manager of the journal in response to respective registration requests. At least a subset of the worker nodes may also have established respective cursors onto journal 201, enabling the sequential examination of journal entries so that the relevant subset of transactional messages can be read from the entries.

Figure 3:
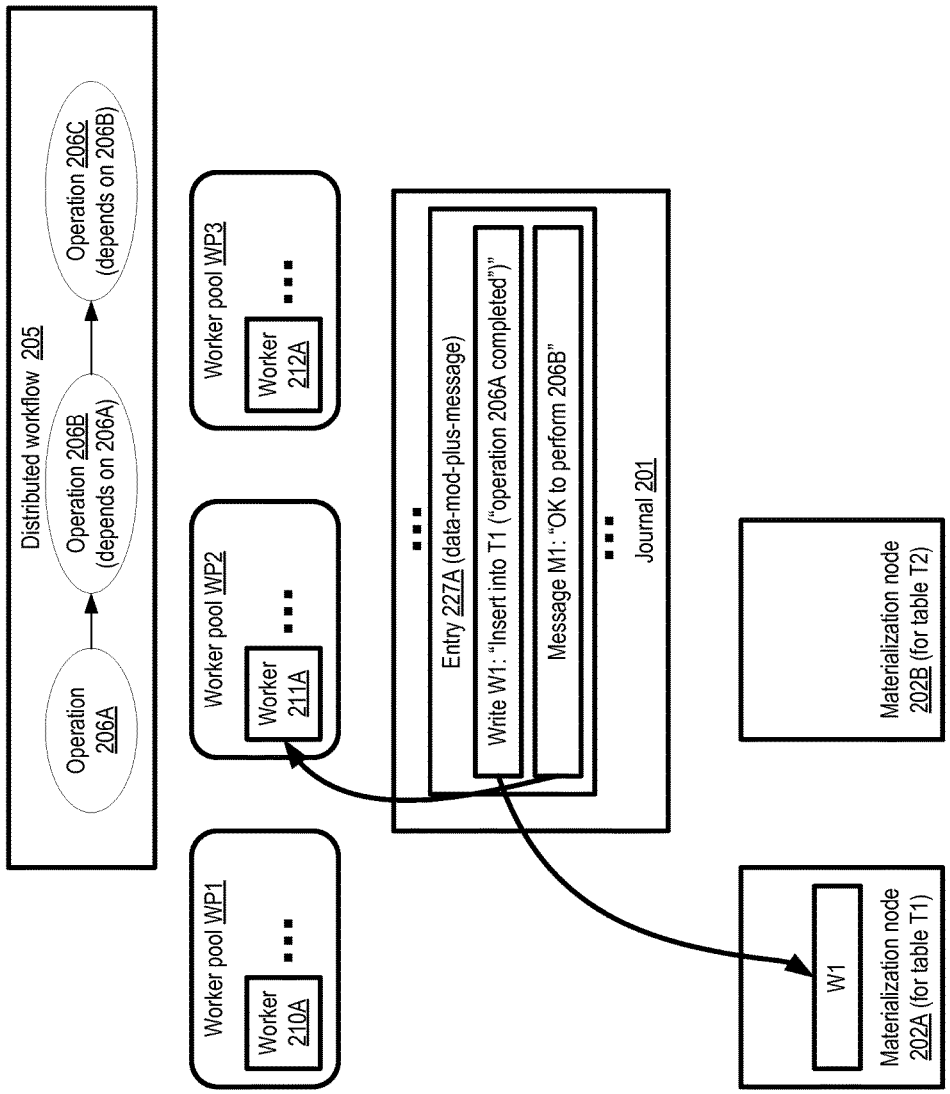
Figure 4:
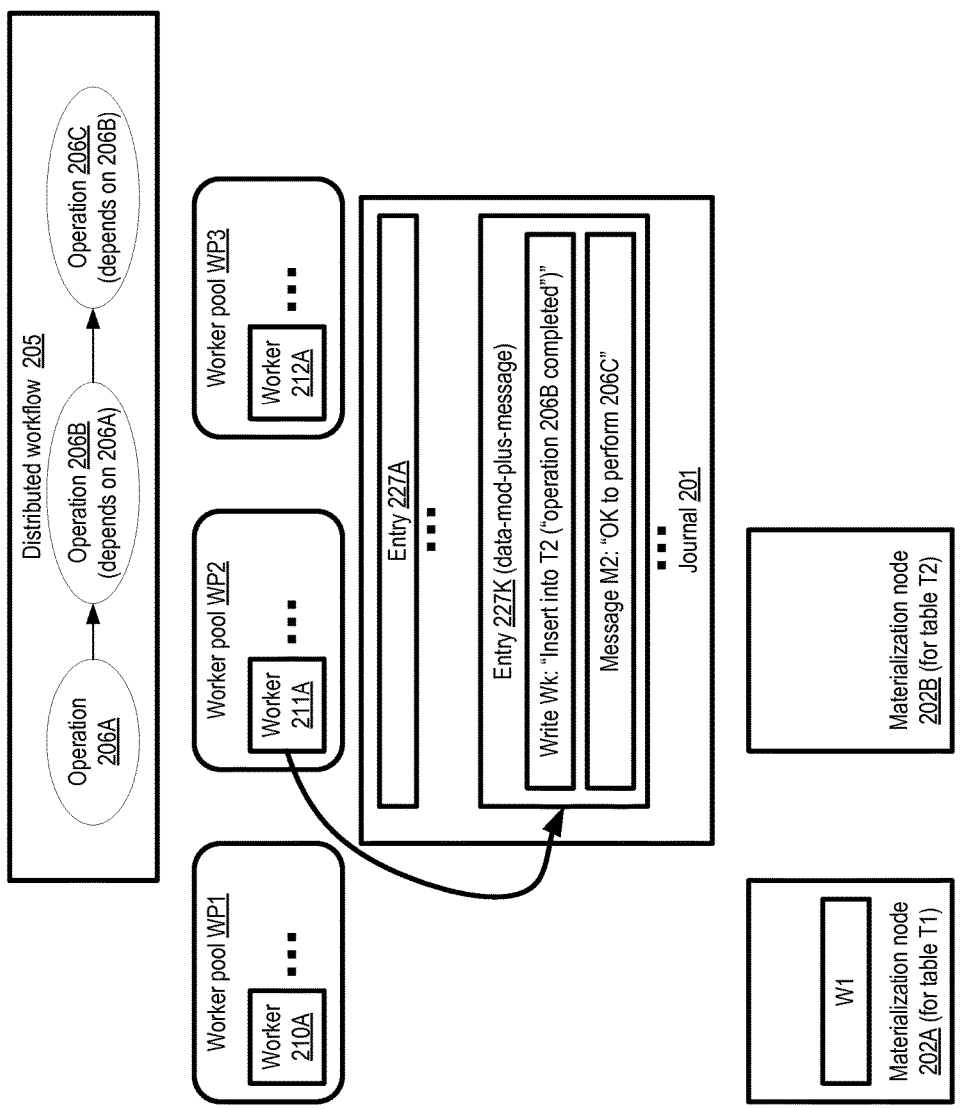

In the scenario depicted in FIG. 3, write W1 of entry 227A has been materialized at node 202A as part of node 202A's sequential examination of journal 201. Message M1 of entry 227A has been read by worker node 211A of pool WP2 as part of worker node 211A's sequential examination of journal 201. The read operations of the materialization node 202A and the message subscriber (node 211A) may be performed asynchronously in the depicted embodiment—that is, the write W1 may not be materialized at the time that the message M1 is read by node 211A, or the message M1 may not have been read at the time that the write W1 is materialized. Other nodes of the system (such as materialization node 202B and/or subscriber worker node 212A) may also examine the journal 201 sequentially, but may take no action upon encountering entry 227A as the contents of the entry do not require operations to be performed at those nodes.

As indicated earlier, the nodes of pool WP2 may have been established to implement operations 206B corresponding to various iterations of workflow 205 in the depicted embodiment. In response to examining message M1, which indicates that the necessary preconditions for operation 206B have been met, node 211A may initiate operation 206B. In the situation depicted in FIG. 4, worker node 211A has submitted a transaction request indicating that operation 206B has been completed, and that the prerequisites for operation 206C have been met. After performing commit analysis on the transaction request submitted by worker node 211A, the journal manager has appended entry 227K to the journal. Data-modification-plus-message entry 227K includes write Wk directed to table T2, as well as message Mk regarding operation 206C's prerequisites.

Figure 5:
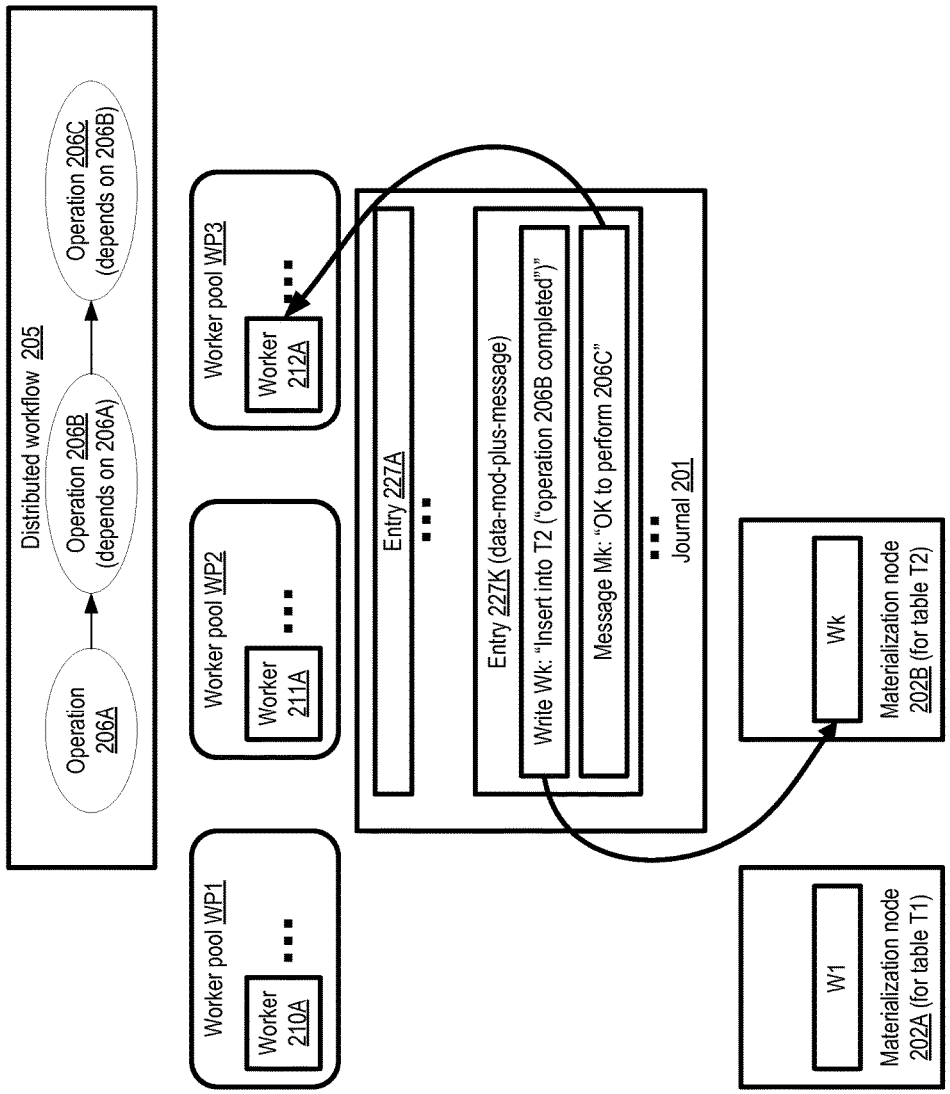

In FIG. 5, worker 212A of pool WP3, which is registered as a message subscriber of journal 201, reads message Mk as part of 212A's sequential processing of the journal. Asynchronously with respect to the reading of message Mk by node 212A, node 202B's write applier, which also processes journal entries sequentially, examines entry 227K and propagates the write Wk to table T2 at node 202B.

Figure 6:
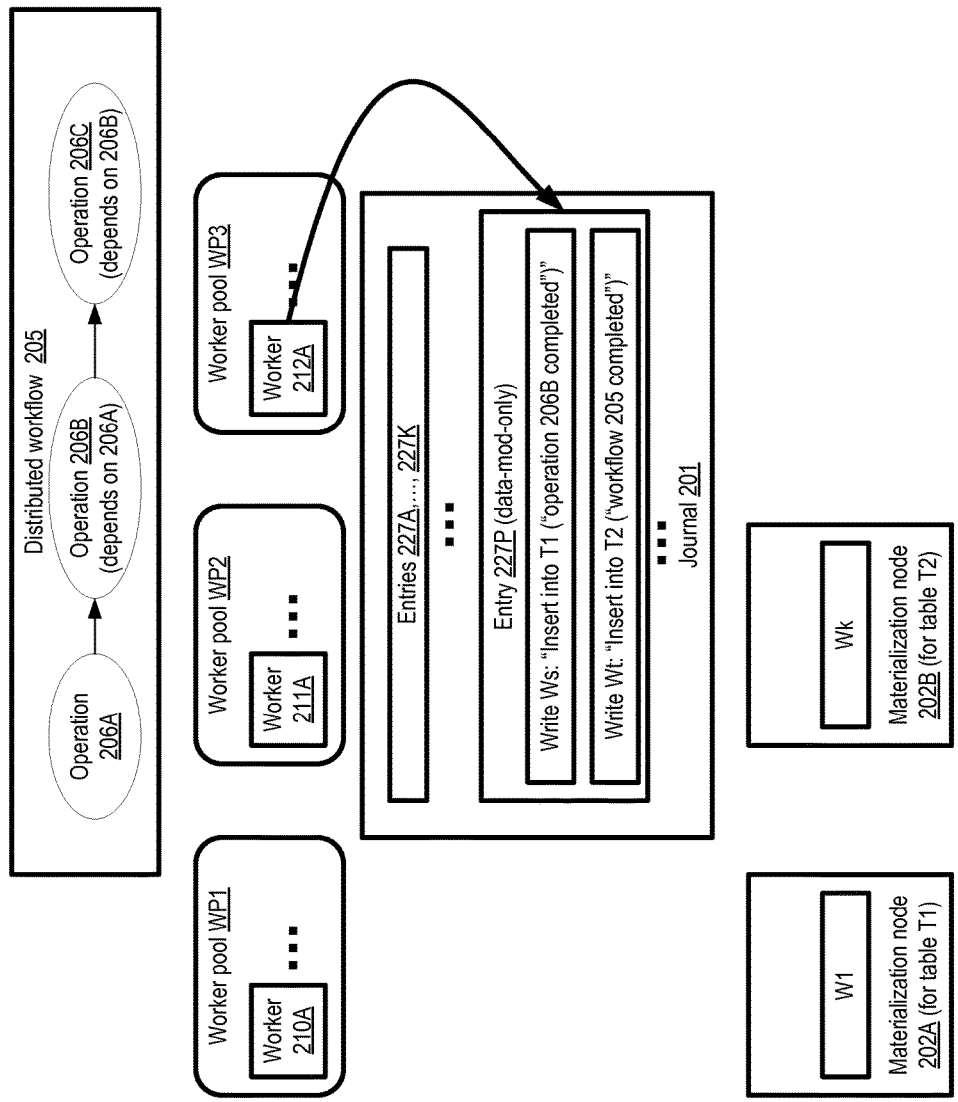

In the state of the system depicted in FIG. 6, worker 212A has completed operation 206C, and has submitted a transaction request with two writes (and no accompanying message) to the journal manager. After determining that the requested transaction is acceptable for commit, the journal manager has appended data-modification-only entry 227P to the journal. Entry 227P includes write Ws directed to table T1, and write Wt directed to table T2, thus providing an example of a single journal entry which results in data materialization at multiple nodes.

Figure 7:
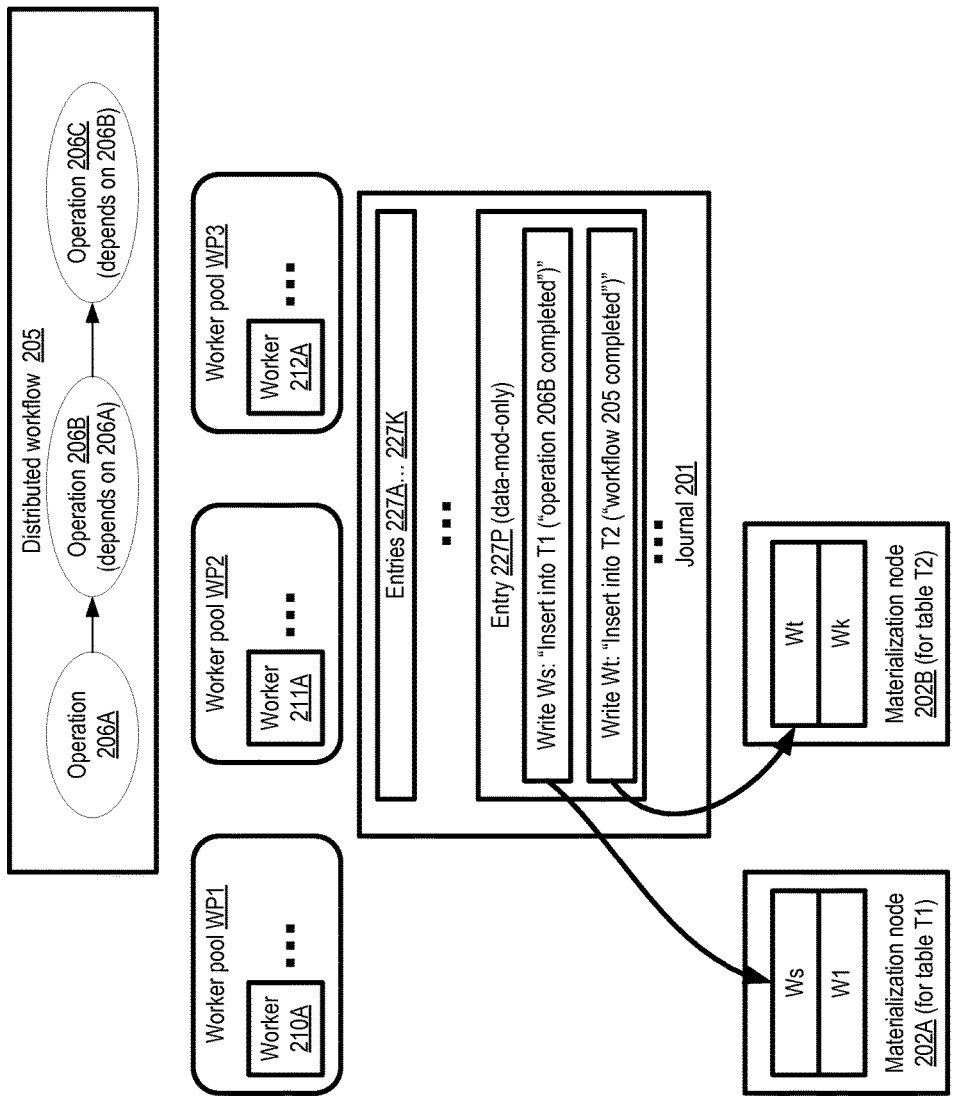

FIG. 7 depicts the state of the system after the respective write appliers of materialization nodes 202A and 202B have examined entry 227P and propagated the writes to tables T1 and T2 respectively. The two writes Ws and Wt may be applied at different times, based on when during their respective sequential processing of journal 201 each write applier encounters entry 227P. It is noted that as indicated by the labels 227A, 227K and 227P, the journal manager may append various other journal entries (e.g., entries unrelated to workflow 205) to the journal 201 during the period corresponding to the particular iteration of workflow 205 for which entries 227A, 227K and 227P are appended. In some cases, those entries may correspond to other iterations of workflow 205, whose operations may be handled by other worker nodes. In at least some cases, a given worker node such as 211A may perform respective operations for several different iterations of workflow 205 concurrently or near-concurrently.

Figure 8:
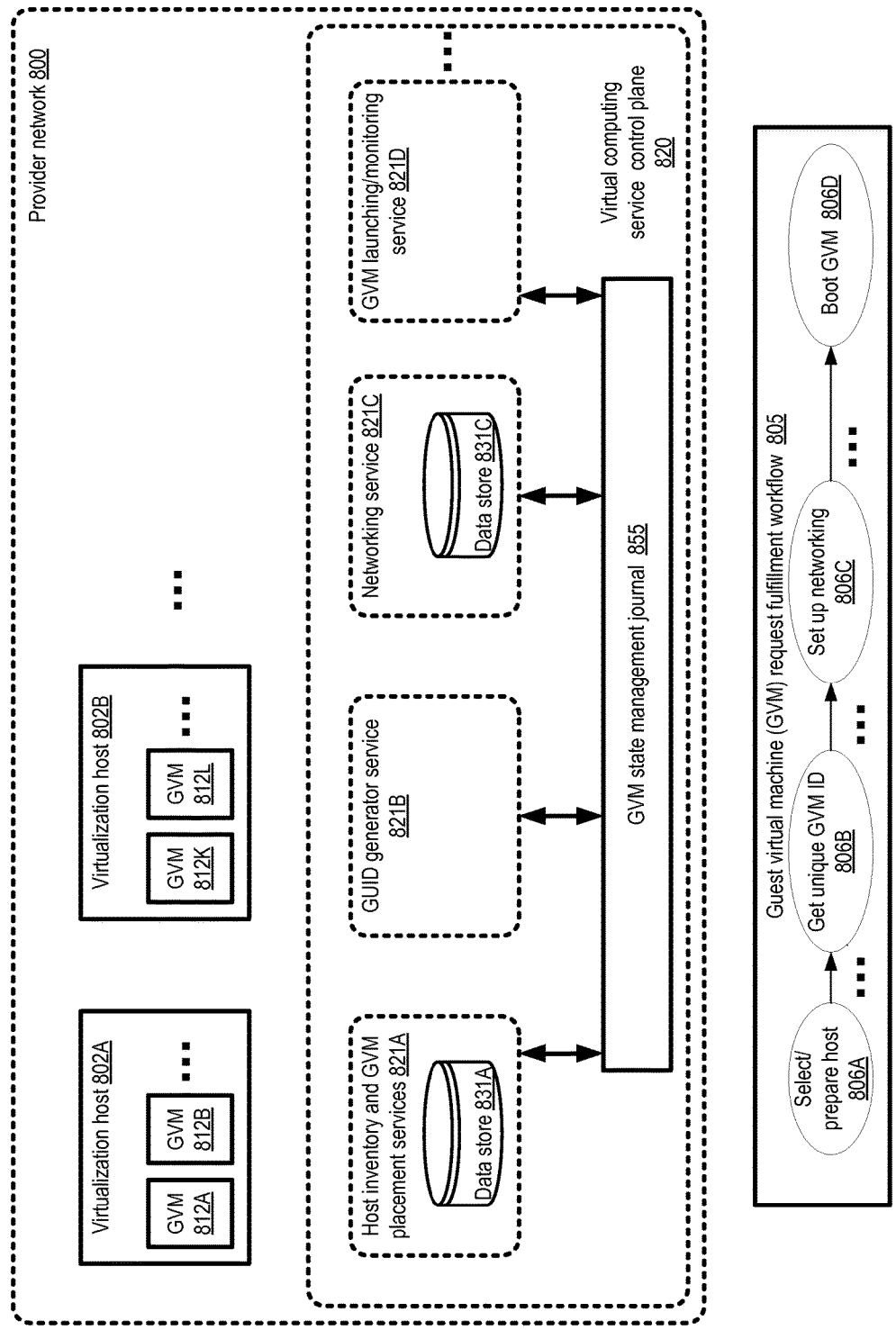
FIG. 8 illustrates control plane components of a virtualized computing service which may utilize journal-based transactional messages for managing the state of guest virtual machines, according to at least some embodiments.

In some embodiments, the algorithms for supporting transactional messaging may be implemented to support network-accessible services of provider network environments. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks. Provider networks may also be referred to as "public cloud"

environments. Some or all of the data stores for which transaction support is provided using the techniques described herein may be established using network-accessible database services and/or other storage services of a provider network in some embodiments. In some embodiments, a virtualized computing service may be implemented at a provider network. Clients of such a service may submit requests for computational resources, and the control plane (i.e., administrative) components of the service may assign guest virtual machines instantiated at various hosts to the clients in response to such requests. FIG. 8 illustrates control plane components of a virtualized computing service which may utilize journal-based transactional messages for managing the state of guest virtual machines, according to at least some embodiments.

Provider network 800 of FIG. 8 includes numerous virtualization hosts 802 in the depicted embodiment, including hosts 802A and 802B. The control plane 820 of the provider network's virtualized computing service employs a plurality of lower-level services 821 and a journal 855 to configure and manage guest virtual machines (GVMs) 812 (e.g., GVMs 812A and 812B at host 802A, and GVMs 812K and 812L at host 802B) for clients. With respect to fulfilling a request for a new guest virtual machine from a client, workflow 805 may be executed in the depicted embodiment. At least some of the steps of the workflow 805 may be triggered by transactional messages indicated in committed transaction entries of journal 855, representing earlier steps of the workflow which have been completed successfully.

When a request for a GVM is received, the control plane may utilize host inventory and GVM placement services 821A (which may have their own materialized data stores 831A) to select a particular virtualization host on which the requested type of GVM can be launched, and/or to prepare the host for the GVM (e.g., by ensuring that the required software is installed). These initial operations may correspond to element 806A of workflow 805. To obtain a new globally unique identifier (GUID) for the GVM, corresponding to element 806B, GUID generator service 821B may be used. For example, a node of service 821B may determine that a new GUID is to be generated as a result of examining a transactional message stored in journal 855, and may submit a transaction with a write indicating the new GUID to the journal 855. A networking service 821C may examine the journal, determine that the prerequisites for element 806C (representing networking setup for the GVM to be instantiated) have been met, and perform the necessary network-related configuration operations. A transaction request with a write comprising the networking settings selected for the GVM (which may eventually be materialized in data store 831C) and a message indicating that the networking configuration (and other pre-launch configuration) is complete may be submitted to the journal. The message, which may include a request to launch the GVM, may be read by a node of GVM launching/monitoring service 821D, which may then launch or boot the GVM in accordance with element 806D of workflow 805. The journal 855 may serve as the authoritative source of the state of the GVM management application, with various portions of the state information being materialized at data stores such as 831A and 831C, while transactional messages associated with committed transactions indicated in the journal may drive at least some of the operations required to fulfil client requests in the depicted embodiment. The use of journal-based transactional messaging may be especially beneficial for complex workflows such as workflow 805, in which components of multiple relatively independent services may participate.

Transactional Message Components

Figure 9:
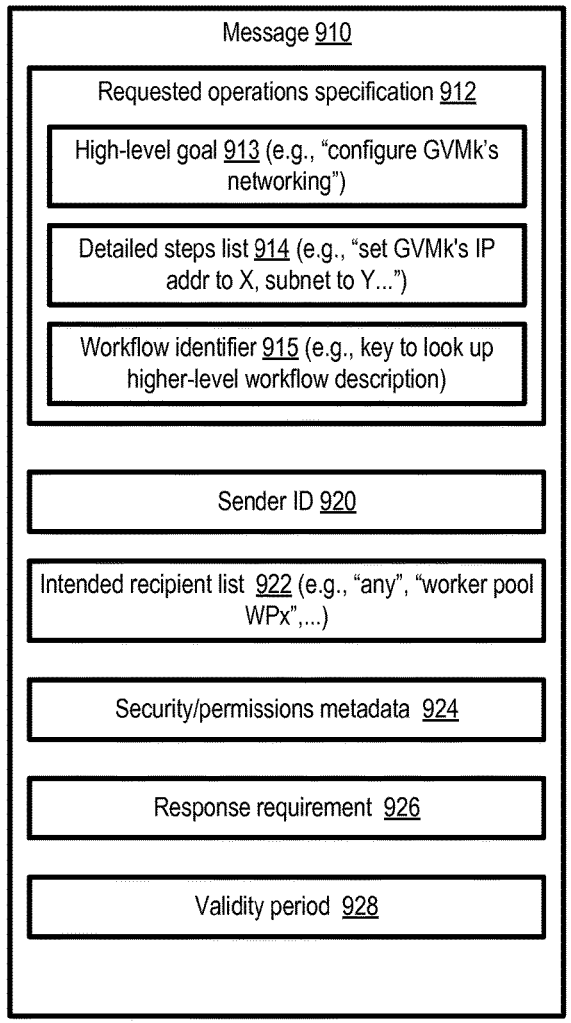
FIG. 9 illustrates example components of a message to be included in a journal in the event that a proposed transaction is accepted for commit by a journal manager, according to at least some embodiments.

FIG. 9 illustrates example components of a message to be included in a journal in the event that a proposed transaction is accepted for commit by a journal manager, according to at least some embodiments. As shown, message 910 may include a requested operation specification 912, a sender identifier 920, an intended recipient list 922, security/permissions metadata 924, response requirement 926 and/or a validity period 928 in the depicted embodiment. The operations which are to be performed by one or more recipients of the message may be indicated at various levels of detail in different embodiments. In some embodiments, a high-level goal 913 (such as "configure GVM k's networking", or "install operating system OS1 on host") may be indicated in the message 910, with the details of exactly how that goal is to be accomplished being left to the recipient. In other embodiments, a more detailed list of steps 914 may be provided in the message, such as specific networking configuration API calls to be invoked, etc. In some embodiments, one or more pointers to external objects describing the work to be performed, such as a workflow identifier 915, may be indicated in the message. Such an identifier may be used by the message recipient as a key to perform a lookup in a different data store, for example, to obtain more information about the requested operations. In at least some embodiments, one or more transactional messages may be entirely informational in nature, requiring no additional operations (apart from reading the message) to be performed, in which case the requested operations specification may simply indicate the information to be read by the recipient. In some embodiments, a given message may contain several different specifications 912 of respective operations.

The sender ID 920 may indicate the component of the system responsible for submitting the transaction which contains the message to the journal manager, and may be used by recipients to verify the identity of the entity for which the requested operations are being performed. In some embodiments, a recipient may store a record of the operations performed in response to a message (e.g., for auditing, billing or monitoring purposes), and the sender ID may be included in such a record. The intended recipients of the message may be indicated in list 922 in some embodiments. In some cases the message sender may set the intended recipient list to "any" (or some logical equivalent) to indicate that there are no restrictions on the recipients—e.g., that any registered message subscriber may read and/or act upon to the message. A group of recipients (such as a worker pool) may be indicated in some embodiments, e.g., without identifying individual members of the group, enabling any member of the group to receive the message. In one embodiment, the inclusion of an intended recipients list 922 may indicate that entities not included in the list are not to be permitted to read the message. In another embodiment, an intended recipients list may be advisory rather than exclusionary—e.g., the list may indicate preferred or targeted entities for the message, but one or more entities not included in the list may still be permitted to read the message. In some embodiments, a message may contain security or permissions metadata 924, such as an access control list, which indicates the names or identifiers of entities granted access to the message. In at least one embodiment, the message may be encrypted, e.g., using any appropriate encryption algorithm, such as algorithms compliant with the Data Encryption Standard (DES) and the like. Intended recipients may be provided encryption keys to be used to decrypt the message via a separate communication mechanism in some embodiments.

In some embodiments, the message sender may use response requirement 926 to indicate whether a recipient is requested to provide a response to the message, and if so, the manner in which the response is to be provided. For example, for some messages, a recipient may be requested to submit a transaction to the journal manager indicating the status of the requested operations in the message; for other messages, no response may be required. In some cases, a transaction request submitted to fulfill the response requirement 926 may include one or more writes directed to a different data object (and/or to a different data store or materialization node) than the writes of the original transaction which contained the message 910. In some implementations, response requirement 926 may indicate that a new transaction request is to be submitted if and when the operations requested in the message are completed. In at least some embodiments, a given message may indicate a validity period 928. For example, if a message requests operation X to be performed and has a validity period expiring at 10:00:00 AM, and a recipient encounters the journal entry containing that message at 10:01:00 AM, the recipient may ignore the request in view of the expiration of the validity period. It is noted that some or all of the message elements indicated in FIG. 9 may not be used in some embodiments, while other elements may be included in at least some embodiments.

Multi-Recipient Transactional Messages

As indicated earlier, a given message indicated in a committed transaction entry of a journal may be read by multiple subscribers in at least some embodiments. In some cases, as shown in FIG. 9, the sender of the message may intend that multiple recipients read and act on the message, and may even indicate a list of intended recipients. In other cases, the sender may not indicate any preferences regarding the set of recipients, and the message may simply be made available to any of a set of subscribers which have been registered as journal entry consumers.

Figure 10:
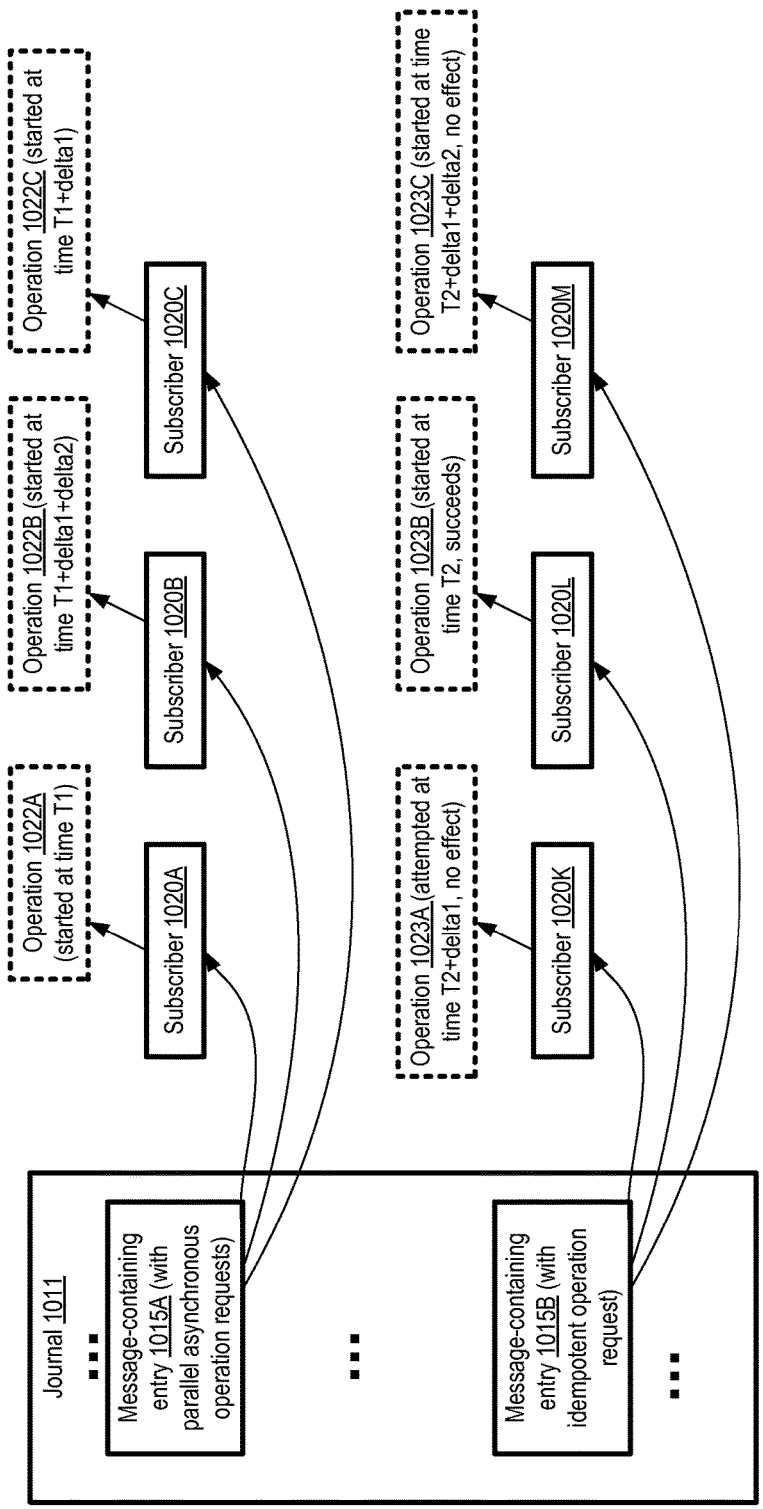
FIG. 10 illustrates examples of parallel and idempotent requests which may be processed using transactional messages, according to at least some embodiments.

FIG. 10 illustrates examples of parallel and idempotent requests which may be processed using transactional messages, according to at least some embodiments. Message-containing entry 1015A of journal 1011 indicates a plurality of operation requests. While the sender of the message may not have precise control over the timing of the operations performed by the recipients, due to the asynchronous processing of journal entries by subscribers, the sender may be willing to have the operations performed in parallel (or with some degree of overlap in time). In some embodiments, the sender may actually indicate, within the message, that individual ones of the operations can be performed in any order and/or at any time relative to the other operations. Three subscribers 1020A, 1020B and 1020C read the message-containing entry 1015A (asynchronously with respect to each other) as part of their sequential processing of the journal 1015A. Subscriber 1020A starts one of the requested operations, 1022A, at a time T1. Subscriber 1020C starts another of the requested operations, 1022C, shortly thereafter, e.g., at a time (T1+delta1). Subscriber 1020B starts a third operation, 1022B, at (T1+delta1+delta2). By indicating a plurality of operations or tasks in a single transactional message which can be read by and acted upon by multiple recipients in an overlapping manner, many types of parallel workflows may be implemented using a journal-based database.

In some cases, the operation to be performed may be idempotent, such that multiple attempts to perform the task may have the same net effect as a single successful attempt to perform the task. Entry 1015B of journal 1011 contains a request for such an idempotent operation. In the depicted example, three subscribers 1020K, 1020L and 1020M all read the entry 1015A asynchronously with respect to one another, and each subscriber tries to perform the requested operation. Subscriber 1020L attempts the operation 1023B at time T2, and succeeds. Subscribers 1020K and 1020M attempt their versions of the operation (1023A and 1023C respectively) at slightly later times ((T2+delta1), and (T2+delta1+delta2) respectively). Because the operation is idempotent and the attempt by 1020L succeeded, the attempts by 102K and 1020M have no net effect.

In various embodiments, the sender of a transactional message may take application-dependent actions to deal with scenarios in which multiple subscribers may at least in theory have access to the message. In one approach appropriate for some applications, the sender may identify specific subscribers that are assigned respective operations, or set the permissions on the message in such a way that only the intended recipients can read the message. In another approach suitable for other applications, the sender may request only idempotent operations, so that it does not matter how many different recipients act upon the message. In some embodiments, a message sender may be able to request (e.g., via security/permissions metadata 924 shown in FIG. 9) that contents of a given message should be provided to no more than one subscriber.

Journal Schemas

Figure 11:
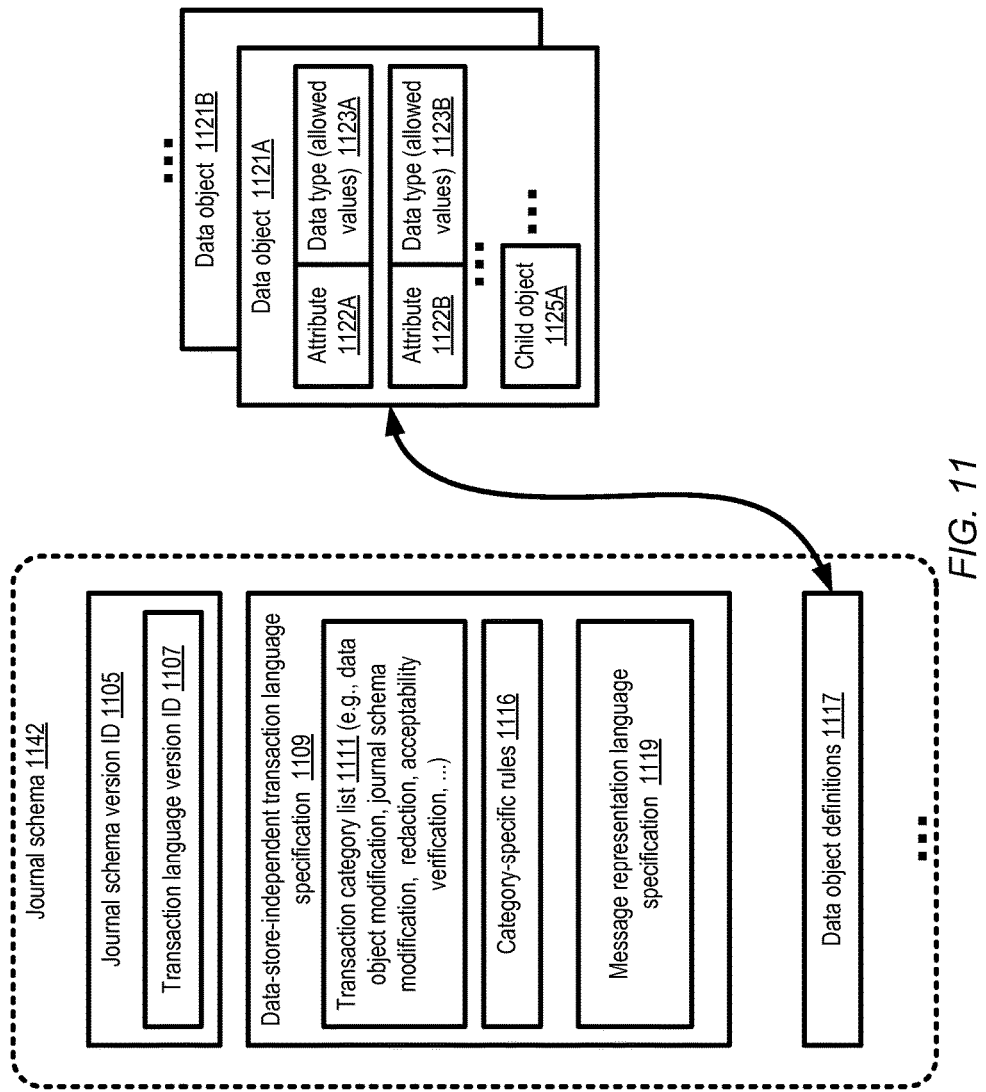
FIG. 11 illustrates examples of elements of a journal schema which may be used at a multi-data-store storage system, according to at least some embodiments.

As mentioned earlier, in various embodiments a journal schema may control the kinds of operations that are permitted in a journal-based database. FIG. 11 illustrates examples of elements of a journal schema which may be used at a multi-data-store storage system, according to at least some embodiments. As shown, a journal schema 1142 may contain a version identifier 1105 in some embodiments. New versions of the journal schema may take effect after approval by some or all nodes (e.g., materialization nodes and/or message subscriber nodes) of the storage system in various embodiments. In at least one embodiment, a journal schema 1142 may include a specification 1109 of a data-store-independent transaction language, which is to be used for preparing transaction requests submitted to a journal manager. In some embodiments, the transaction language may have its own separate version number (e.g., because a change to a journal schema version may not necessarily involve a corresponding change to the transaction language). An identifier 1107 of the transaction language version may be included in the journal schema 1142 in such embodiments, e.g., either embedded within the journal schema identifier or as a separate element of the journal schema.

A number of different transaction or state change categories may be supported at the storage system in various embodiments. For example, supported transaction categories in category list 1111 may include data object modifications, journal schema modifications, redactions, acceptability verification requests, acceptability verification responses, and so on. Corresponding to some or all of the categories, a respective set of category-specific rules 1116 may be indicated in the journal schema 1142. Each set of rules 1116 may for example indicate the acceptable syntax (e.g., the types of transaction verbs such as INSERT, DELETE, UPDATE and the like) for the corresponding types of requests, acceptable format(s) in which the requests are to be expressed, and so on. To prepare a given transaction request, in various embodiments a client-side component may use the category-specific rules of the current version of the journal schema for the corresponding transaction category. In the depicted embodiment, the transaction language specification may include a message representation language specification 1119. The message representation language specification may indicate, for example, the required and/or optional elements of transactional messages (such as the requested operations specification, sender identifier, validity period and other elements shown in FIG. 9), the syntax to be used for messages, the character encodings supported, the maximum message length, etc.

Details regarding the names, attributes and attribute values of data objects of the storage system may be provided in a collection of data object definitions 1117. A particular data object such as 1121A may include a collection of attributes 1122 (e.g., attributes 1122A and 1122B), each of which may have a data type 1123 (e.g., 1123A and 1123B) indicating a range or set of allowed values, or some other similar indicator of allowed values. In some embodiments, the range of allowed values may be indicated by the name of the data type—e.g., an "int32" data type may indicate that signed integer values which can be expressed using 32 bits are allowed. In various embodiments, the set of values permitted for a given attribute may be determined using a "maximum overlap" approach with respect to the attribute values permitted at the different member data stores. Some data objects may be organized hierarchically (in parent-child relationships) in at least one embodiment—e.g., data object 1121A may comprise a set of child objects such as 1125A, with each child object having its own attribute set and data types or allowed attribute values. In some embodiments, the data objects 1121 may be considered analogous to tables of relational or non-relational databases, with the attributes 1122 corresponding to table columns. Journal schemas 1142 may comprise additional elements beyond those shown in FIG. 11 in one embodiment, while some of the elements shown in FIG. 11 may not be supported in other embodiments.

In various embodiments, as mentioned above, at least a portion of a journal schema 1142 pertaining to data object definitions 1117 may be based on or derived from a collection of concrete schemas of the member data stores of the storage system. A given data object may be represented using somewhat different attribute data types in the concrete schemas CS1 and CS2 of two member data stores DS1 and DS2 respectively. For example, according to concrete schema CS1, values of attributes Attr1 and Attr2 of a data object may be stored as respective 64-bit integers, and values of attribute Attr3 may be stored as 32-element character arrays. In contrast, at data store DS2, concreate schema CS2 may indicate that Attr1 and Attr2 of the analogous data object are stored as 32-bit integer values, while Attr3 may be stores as a variable-length character array (varchar). The particular details of the attribute values permitted at a given data store may depend on various factors, such as, for example, the limitations on the data types supported at the data store, the choices made by administrators when creating the concrete schemas, and so on. Some popular data stores may only provide support for 32-bit integers, for example for historical reasons, while others may support larger integer ranges.

When generating a journal schema to be shared for transactions associated with both DS1 and DS2, a "maximum overlap" approach towards allowable attribute values may be taken in at least some embodiments. For example, if at least one member data store (e.g., DS2) permits integer values of no more than 32 bits, while all the other data stores (e.g., DS1) support integers of at least 32 bits, then 32-bit integers may be selected for a corresponding integer-valued attribute Attr1 in the journal schema's corresponding data object definition. In this example, an integer represented using 32 bits would be compatible with all the data stores (DS1 and DS2), but an integer expressed using more than 32 bits could not be stored at DS2, so 32 bits represents the maximum common overlap. Similarly, although the varchar version of Attr3 in concrete schema CS2 of DS2 may comprise more than 32 characters, a character array of 32 elements may be used for Attr3 in the journal schema to maintain compatibility with concrete schema CS1 of DS1.

It is noted that in at least some scenarios, the attribute range limitations of a journal schema may not necessarily result from fundamental limitations of the underlying data stores—e.g., it may be the case that character arrays longer than 32 elements may be permitted at DS1, but the data store administrator of DS1 may nevertheless have chosen 32-element arrays as the data types to use for Attr3. In some embodiments, the member data stores may support non-overlapping data types: for example, all numerical quantities at one data store may be stored as objects of type "number", while numerical data types "integer" or "floating-point" may be supported at a different data store. In such scenarios, the journal schema may in some cases define a different data type (e.g., "NumericValue") which represents as much of an overlap as possible between the value ranges of the different data stores' numeric data types.

In various embodiments, the concept of maximal overlap may be also or instead be employed with respect to the set of attributes indicated in the journal schema (i.e., not just for data types or allowable value ranges of the attributes). For example, consider an example scenario in which a given data object in one concrete schema CS1 includes attributes Attr1, Attr2, Attr3 and Attr4, but the corresponding data object of concrete schema CS2 only includes Attr1, Attr2 and Attr3. In such a scenario, Attr4 may be excluded from the journal schema, since values of Attr4 may not be stored in DS2. In some embodiments, a concrete schema of one data store may be modified (e.g., by the corresponding data store administrator) to accommodate data types of other member data stores—for example, in order to accommodate a 64-bit integer attribute of DS1, a combination of two 32-bit integer attributes may be included in a concrete schema of DS2. Of course, additional data object manipulation logic or code may have to be implemented to enable such transformations or extensions—e.g., software routines to convert a 64-bit integer into two 32-bit integers may have to be executed in the above example for each write of the data object.

If the member data stores support different types of data manipulation operations (e.g., different index creation requests), a common set of data manipulation operations that can be supported at all the data stores may be indicated in a transaction language of the journal schema in at least some embodiments. Thus, the approach of including the maximum overlapping functionality of the member data stores in the journal schema may extend to operation syntax in addition to attribute definitions and allowed value ranges.

Just as the data types of various data objects defined in the journal schema may be determined based on the overlap among the data types supported at different materialization nodes, in at least some embodiments the message language specification 1119 may also be based on the common set of message processing capabilities of the different message subscribers. For example, if one message subscriber MS1 includes a module capable of parsing a particular workflow representation language WRL1, while a different message subscriber cannot parse that workflow representation language, the message language specification may not include references to workflow objects formatted in WRL1 in some embodiments. Similarly, the syntax of message-related security or permissions metadata (which may be indicated in the journal schema), and the manner in which that metadata is to be interpreted or used, may have to be approved by all the message subscribers in at least some embodiments. Generally speaking, in at least some embodiments, registered message subscribers may have to agree upon the rules indicated in the journal schema which pertain to transactional messages, and may have to approve any changes to such rules.

Figure 12:
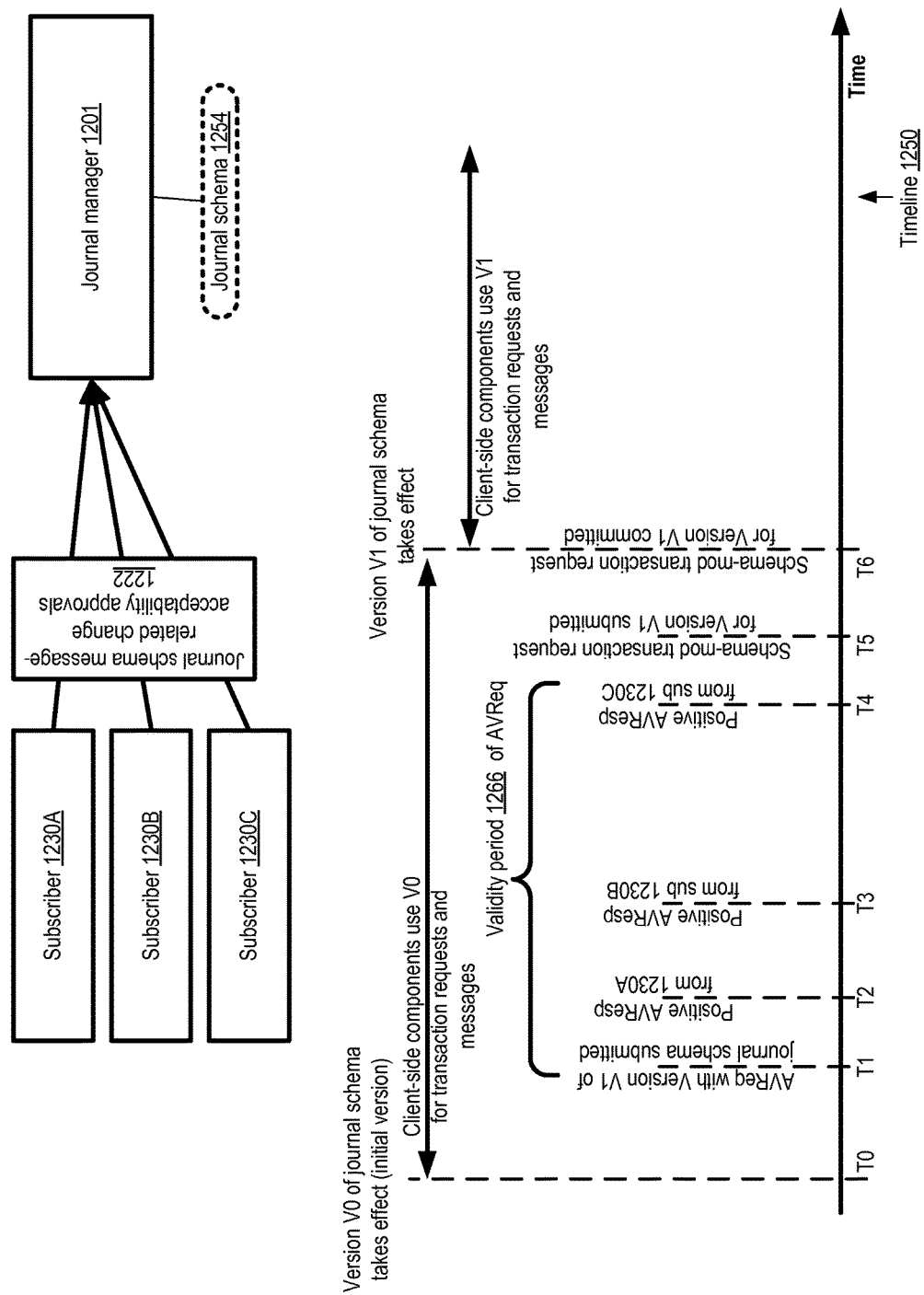
FIG. 12 illustrates an example of a sequence of operations which may be performed to implement a message language-related change to a journal schema, according to at least some embodiments.

In some embodiments, a proactive acceptability verification algorithm may be used with respect to journal schema changes. FIG. 12 illustrates an example of a sequence of operations which may be performed to implement a message language-related change to a journal schema, according to at least some embodiments. The storage system includes three message subscribers 1230A, 1230B and 1230C in the depicted embodiment. The journal manager 1201 is the authoritative source of the version of the journal schema 1254 that is in effect at the storage system at various points in time in the depicted embodiment. Before a new version of the journal schema takes effect, respective acceptability approvals 1222 may have to be received from each of the subscribers 1230 in the depicted embodiment.

Timeline 1250 illustrates a series of events which may occur at the storage system, resulting in messaging-related changes to the version of the journal schema 1254. At a time T0 on timeline 1250, an initial version V0 of the journal schema takes effect. Time T0 may, for example, correspond to an initialization or bootstrapping stage of the multi-data-store storage system, in which each of the data stores and/or message subscribers may be brought online. The initial version of the journal schema may be read in, for example, from a respective configuration parameter file or repository in some embodiments by each of the message subscribers 1230. At time T1, an acceptability verification request AVReq indicating a new version V1 of the journal schema with a changed message language specification may be submitted, e.g., by a client-side component (or by one of the message subscribers). The subscribers 1230B, 1230A and 1230C may respectively indicate, by transmitting respective positive acceptability verification response (AVResp) messages corresponding to AVReq to the journal manager, that the proposed change is acceptable at times T2, T3 and T4 of timeline 250 in the depicted example. The message subscribers 1230 may not make any changes to their local versions of the journal schema at this stage. Meanwhile, the original version V0 may remain in effect.

After all three AVResp message have been detected by the AVReq submitter in the journal, a schema-modifying transaction indicating Version V1 of the journal schema may be submitted to the journal manager at time T5. A corresponding transaction entry indicating that Version V1 has been committed may be inserted into the journal at time T6, at which point Version V1 becomes the effective version of the journal schema. Thus, during the interval between T0 and T6, client-side components may format their transaction requests (e.g., with or without messages) according to version V0. After version V1 of the journal schema takes effect at time T6, client-side components which submit journal version requests to the journal manager 1201 (or to message subscribers or data store managers) may receive responses indicating the new version V1, and may start formatting their transaction requests in accordance with V1. In embodiments in which the client-side components receive their information regarding journal schemas from the data stores rather than from the journal, there may be some delay between T6 (the time at which a commit record entry associated with the journal schema change from V0 to V1 is added to the journal) and the time at which that commit record is applied or processed at the data stores and becomes readable from the data stores. Generally speaking, different data stores may process the commit entry for the journal schema change at different points in time.

In the example illustrated using timeline 1250, the AVReq entry has an associated validity period 1266. If all three AVResps are not added to the journal before period 1266 expires, the submitter of the AVReq may abandon the proposed journal schema change in the depicted embodiment. Thus, an expiration of the validity period of an AVReq before all the targeted responses are received may be considered the logical equivalent of receiving at least one negative AVResp within the validity period in some embodiments. In some embodiments positive responses may not be required from all the message subscribers—instead, a subset of distinguished message subscribers may have to provide positive responses for the submitter of the AVReq to proceed with a transaction request for the proposed journal schema change. It is noted that the submission of the transaction request indicating the schema change (e.g., at time T5 in timeline 1250) may not necessarily guarantee that the schema change is committed. For example, conflict detection analysis performed by the journal manager may reveal that a conflicting schema change has been committed since the transaction request was prepared by the AVReq submitter, in which case the schema change may be rejected instead of being committed.

In some embodiments, other types of changes to the journal schema, such as data object attribute changes which are not message-related, may have to be approved by the various member data store managers of the materialization nodes, using a similar proactive acceptability verification algorithm to that discussed with reference to FIG. 12. In at least one embodiment, all the journal entry consumer nodes (e.g., materialization nodes and message subscriber nodes) may participate in the proactive acceptability verification algorithm. In such an embodiment, data store managers may be required to verify acceptability of message-related journal schema changes as well as journal schema changes unrelated to messages, and similarly, message subscribers may also be required to verify acceptability of both types of journal schema changes. In one embodiment, message-related journal schema changes may be treated differently from other types of journal schema changes—for example, if a proposed journal schema change only affects the message language specification, proactive acceptability verification may not be required for the change.

Journal-Based Transaction Processing Overview

Figure 13:
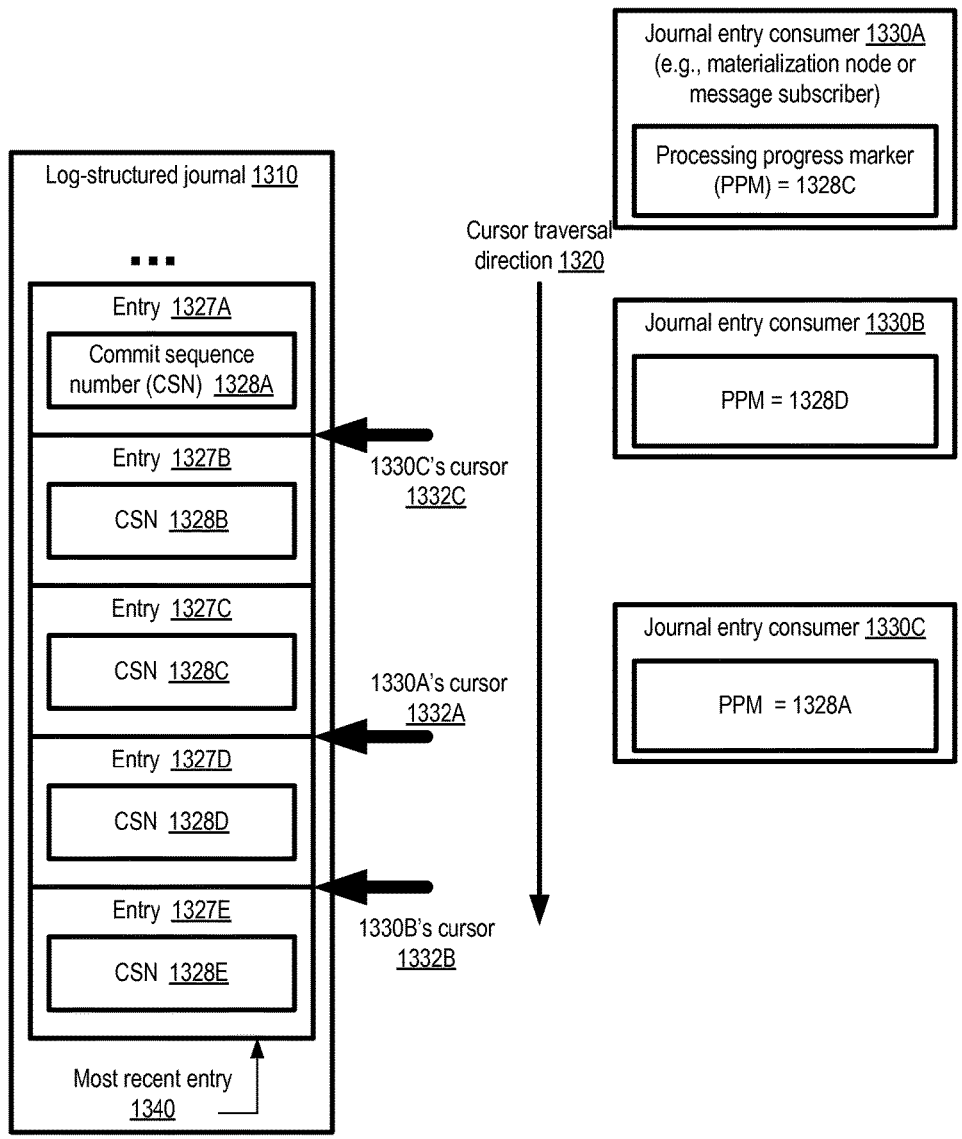
FIG. 13 illustrates an example of asynchronous processing of journal entries by journal entry consumers, according to at least some embodiments.

As mentioned earlier, the materialization nodes of a journal-based database may differ from each other in various characteristics, including for example the rate at which they are capable of processing or applying committed state changes. Similarly, different message subscribers may not process messages at identical rates. In various embodiments, the consumers of the journal entries (e.g., materialization nodes and/or message subscriber nodes) need not always remain synchronized with each other with respect to the replicated state machine represented by the journal set up for the storage system. FIG. 13 illustrates an example of asynchronous processing of journal entries by journal entry consumers, according to at least some embodiments. At a point of time corresponding to FIG. 13, the journal 1310 comprises a plurality of entries 1327 inserted in order of respective commit sequence numbers (CSNs) 1328, with the most recent entry 1340 being entry 1327E with CSN 1328E. The most recent entry may sometimes be referred to as the "head" of the journal.

In effect, each of the journal entry consumers 1330 may maintain a cursor onto the sequence of commit entries of the journal, and process the entries in the order in which the entries were inserted into the journal. For example, cursor 1332A is established for consumer 1330A, cursor 1332B is maintained for consumer 1330B, and cursor 1332C is maintained for consumer 1330C in the depicted example. As mentioned above, in some embodiments write applier components of the storage system may propagate the writes indicated in journal entries to the materialization nodes, and in such embodiments each such write applier may correspond to a cursor of the materialization node to which it propagates the journal entry contents. In contrast to write appliers, message cursors set up for subscribers may not transmit data which has to be materialized at a data store; instead, only the contents of the messages (if any) included in or indicated in the committed transaction entries of the journal may be transmitted to the subscribers. A write applier or a message cursor may be implemented, for example, as a separate process or thread of execution in some embodiments. As indicated by arrow 1320, each of the cursors processes the entries of journal 1310 in the same order, e.g., in increasing order of CSNs 1328 of the entries. At the point of time illustrated in FIG. 13, entries with CSNs up to 1328C have been processed at consumer 1330A, entries corresponding to CSNs up to 1328D have been processed at consumer 1330B, and entries corresponding to CSNs up to 1328A have been processed at consumer 1330C. A respective processing progress marker (PPM) may be stored or maintained at each consumer node in the depicted embodiment, indicating the CSN of the most recent journal entry whose processing has been completed at that node.

Figure 14:
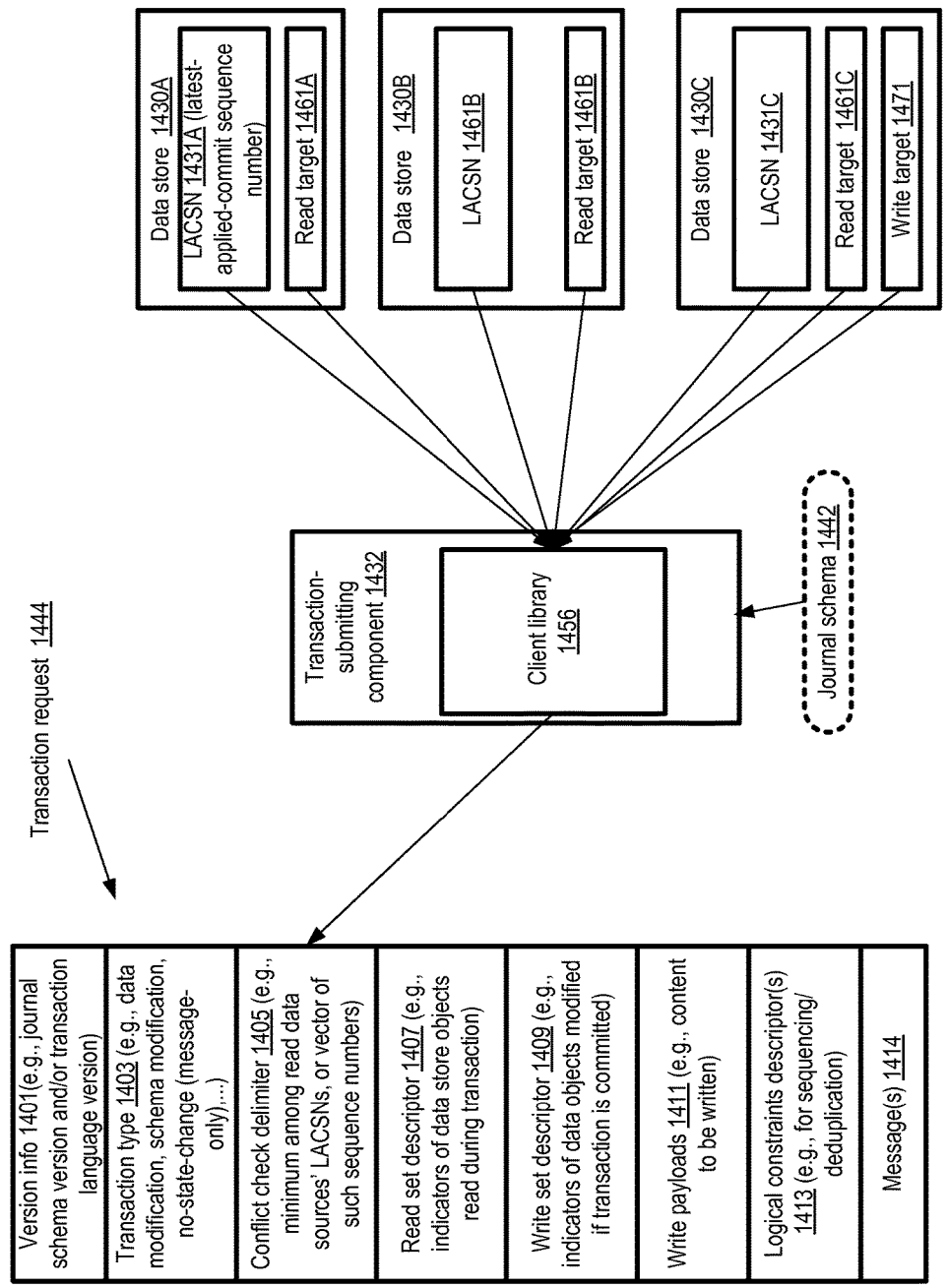
FIG. 14 illustrates an overview of transaction requests which may be submitted to a journal manager of a multi-data-store storage system, according to at least some embodiments.

FIG. 14 illustrates an overview of transaction requests which may be submitted to a journal manager of a multi-data-store storage system, according to at least some embodiments. Generally speaking, transaction requests may be transmitted by client-side components, data store managers and/or by message subscribers in various embodiments. As shown, transaction request 1444 may include some combination of versioning information 1401, a transaction type indicator 1403, a conflict check delimiter 1405, a read set descriptor 1407, a write set descriptor 1409, write payload(s) 1411, logical constraint descriptors 1413 and/or one or more message(s) 1414 in the depicted embodiment.

In the depicted embodiment, a transaction-submitting component 1432 may comprise a client library 1456 which may be utilized to assemble or prepare the transaction request. In at least some embodiments, the client library may automatically record information about the read targets 1461A, 1461B, and 1461C (e.g., corresponding to respective data objects whose attribute details are specified in the journal schema 1442) respectively within data stores 1430A, 1430B and 1430C from which data is read during the transaction. In some embodiments, the read set descriptors may be generated by applying transformation functions (e.g., hash functions) to the read queries. In various embodiments, information about the write target 1471 (of data store 1430C in the depicted example) to which data is written may also be recorded by the client library 1456, e.g., by applying similar transformation functions to queries whose results may be affected by the writes. In some implementations, the client library 1456 may also obtain, from each of the data stores 1430, a corresponding latest-applied commit sequence number (LACSN) 1431 (e.g., 1431A-1431C) of the most recent transaction whose writes have been applied at the data store. In one embodiment, such LACSNs 1431 may be retrieved before any of the reads of the transaction are issued to the corresponding data stores, for example. In another embodiment, the LACSNs 1431 may be retrieved from a given data store 1430 just before the first read that is directed to that data store within the current transaction is issued. In some embodiments, the client library 1456 may include an acceptability verification enforcement module. Such a module may check, before a certain type of transaction request (such as a journal schema modifying transaction) is transmitted to the journal manager, that the acceptability of the change(s) indicated in the transaction has been verified using the protocol described above.

In the depicted embodiment, the version number of the journal schema 1442 and/or the version number of the data-store independent transaction language being used for the transaction request 1444 may be indicated in version information fields 1401. In some embodiments, the transaction category (e.g., data object modification, journal schema modification, redaction, acceptability verification request, acceptability verification response, etc.) may be indicated in a separate transaction type field 1403. In at least one embodiment, transactions requests that include one or more messages, but do not indicate a proposed state change for which a write is to be applied or materialized, may also be supported. The transaction type of such requests may be set to "message-only" or "no-state-change" in the depicted embodiment. In some embodiments, the request type may be implicit rather than explicit, e.g., the type of state change being requested may be apparent based on the write set descriptor and/or other elements of transaction request 1444. The conflict check delimiter 1405 may be derived from a function to which the LACSNs 1431 are provided as input in some embodiments. For example, in one implementation, the minimum sequence number among the LACSNs obtained from all the data stores read during the transaction may be used. In another implementation, a vector or array comprising the LACSNs from each of the data stores may be included as the conflict check delimiter 1405 of the transaction request descriptor. The conflict check delimiter 1405 may also be referred to herein as a committed state identifier, as it represents a committed state of one or more data stores upon which the requested transaction depends.

As mentioned earlier, in some embodiments, transformation functions may be applied to read queries to generate the read set descriptor 1407, and/or similar transformation functions may be applied to write-affected queries (a set of queries whose results may be affected by the proposed writes) to generate write set descriptor 1409 in various embodiments. In some embodiments, instead of the query-based transformation, a selected transformation function may instead be applied to the locations/addresses of the read targets to obtain a set of hash values to be included in read descriptor 1407. Similarly, a selected transformation function (either the same function as was used for the read descriptor, or a different function, depending on the implementation) may be applied to the location of the write(s) of a transaction to generate the write set descriptor 1409 in some embodiments. In another embodiment in which read set descriptors and/or write set descriptors are generated based on locations rather than query contents, hashing may not be used; instead, for example, an un-hashed location identifier may be used for each of the read and write set entries. The write payload 1411 may include a representation of the data that is to be written for each of the writes included in the transaction. Logical constraints 1413 may include signatures used for duplicate detection/elimination and/or for sequencing specified transactions before or after other transactions in some embodiments. Message(s) 1414 may include elements similar to those illustrated in FIG. 9 in the depicted embodiment, and may be formatted according to the message language specification indicated in the current version of the journal schema 1442. Some or all of the contents of the transaction request descriptor 1444 may be stored as part of the journal entries (e.g., committed transaction records) in some embodiments.

It is noted that the read and write targets from which the read set descriptors and/or write set descriptors are generated may represent different storage granularities, or even different types of logical entities, in different embodiments or for different data stores. For example, for a data store comprising a non-relational database in which a particular data object is represented by a combination of container name (e.g., a table name), a user name (indicating the container's owner), and some set of keys (e.g., a hash key and a range key), a read set may be obtained as a function of the tuple (container-ID, user-ID, hash key, range key). For a relational database, a tuple (table-ID, user-ID, row-ID) or (table-ID, user-ID) may be used. In various embodiments, the journal manager may be responsible, using the contents of a transaction request and the journal, for identifying conflicts between the reads indicated in the transaction request and the committed writes indicated in the journal.

Figure 15:
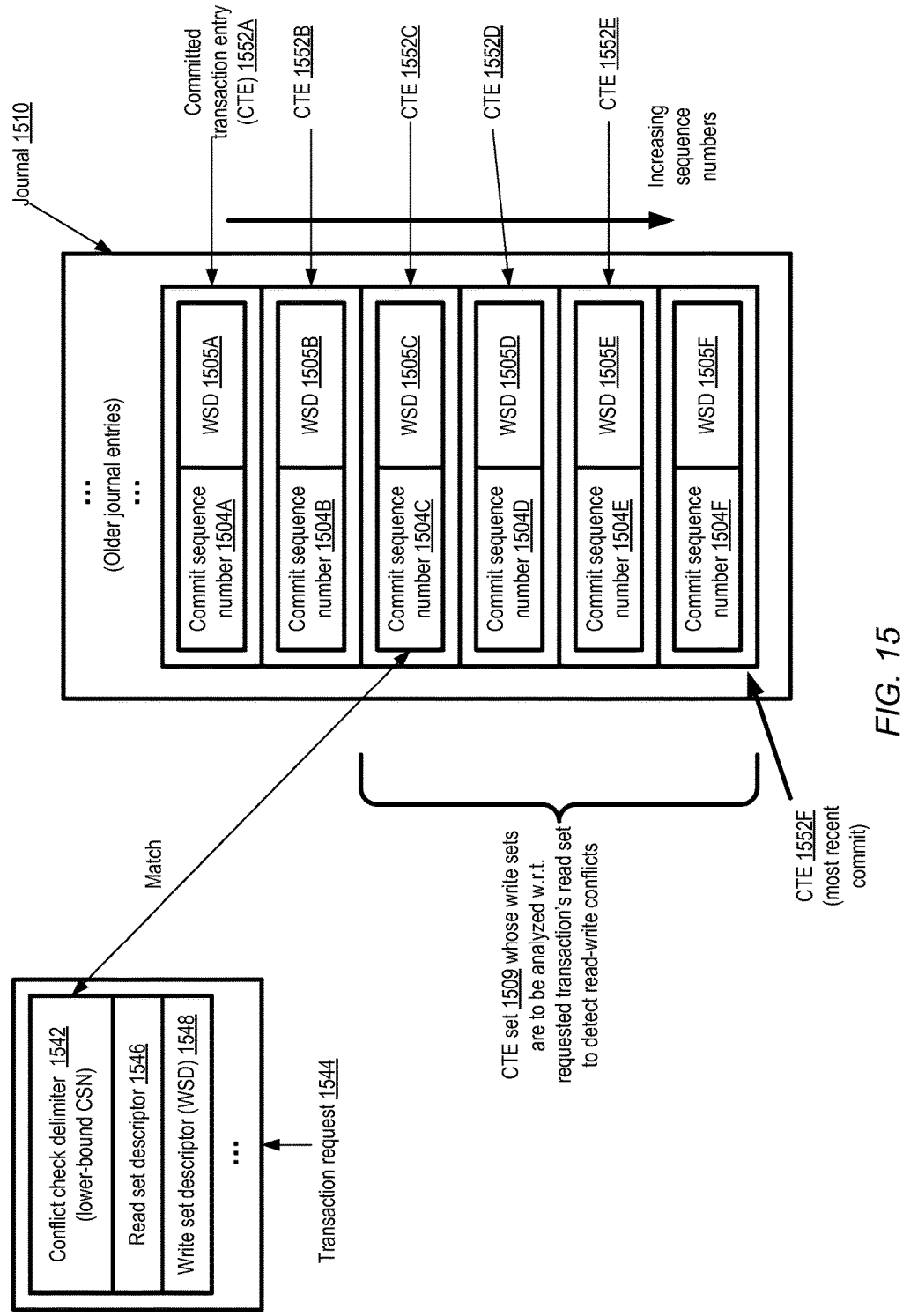
FIG. 15 illustrates an overview of conflict detection operations which may be performed by a journal manager, according to at least some embodiments.

FIG. 15 illustrates an overview of conflict detection operations which may be performed by a journal manager, according to at least some embodiments. Such operations may be performed for a subset of the transaction categories supported in various embodiments independently of whether the transactions include messages, such as data object modification transactions and/or journal schema modification transactions. Conflict detection may not be required for other transaction categories such as acceptability verification requests/responses or redactions in some embodiments. In the depicted example, committed transaction entries (CTEs) 1552 stored at journal 1510 are shown arranged in order of increasing commit sequence numbers from the top to the bottom of the figure. The latest or most recently committed transaction is represented by CTE 1552F, with commit sequence number (CSN) 1504F and write set descriptor (WSD) 1505F. Each of CTEs 1552A, 1552B, 1552C, 1552D and 1552E comprises a corresponding CSN 1504 (e.g., CSNs 1504A-1504E respectively) and a corresponding WSD 1505 (e.g., WSDs 1505A-1505E).

As shown, transaction request 1544 includes a conflict check delimiter (or committed state identifier) 1542, a read set descriptor 1546 and a write set descriptor 1548. (The write payload, any messages that may have been included, and various other elements of the requested transaction such as the elements discussed in the context of FIG. 14, are not shown in FIG. 15). The conflict detector of the journal manager may be required to identify a set of CTEs of journal 1510 that are to be checked for conflicts with the read set of the requested transaction. The conflict check delimiter 1542 indicates a lower-bound CSN that may be used by the conflict detector to identify the starting CTE of set 1509 to be examined for read-write conflicts with the requested transaction in the depicted embodiment, as indicated by the arrow labeled "Match". Set 1509 may include all the CTEs starting with the matching sequence number up to the most recent committed transaction (CTE 1552F) in some embodiments. If any of the writes indicated by the CTE set 1509 overlap with any of the reads indicated in the transaction request 1544, such a read-write conflict may lead to a rejection of the requested transaction. A variety of algorithms may be used to check whether such an overlap exists in different embodiments. In one embodiment, for example, one or more hashing-based computations or probes may be used to determine whether a read represented in the read set descriptor 1546 conflicts with a write indicated in the CTE set 1509, thereby avoiding a sequential scan of the CTE set. In some implementations, a sequential scan of CTE set 1509 may be used, e.g., if the number of records in the CTE set is below a threshold. If none of the writes indicated in CTE set 1509 overlap with any of the reads of the requested transaction, the transaction may be accepted, since none of the data that were read during the preparation of the transaction request can have changed since they were read. In at least one embodiment, a transaction request may also indicate an upper bound on the sequence numbers of journal entries to be checked for conflicts—e.g., the conflict check delimiter may indicate both a starting point and an ending point within the set of CTEs 1552.

Figure 16:
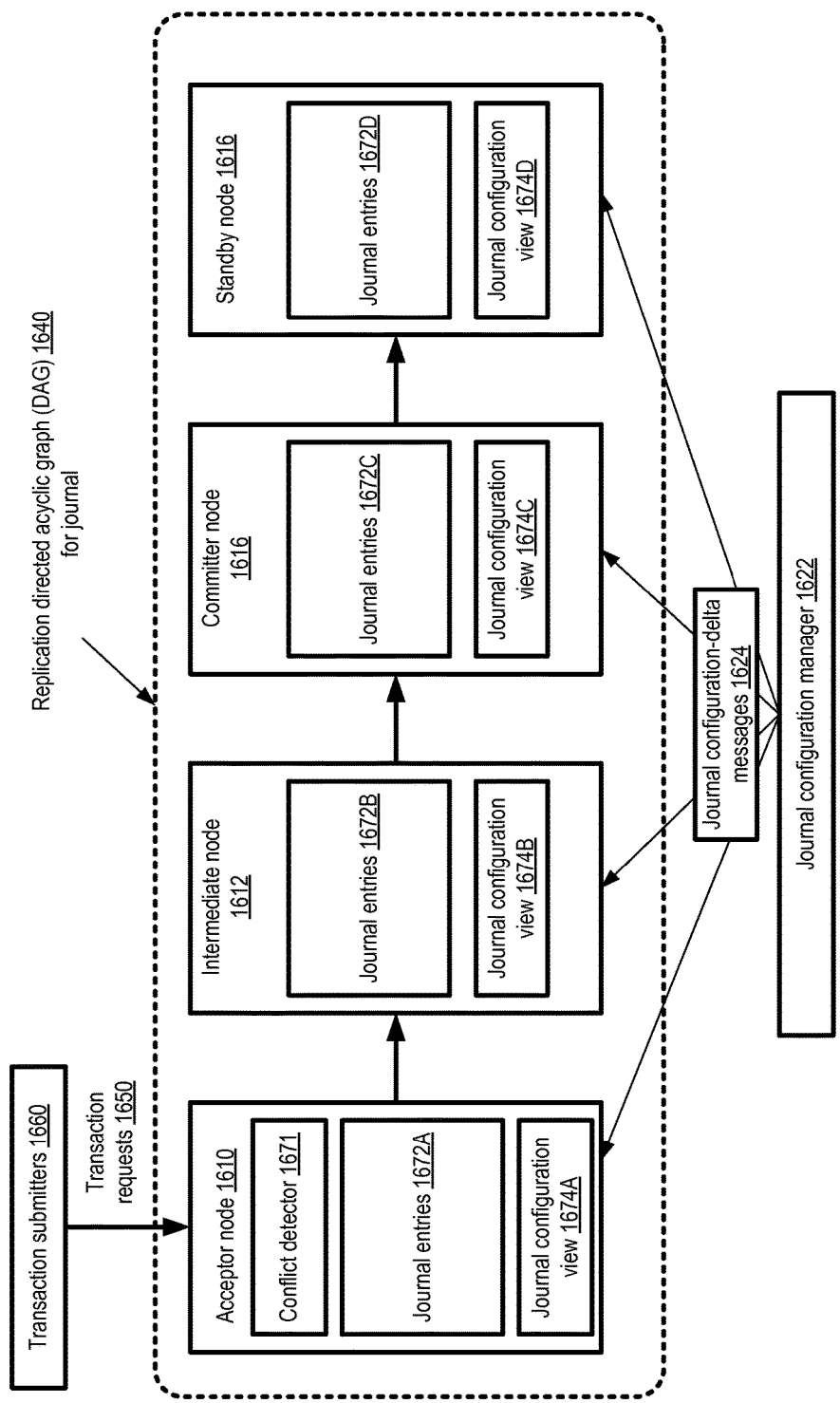
FIG. 16 illustrates an example replication directed acyclic graph (DAG) which may be used to implement a journal of a multi-data-store storage system, according to at least some embodiments.

In some embodiments, the journal of a multi-data-store storage system may be replicated for enhanced data durability and/or higher levels of availability. FIG. 16 illustrates an example replication directed acyclic graph (DAG) which may be used to implement a journal of a multi-data-store storage system, according to at least some embodiments. In general, a replication DAG 1640 may include one or more acceptor nodes 1610 to which transaction requests 1650 may be submitted by submitters 1660 (such as client-side components or data store managers), one or more committer nodes 1614, zero or more intermediary nodes 1612 each positioned along a replication pathway comprising DAG edges leading from an acceptor node to a committer node, and zero or more standby nodes 1616 that are configured to quickly take over responsibilities of one of the other types of nodes in the event of a node failure. In the embodiment depicted in FIG. 16, the acceptor node includes a conflict detector 1671 of the journal manager. In other embodiments, instead of being incorporated within an acceptor node, the conflict detector may be implemented separately.

In at least some embodiments, each node of a particular replication DAG such as 1640 may be responsible for replicating journal entries. The journal entries may be propagated along a set of edges from an acceptor node to a committer node of the DAG along a replication pathway. In FIG. 16, the current replication pathway starts at acceptor node 1610, and ends at committer node 1614 via intermediary node 1612. For a given journal entry (e.g., an entry indicating a committed data object modification, a committed journal schema change, an acceptability verification request or response, or a redaction entry) with or without a message, one replica may be stored at each of the nodes along the replication path, e.g., in journal entries 1672A, 1672B and 1672C. Each journal entry propagated within the DAG may include a respective sequence number or a logical timestamp that is indicative of an order in which the corresponding transaction request was processed (e.g., at the acceptor node 1610). When a particular journal entry reaches a committer node, e.g., after a sufficient number of replicas of the entry have been saved along the replication pathway, the corresponding transaction may be explicitly or implicitly committed. If for some reason a sufficient number of replicas cannot be created, the journal entries may be logically and/or physically removed (e.g., by setting a "removed" flag) in some embodiments from the nodes (if any) at which they have been replicated thus far. After a commit, the writes of a transaction (if any writes were part of the transaction) may be propagated or applied to a set of destinations (such as storage devices at which the contents of the member data stores are located) as described earlier, e.g. by respective write appliers. Similarly, if the entry included one or more messages, those messages may be read by registered message subscriber nodes. In some implementations, only a subset of the DAG nodes may be read in order to propagate committed writes or messages to their destinations. In other embodiments, journal entries may be read from any of the DAG nodes. In at least one embodiment, write appliers or message cursors may be implemented as respective threads or processes that may run at the same hosts at one or more of the DAG nodes. In other embodiments, write appliers and/or message cursors may run on different hosts than the DAG nodes. A journal entry may also be transmitted eventually to standby node 1616, and a replica of it may be stored there after it has been committed, so that the standby node 1616 is able to replace a failed node of the DAG quickly if and when such a failover becomes necessary.

A journal configuration manager 1622 may be responsible for managing changes to DAG configuration (e.g., when nodes leave the DAG due to failures, or join/re-join the DAG) by propagating configuration-delta messages 1624 asynchronously to the DAG nodes in the depicted embodiment. Each configuration-delta message may indicate one or more changes to the DAG configuration that have been accepted or committed at the journal configuration manager 1622. In some embodiments, each replication node may implement a respective deterministic finite state machine, and the journal configuration manager may implement another deterministic finite state machine.

The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for transition record propagation may work correctly even if some of the nodes along a replication pathway have a different view of the current configuration of the journal DAG than other nodes. In FIG. 16, each of the nodes may update its respective journal configuration view 1674 (e.g., 1674A, 1674B, 1674C or 1674D) based on the particular sequence of configuration-delta messages it has received from the configuration manager 1622. It may thus be the case, in one simple example scenario, that one node A of a DAG 1640 continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The configuration manager may not need to request the DAG nodes to pause processing of transactions and corresponding journal entries in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein to implement persistent journals for distributed transaction management. Although a linear replication pathway is shown in FIG. 16, in general, a replication pathway may include branches at least at some points of time (e.g., during periods when some DAG nodes have received different configuration delta messages than others). Under most operating conditions, the techniques used for propagating DAG configuration change information may eventually result in a converged consistent view of the DAG's configuration at the various member nodes, while minimizing or eliminating any downtime associated with node failures/exits, node joins or node role changes. It is noted that in some embodiments, journal entries may be stored without using the kinds of replication DAGs illustrated in FIG. 16.

In at least some embodiments, the nodes of a replication DAG may each be implemented as a respective process or thread running at a respective host or hardware server. The hosts themselves may be physically dispersed, e.g., within various data centers of a provider network. In one embodiment, a provider network at which journal-based transactions are implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. In some such embodiments, one or more nodes of a replication DAG 1640 may be implemented at a different availability container than other nodes of the replication DAG, thereby increasing the robustness and durability of the journal.

Methods for Supporting Transactional Messages

Figure 17:
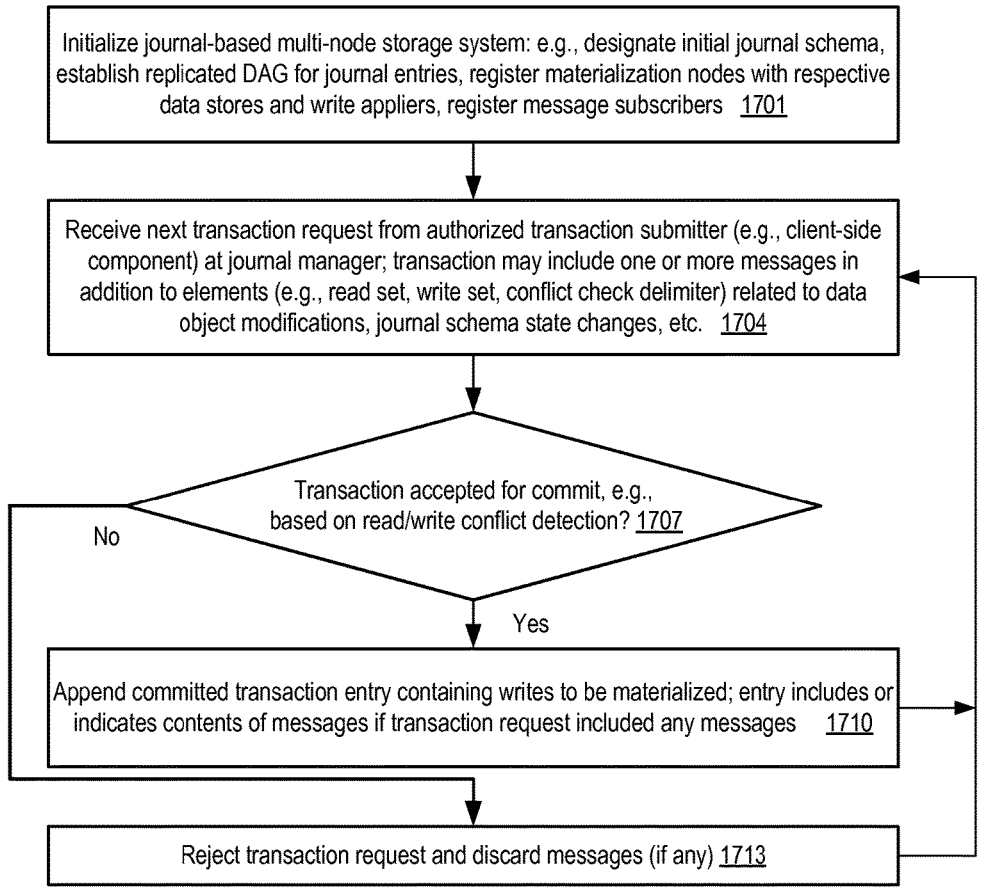
FIG. 17 is a flow diagram illustrating aspects of operations that may be performed by a journal manager of a multi-data-store storage system at which transactional messages are supported, according to at least some embodiments.

FIG. 17 is a flow diagram illustrating aspects of operations that may be performed by a journal manager of a multi-node storage system at which transactional messages are supported, according to at least some embodiments. The storage system may be initialized (element 1701), for example, by registering an initial group of materialization nodes and an initial group of message subscriber nodes, designating an initial version of a journal schema, establishing a replicated DAG for the journal entries, instantiating a journal manager, and setting up journal entry processors (such as write appliers and message cursors), initializing processing progress markers (PPMs) and the like. Each of the member data stores of the materialization nodes may have a respective concrete schema specifying characteristics of the data objects on which transactions are to be managed using the journal, and the journal schema may be based at least in part on the various concrete schemas of the members. The set or range of values allowed for various data object attributes in the journal schema may be selected to maximize the overlap between the value ranges permitted by the concrete schemas. The journal schema may also include or reference a specification of a data-store-independent transaction language to be used to submit transactions of various categories, e.g., data object modification transactions, journal schema modification transactions, redaction transactions, and the like. In at least some embodiments, the journal schema may indicate a message language specification, indicating for example the syntax in which message are to expressed within the transaction requests, any fields or elements that are required in the message, and/or optional fields. The rules related to message syntax may be selected such that all the registered message subscribers are capable of processing messages formulated in accordance with the rules. In various embodiments, if a new message subscriber is registered after the storage system is initialized, e.g., as a result of a programmatic request, the new subscriber may have to verify that it is capable of processing messages expressed in the message language indicated in the journal schema. In some embodiments, any changes proposed to the message language specification may have to be pre-approved by at least a subset of the message subscribers, e.g., using an acceptability verification algorithm of the kind discussed in the context of FIG. 12.

After the storage system has been initialized, transaction requests may be directed to the journal manager, e.g., by authorized transaction submitters such as client-side components. The journal manager may receive a particular transaction request (element 1704), containing one or more proposed writes, a read set descriptor indicating one or more data objects which were read during the preparation of the transaction request (and therefore may have determined the contents of the writes), a conflict check delimiter to be used during commit analysis, and a message to be stored in the journal in the event that the transaction request is accepted for commit. The proposed writes may be directed, for example, to a data object and/or to the journal schema. The message may include a request for one or more operations or tasks. In some cases, the requested operations may include at least one operation on an object modified by the proposed writes of the transaction request, although such a relationship between the writes and the operations may not be required. For example, in a scenario in which the multi-node journal-based storage system is being used to manage the state of guest virtual machines (GVNs) of a virtualized computing service, the write may indicate that the pre-launch configuration operations of a particular GVM have been completed, and the requested operation may include booting/launching the GVM.

The journal manager may perform commit analysis on the received transaction. The commit analysis may include, for example, identifying a subset of committed transaction entries of the journal based on the conflict check delimiter indicated in the transaction request, and determining whether a read-write conflict exists between the read set of the transaction request and the write set descriptors of the subset of committed transaction entries. If the transaction request is accepted for commit (as detected in element 1707), the journal manager may append a new committed transaction entry to the journal (element 1710). The new entry may include an indication of various elements of the transaction request, including for example a write set descriptor, the contents of the writes which are to be materialized at one or more materialization nodes, and the message, which may be read by one or more message subscribers. If the transaction request is not accepted for commit, the transaction request may be rejected (and the message contained in the transaction request may be discarded) without appending an entry to the journal (element 1713). The journal manager may repeat operations corresponding to elements 1704 onwards for each received transaction request. In at least some embodiments, the journal manager or a control plane component of the storage system may implement one or more programmatic interfaces to enable additional message subscribers and/or additional materialization nodes to be registered over time. Similar programmatic interfaces may also be used to unregister message subscribers and/or materialization nodes as needed in various embodiments.

Figure 18A:
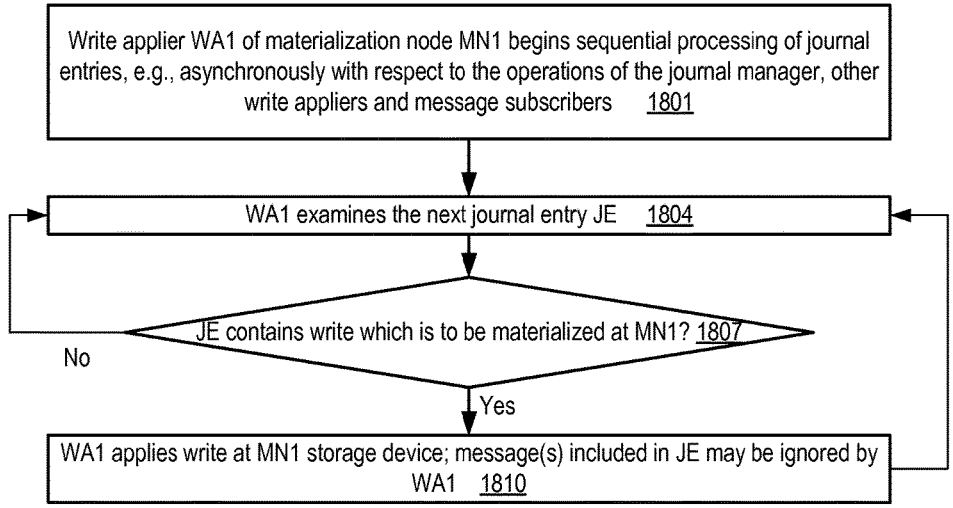
FIG. 18a and FIG. 18b are flow diagrams respectively illustrating aspects of operations that may be performed at a write applier of a multi-data-store storage system, and a message subscriber of the multi-data-store storage system, according to at least some embodiments.
Figure 18B:
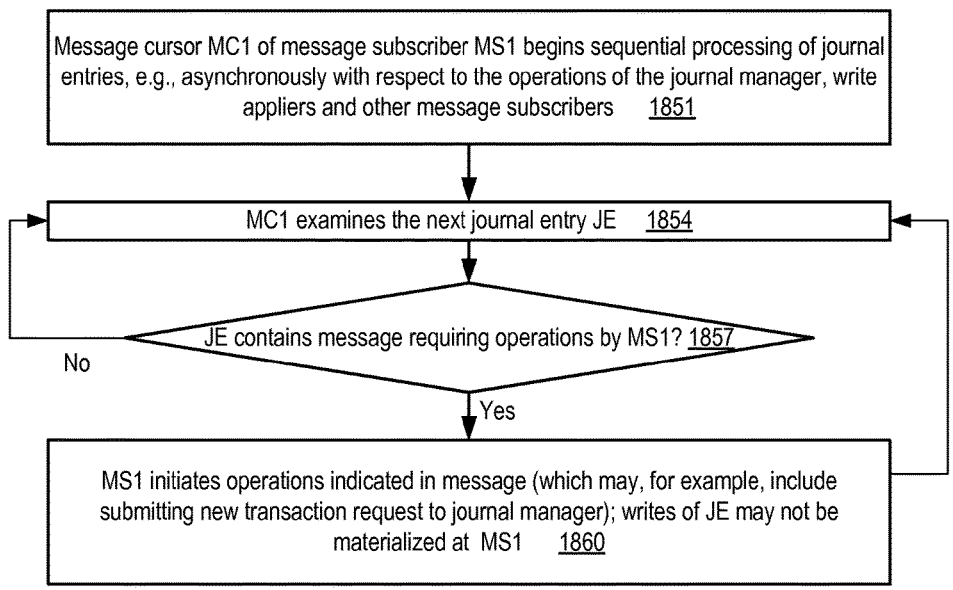

As discussed earlier, various components of a journal-based multi-node storage system may operate asynchronously with respect to each other. The appending of committed transaction entries to the journal by the journal manager based on commit analysis decisions may proceed independently of the reading of the journal entries by consumers such as materialization nodes' write appliers and message subscribers' message cursors. FIG. 18a and FIG. 18b are flow diagrams respectively illustrating aspects of operations that may be performed at a write applier of a multi-node storage system, and a message subscriber of the multi-node storage system, according to at least some embodiments. As shown in element 1801 of FIG. 18a, a write applier WA1 of a particular materialization node MN1 may begin its sequential processing (e.g., in commit sequence number order) of the journal entries asynchronously with respect to the operations of the journal manager, other write appliers and/or message cursors. WA1 may examine the next committed transaction entry JE of the journal (element 1804) as part of its sequential analysis. If JE comprises a write which is to be materialized at MN1 (as determined in element 1807), that write may be applied at the appropriate storage device (element 1810). In at least some cases, messages included in JE may be ignored by the write applier. In some embodiments, a given node of the storage system may be designated as both a message subscriber and a materialization node, in which case a message contained in JE may be analyzed and/or acted upon instead of being ignored. Operations corresponding to elements 1804 onwards may then be repeated for the next journal entry. If WA1 has reached the end of the journal, it may wait until a new entry is appended by the journal manager.

As indicated in element 1851 of FIG. 18b, a message cursor MC1 (e.g., a process or thread of execution associated with a message subscriber MS1) may also begin its sequential processing of the journal entries asynchronously with respect to other message cursors, write appliers and the journal manager in the depicted embodiment. MC1 may examine the next committed transaction entry JE of the journal (element 1854). If JE comprises a message indicating an operation request directed at MS1 (as determined in element 1857), MS1 may initiate the requested operation (element 1860). In at least some cases, writes included in JE may be ignored by the message subscriber, e.g., the writes may not be materialized at or by MS1.

Identifier Generation Bottleneck Example

Figure 19:
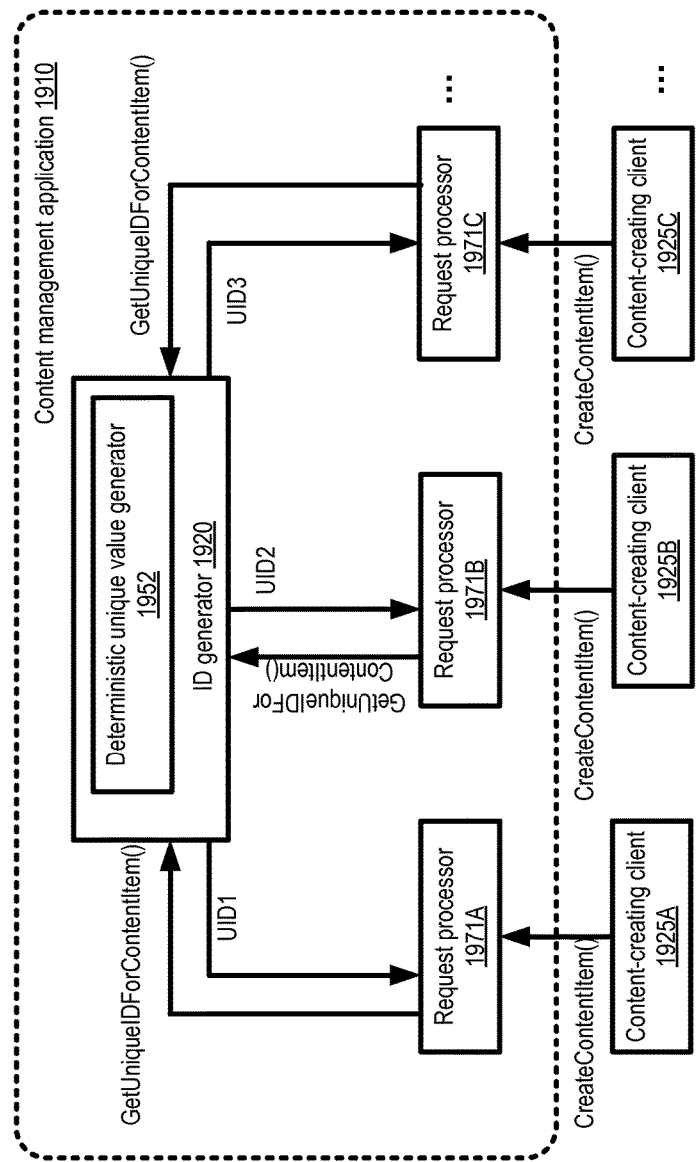
FIG. 19 illustrates an example of an application at which an identifier generator may become a bottleneck, according to at least some embodiments.

In many applications, new unique object identifiers have to be generated and assigned fairly frequently. The components responsible for keeping track of the set of identifiers which have already been assigned, and/or for generating new identifiers based on the previously-assigned identifiers, may have to handle very high request rates. FIG. 19 illustrates an example of an application at which an identifier generator may become a bottleneck, according to at least some embodiments. Content management application 1910 includes an identifier generator 1920. Application 1910 may have numerous clients, including content-creating clients 1925A-1925C, each of which may submit content creation requests (e.g., requests to create social media data objects such as status updates, comments, responses, and the like) using the logical equivalent of "CreateContentItem( )" API calls. In a distributed environment, tens or hundreds of thousands of content-creating clients may be active at the same time.

The requests to create new content items may be received by a plurality of request processors 1971, such as 1971A, 1971B and 1971C. Within application 1910, each new item that is created may have to be assigned a new unique identifier. At least a portion of the identifier may be obtained using a deterministic unique value generator 1952, such as an integer counter, at ID (identifier) generator 1920. In response to each request (e.g., via an invocation of a respective "GetUniqueIDForContentItem( )" API) for a unique identifier, for example, the next value may be obtained from generator 1952 and incorporated within (or provided as) the identifier. For example, in one implementation, the unique IDs (UIDs) may be generated in the format "ID<integer>", with the value of the <integer> portion being obtained from the unique value generator 1952. In such an implementation, UID1 may be set to "ID917361", for example, with UID2 set to "ID917362" and UID3 set to "ID917363". To generate a new identifier, the previous value produced by generator 1952 may be incremented in the above example. In order to ensure that the IDs UID1, UID2 and UID3 are unique, the equivalent of a lock may have to be obtained on the deterministic value generator 1952. As the number of concurrent requests increases, contention for such a lock may increase, and the process of generating identifiers may become a bottleneck. It is noted that, as far as the application 1910 is concerned, the essential characteristic of the identifiers returned by the ID generators is that they be unique for each "GetUniqueIDForContentItem( )" request; that is, the actual values assigned to the identifiers may not matter as much as their uniqueness.

Example System with Deferred Assignments

As discussed above, in journal-based systems, the materialization of data objects (performed, for example, by write appliers of various materialization nodes) may be separated from the authoritative record of state changes to the data objects (which is maintained as a collection of commit records appended to the journal). In at least some embodiments, when submitting a transaction request to the journal, where the transaction requires the generation of a unique identifier or some other value whose desired properties can be specified, the transaction submitter may decide to simply describe how the desired value is to be obtained, and leave the task of determining the actual value to the materialization nodes where the value is to be stored. Such an approach can potentially be helpful in avoiding the kind of contention discussed with respect to FIG. 19, as explained below in further detail. For example, instead of determining an actual value XYZ for an attribute Object1.Attr1 itself, and submitting a transaction request with the write "set Object1.Attr1 to XYZ", a client-side component may submit a transaction request with the directive "set Object1.Attr1 to the next value obtained according to rule R1", where the rule R1 is considered part of the replicated state of the database and is therefore implemented in a consistent manner at various nodes. If the transaction is accepted for commit, the directive may be included in the committed transaction entry appended to the journal, and the directive may be propagated to the materialization node(s) where Object1.Attr1 is stored. As long as the materialization nodes obey rule R1 in this example, an appropriate value would be assigned to Object1.Attr1 by the materialization node, instead of the transaction submitter or the journal manager. The rules for obtaining the value may be implemented at respective deterministic value generators at the materialization nodes (e.g., by using respective local value generator replicas at each of the materialization nodes). Because the journal's entries are processed one at a time at any given materialization node, contention for the deterministic value generator at that node would not occur, thereby avoiding the kinds of locking-related problems alluded to with respect to FIG. 19. Decoupling the assignment of attribute values from the preparation of transaction requests using such techniques may help increase the throughput for many types of applications in various embodiments.

Figure 20:
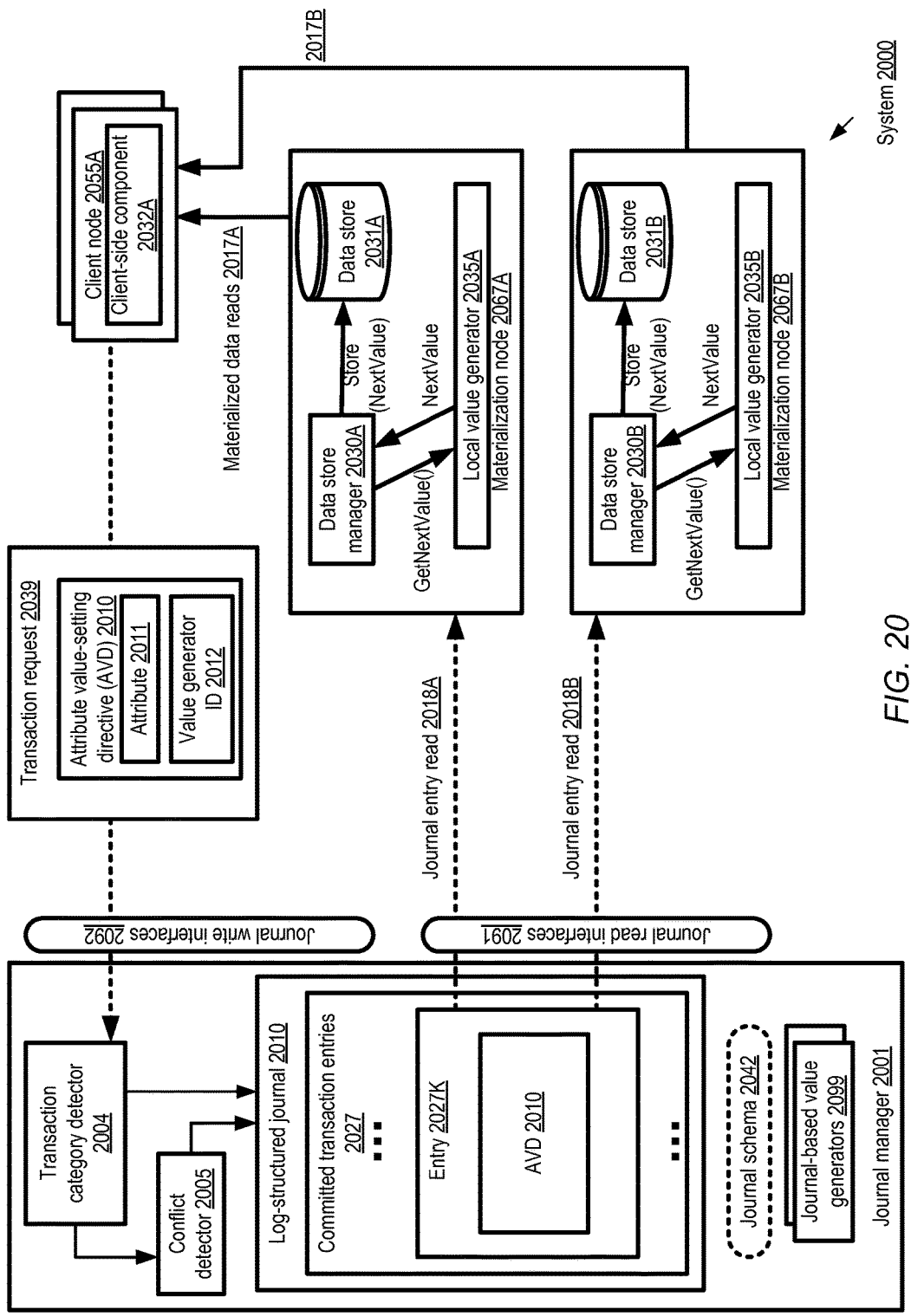
FIG. 20 illustrates an example system environment in which an attribute-value setting directive requesting a use of a deterministic value generator may be included in a transaction request to a journal-based multi-data-store database, according to at least some embodiments.

FIG. 20 illustrates an example system environment in which an attribute-value setting directive requesting a use of a deterministic value generator may be included in a transaction request to a journal-based multi-data-store database, according to at least some embodiments. As shown, system 2000 comprises a journal manager 2001 of a log-structured journal 2010 of a multi-data-store database. Materialization nodes 2067A and 2067B may have been registered as consumers or reader of journal entries, e.g., with respective write appliers which examine the committed transaction entries 2027 in commit sequence number order using a set of programmatic read interfaces 2091. In the embodiment depicted in FIG. 20, a client-side component such as 2032A may transmit a transaction request 2039 via programmatic write interfaces 2092 to the journal manager from client node 2055A. The transaction request 2039 may include some or all of the elements illustrated in FIG. 14, such as a read set descriptor, a conflict check delimiter, a write set descriptor and the like. Transaction request 2039 may have been prepared by client-side component in accordance with the current version of journal schema 2042 in the depicted embodiment.

For a particular proposed write of transaction request 2039, an attribute value-setting directive (AVD) 2010 may be indicated in the depicted embodiment, instead of the actual value to which an attribute is to be set at one or more materialization nodes 2067. The AVD 2010 may identify the attribute 2011 whose value is to be set, and may also include an identifier of a deterministic value generator 2012 whose output is to be used to obtain the value, e.g., at some point after the journal manager 2001 has approved the transaction request 2039 for commit. In some embodiments, instead of or in addition to identifying a deterministic value generator, the AVD 2010 may simply include an indication of the rules to be used to obtain the value to be assigned to attribute 2011 after the transaction request 2039 is committed.

As discussed earlier, a number of different types of transaction requests may be supported in various embodiments of the journal-based system 2000, including for example data modification transactions with and without messages, message-only transactions, journal schema modification transactions, and the like. The transaction category detector 2004 may receive transaction request 2039 in the depicted embodiment, and determine that conflict detection analysis is required. Conflict detector 2005 may select a subset of committed transaction entries 2027 of journal 2010 (e.g., using the transaction request's conflict check delimiter as discussed in the context of FIG. 15), and determine whether a conflict exists between the read set of the request and the write sets of the subset of committed transaction entries. In the scenario depicted in FIG. 20, the transaction request 2039 is accepted for commit, and a corresponding committed transaction entry 2027K has been appended to the journal 2010. In the depicted embodiment, entry 2027K may include the AVD 2010 instead of the value to which attribute 2011 is to be set; that is, at the time that the entry 2027K is added to the journal, the value to be assigned to attribute 2011 as a result of the acceptance of transaction request 2039 has still not been determined.

Each of the materialization nodes 2067, such as 2067A and 2067B, may examine the entries of journal 2010 in commit sequence number order in the depicted embodiment using read interfaces 2091. When data store manager 2030A encounters entry 2027K (resulting from journal entry read 2018A), the next value or result may be obtained from a local replica or local implementation of deterministic value generator 2035A (e.g., as a result of an invocation of a GetNextValue( ) API of value generator 2035A, or an invocation of the logical equivalent of such an API). In embodiments in which multiple value generators may be instantiated at a materialization node, the value generator ID 2012 of the AVD 2010 may be used to identify the particular deterministic value generator to be used. The result (Next-Value) obtained from generator 2035A may then be stored as the value assigned to attribute 2011 in data store 2031A in the depicted embodiment. (It is noted that at least in some embodiments, a write applier responsible for propagating the writes of committed transaction entries to materialization node 2067A may obtain the result (NextValue) from the deterministic value generator 2035A.) Similarly, when entry 2027A is encountered by the data store manager 2030B of materialization node 2067B as a result of journal entry read 2018B, result NextValue may be obtained from local replica 2035B of the deterministic value generator, and that result may be stored at data store 2031B as the value assigned to attribute 2011. As described below in further detail, the local replicas of the deterministic value generator at various materialization nodes (e.g., replicas 2035A and 2035B) may be initialized and configured according to rules indicated in journal schema 2042 in at least some embodiments, ensuring that the same sequence of results is produced by each replica over time. Because each of the materialization nodes has exclusive access to one deterministic value generator replica, the values to be assigned in accordance with AVD 2010 to attribute 2011 may be obtained without contention in the depicted embodiment, and without utilizing a concurrency control mechanism for the local replica of the value generator.

In at least some embodiments as discussed earlier, the journal manager 2001 may maintain versions of at least some of the value generators which can be referenced in transaction requests. In some such embodiments, the specification of a value generator may indicate whether the generator is to be implemented at the journal (as in the case of generators 2099 of FIG. 20) or at the materialization nodes (as in the case of generators 2035 such as 2035A and 2035B). In some embodiments in which a replication DAG of the kind shown in FIG. 16 is used for the journal 2010, the journal manager's version of a given value generator may be implemented at one of the DAG nodes (e.g., the acceptor node). In other embodiments, generators may be replicated at several of the DAG nodes. When a transaction request which refers to a journal-based value generator 2099 in its attribute value-setting directive (AVD) is received at the journal manager 2001, a result NextValue may be obtained from the appropriate generator (e.g., using the equivalent of the GetNextValue( ) call discussed above with respect to value generators 2035). If the transaction request is accepted for commit (which may depend in some cases on whether the value obtained from the generator resulted in a detection of a read-write conflict with a previously-committed transaction), the journal manager may include NextValue in the committed transaction entry 2027. The AVD may also be included in the committed transaction entry. When the materialization node examines the entry as part of its sequential analysis of the journal, the AVD and NextValue may be extracted, and NextValue may be assigned to the attribute indicated in the AVD for storage at the data store of the materialization node. In at least one embodiment as discussed below in further detail, a transaction request referencing a journal-based value generator 2099 may include one or more commit conditions dependent on the value—e.g., the logical equivalent of "this transaction cannot be committed unless the next value obtained from the value generator DVG-X meets criterion C". If a transaction request comprising such a commit condition is received, the journal manager check whether the condition is met (e.g., prior to or in addition to performing read-write conflict detection), and reject the transaction if the commit condition is not met.

Deterministic Value Generator Specifications

Figure 21:
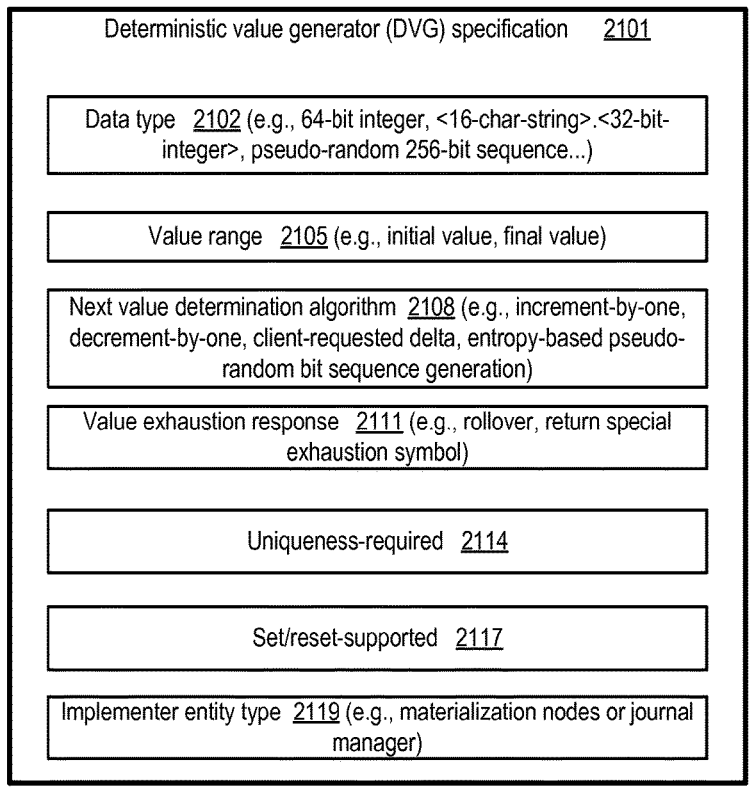
FIG. 21 illustrates example elements of a deterministic value generator specification, according to at least some embodiments.

In various embodiments, values may be assigned to a given attribute at several different materialization node using respective replicas or instances of deterministic value generators (DVGs) as discussed above. To ensure that the assigned values are consistent with one another at all the materialization nodes, each materialization node may have to implement its local version of the DVG according to the same rules. In various embodiments, the rules governing the functioning of DVGs may be indicated in a DVG specification shared among and approved by the materialization nodes at which that generator is to be employed. FIG. 21 illustrates example elements of a deterministic value generator specification, according to at least some embodiments. The DVG specification 2101 may include, for example, some combination of the following fields: data type field 2102, value range field 2105, next value determination algorithm 2108, value exhaustion response field 2111, uniqueness-required field 2114, set/reset-supported field 2117, and/or the implementer entity type 2119.

The data type field 2102 may indicate the numeric and/or non-numeric components which are to make up the values produced as output by the DVG. Examples of DVG data types include n-bit integers (e.g., 64-bit integers), character strings of specified lengths (e.g., 16-character strings), concatenations of integers and strings (e.g., a 16-character-string concatenated with a 32 bit integer value expressed as a string), a pseudo-random bit sequence of a specified length, and so on. Thus, in at least some embodiments, combinations or concatenations of numeric and non-numeric elements may be supported for deterministic values. In some embodiments in which character or string values are to be produced, the character encoding (e.g., UTF-8) may also be indicated. The value range field 2105 may indicate the permissible set of values for the values or results to be produced—for example, the values may be required to be between 0 and 100000000 for an integer, or between "aaaa" and "zzzz" for a four-character alphabetic array.

In at least some implementations, a given result or value produced by a DVG may be dependent upon the previous result or value (except, of course, for the very first result). The next value determination algorithm 2108 may indicate how the next value is to be computed. In some cases, a DVG may comprise an integer counter, for example, in which case the next value may be determined simply by incrementing the previous value by one. Decrementing counters may be employed in some embodiments, in which the previous value may be reduced by one to obtain the next value. In one embodiment, an attribute value-setting directive (AVD) included in a transaction request by a client may indicate the manner in which the next value should be derived from the previous value—e.g., a delta of "+5" may be indicated in the AVD by the client-side component to add five to the previous value, and so on. In one embodiment the DVG may comprise a pseudo-random bit sequence generator which may be initialized using a specified seed, with a particular entropy source being used to generate each of a series of new bit sequences after the generator has been seeded.

For at least some numeric DVGs or DVG components, such as integer counters, the specification 2101 may indicate a required response 2111 to an exhaustion of the value range (or when some other threshold condition has been met)—e.g., what the DVG should provide if/when all the feasible values of an incrementing integer counter have been exhausted. In some cases, a rollover to zero may be appropriate when the values have been exhausted. In at least some embodiments, instead of rolling over, a special symbol (e.g., the string "range-exhausted") may be returned as the next value when the range of normal values of the DVG has been used up. In some embodiments, a uniqueness-required field 2114 may be set to indicate that every new result produced by the DVG should differ from any previous result (which may, for example, require that rollovers not be implemented when a value range is exhausted). In one embodiment, a conditional uniqueness requirement may be indicated, for example allowing a value to be re-used after some specified time interval (e.g., a year), or after a certain number of unique values have been generated. In some embodiments, support for re-setting the DVG to its initial value, or for setting the DVG state such that a particular value is provided as the next value, may be implemented. The set/reset-supported field 2114 may be used to indicate whether resetting and/or setting the DVG state is permitted, and if so, the manner in which the state is to be reset or set (e.g., the syntax of a set or reset command to be included in an AVD). In embodiments in which deterministic value generators may be implemented at either the journal manager or at materialization nodes, the type of entity responsible for implementing a particular DVG may be indicated in implementer entity type element 2119. In some embodiments, only one of the two types of DVGs may be supported, in which case element 2119 may not be required. In one embodiment, one of the two locales or domains (materialization nodes, or the journal manager) at which DVGs can be implemented may be designated as the default for the storage system, in which case the implementer entity type 2119 may only be used for those DVGs which are to be implemented using the non-default approach. In various embodiments, some of the elements shown in FIG. 21 may be excluded from a DVG specification, while other elements not shown in FIG. 21 may be included.

Figure 22:
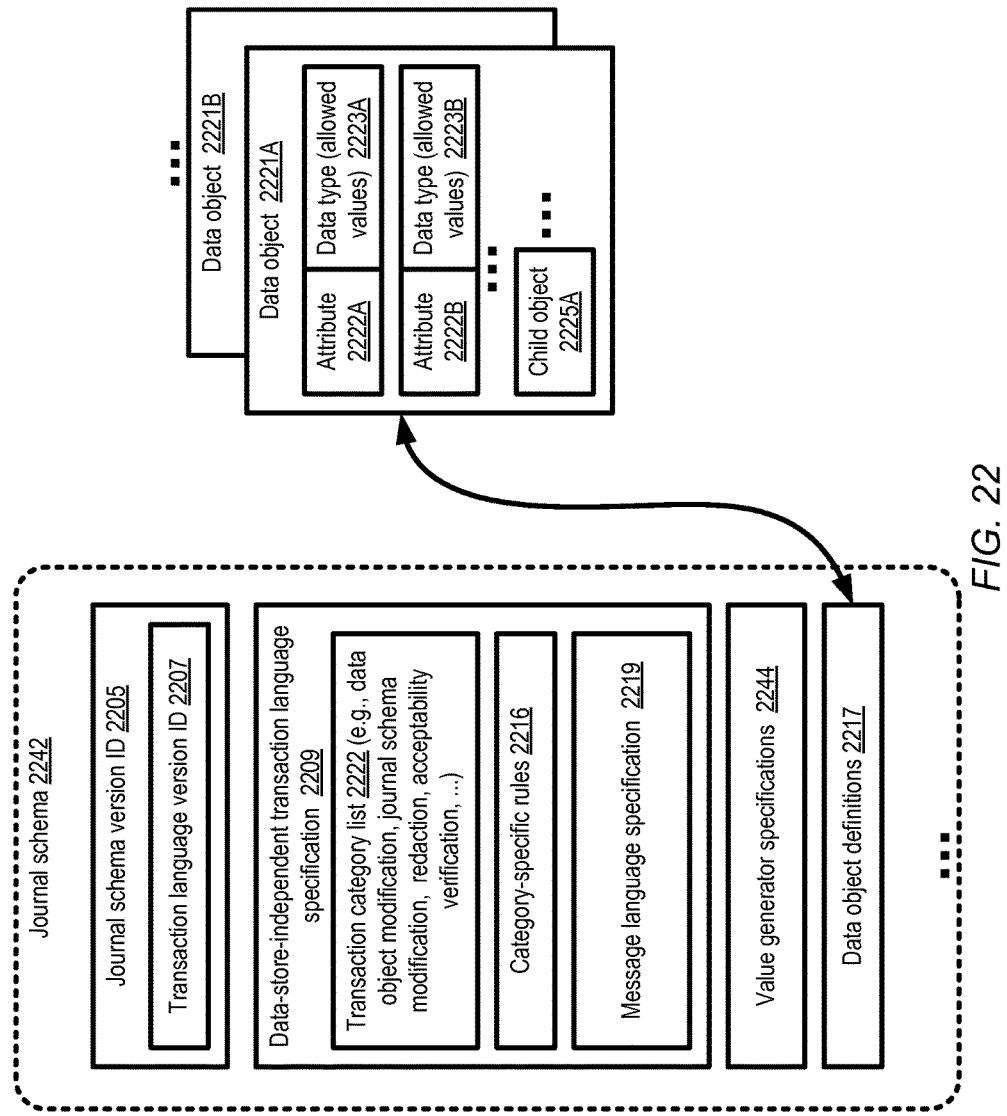
FIG. 22 illustrates examples of elements of a journal schema which includes a deterministic value generator specification, according to at least some embodiments.

The rules governing DVGs may be shared among materialization nodes and transaction-submitting nodes in various ways in different embodiments, for example by incorporating DVG specifications within journal schemas. FIG. 22 illustrates examples of elements of a journal schema which includes a deterministic value generator specification, according to at least some embodiments. In the embodiment depicted in FIG. 22, journal schema 2242 may include one or more value generator specifications 2244 in addition to various elements discussed earlier in the context of FIG. 11. For example, journal schema 2242 may comprise version information (e.g., schema version ID 2205, transaction language version ID 2207), data-store-independent transaction language specification 2209, and various data object definitions 2217 indicating the attributes 2222 and data types 2223 of various data objects 2221. The language specification 2209 may include a transaction category list 2222 (e.g., including data modification transactions, schema modification transactions, redaction transactions, acceptability verification related transactions, etc.), category-specific rules 2216 for some or all transaction categories, and a message language specification 2219. The transaction language specification 2209 may indicate the syntax of attribute value-setting directives (AVDs) in the depicted embodiment.

In various embodiments, a proactive acceptability verification algorithm similar to that illustrated in the example of FIG. 12 may be used to make journal schema changes pertaining to deterministic value generators. For example, before a new DVG is added to the journal schema, approval or acceptability verification of the new DVG from some or all data store managers or materialization nodes may be obtained. After the approvals from the relevant nodes or data store managers have been obtained, and the commit analysis for a transaction request indicating the addition of the new DVG to the journal schema is completed, a new committed transaction entry indicating a version of the journal schema which includes the new DVG may be appended to the journal. Similarly, before any change to the syntax to be used for attribute value-setting directives (AVDs) is committed, approval from some or all of the data store managers which are responsible for implementing those directives at the materialization nodes may be obtained.

Asynchronous Value Generation at Materialization Nodes

Figure 23:
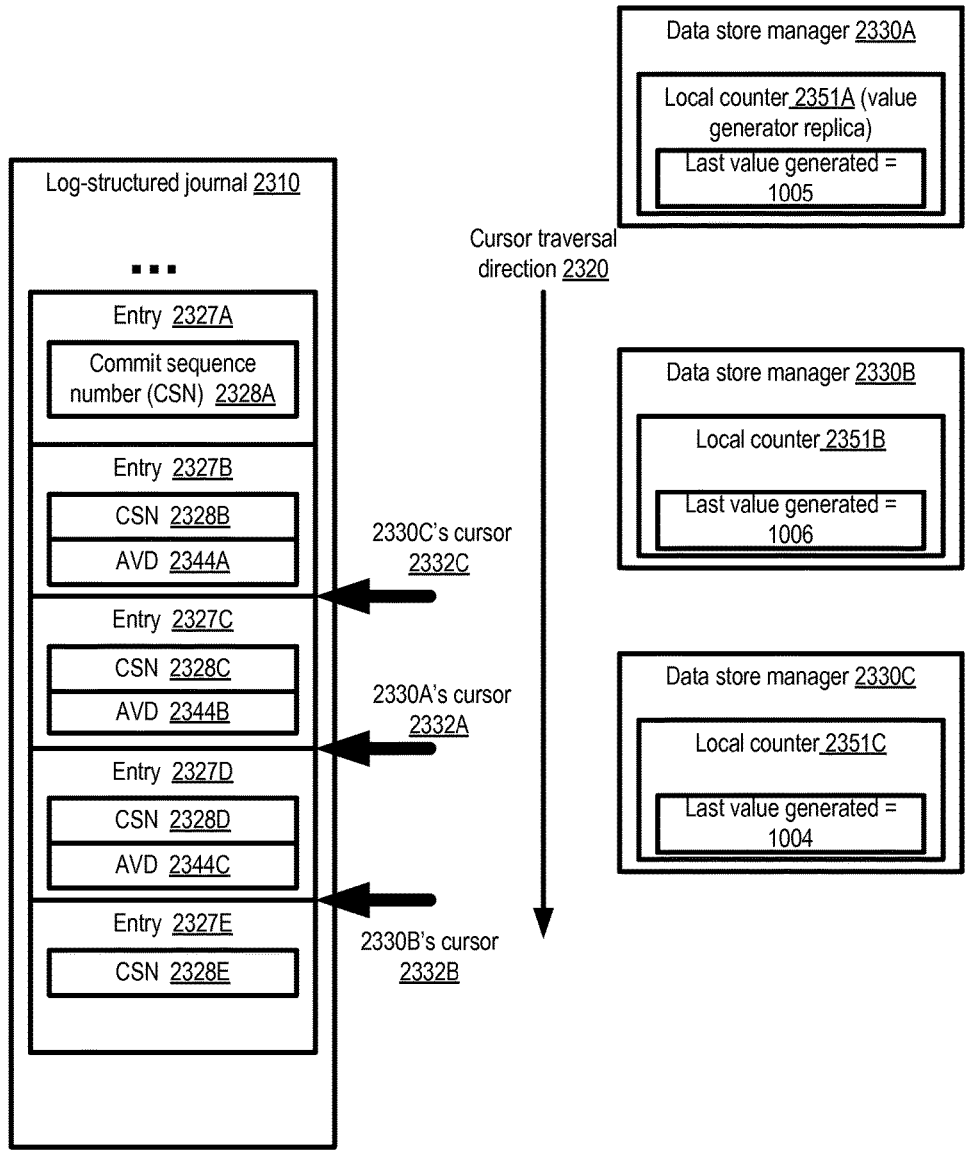
FIG. 23 illustrates an example of asynchronous use of deterministic value generator replicas at respective materialization nodes, according to at least some embodiments.

As discussed earlier, materialization operations may typically be performed asynchronously and independently of each other at various materialization nodes. FIG. 23 illustrates an example of asynchronous use of deterministic value generator replicas at respective materialization nodes, according to at least some embodiments. Three data store managers 2330A, 2330B and 2330C of respective materialization nodes are shown in FIG. 23. Each of the data store managers uses a respective cursor (e.g., cursors 2332A-2332C of data store managers 2330A-2330C) to examine the committed transaction entries 2327 of log-structured journal 2310 sequentially, e.g., in order of increasing commit sequence numbers (CSNs) 2328 as indicated by arrow 2320.

In the scenario depicted in FIG. 23, committed transaction entries 2327B, 2327C and 2327D each include a respective attribute value-setting directive AVD (e.g., AVD 2344A of entry 2327B, AVD 2344B of entry 2327C, and AVD 2344C of entry 2327D). The three AVDs all refer to the same increment-by-one integer counter-based deterministic value generator in the depicted example, and each data store manager maintains a respective local counter to implement the AVDs 2344. Thus, data store manager 2330A has increment-by-one integer counter 2351A, data store manager 2330B has increment-by-one integer counter 2351B, and data store manager 2330C has increment-by-one integer counter 2351C. As the cursors 2332 process the entries of journal 2310, new results or values are obtained from the local counter instances or replicas 2351. At the point of time illustrated in FIG. 23, data store manager 2330C has just completed processing entry 2327B with AVD 2344A, and the most recent or latest value obtained from local counter 2351C is 1004. Data store manager 2330A has just processed entry 2327C, which includes AVD 2344B; as a result, the latest value generated at local counter 2351A is 1005 (representing an increment by one to the value of counter 2351C). Similarly, data store manager 2330B has completed processing entry 2327D, and its local counter's latest generated value is 1006 (one more than counter 2351's latest value). Of course, when the cursors 2332A and 2332C reach the same position as shown for cursor 2332B in FIG. 23, the local counters of data store managers 2330A and 2330C will also have provided 1006 as their respective latest outputs. Thus, in general, at any given point in time, the local DVG instances at the different materialization nodes need not be synchronized with one another in the depicted embodiment. However, because the journal entries are examined in the same order by all the materialization nodes, and all the local DVG instances implement the same rules indicated in a common DVG specification, the values assigned to any given attribute using the DVGs at different nodes are consistent in the depicted embodiment.

Transaction Requests with Attribute Value-Setting Directives

Figure 24:
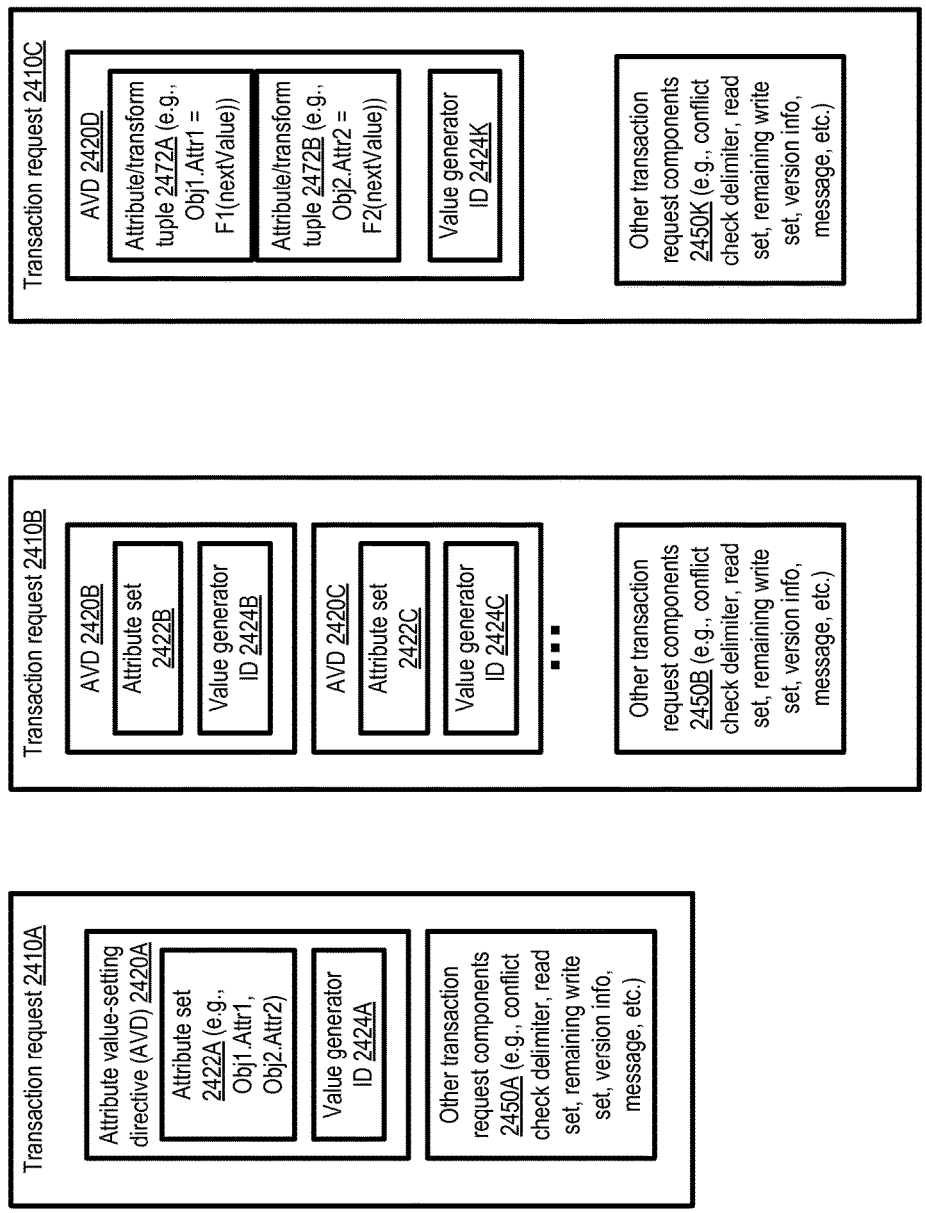
FIG. 24 illustrates examples of transaction requests including attribute value-setting directives, according to at least some embodiments.

A single transaction request may include directives directed to several different attributes in at least some embodiments. FIG. 24 illustrates examples of transaction requests including attribute value-setting directives (AVDs), according to at least some embodiments. Three variations with respect to the manner in which AVDs may be used are shown. In transaction request 2410A, a single AVD 2420A with a single value generator with ID 2424A is used to assign values of multiple attributes, such as Obj1.Attr1 and Obj2.Attr2 of attribute set 2422A. Transaction request 2410A may also include other components 2450A, such as read set descriptors, write set descriptors covering writes not associated with AVDs, conflict check delimiters and the like.

Transaction request 2410B includes multiple AVDs, each referring to a different DVG whose result is to be used to assign values to a set of one or more attributes. Thus, according to AVD 2420B, a value generator with ID 2424B is to be used to for values of attribute set 2422B, and according to AVD 2420C, a different value generator with ID 2424C is to be used to obtain values for attribute set 2422C. Non-AVD components 2450B may also be included in transaction request 2420B.

In some embodiments, a transaction submitter may indicate transformation functions to be applied to the results obtained from DVGs, such that the output of the transformation functions is assigned to one or more attributes. Transaction request 2410C includes an AVD 2420D which references a deterministic value generator with ID 2424K. However, the raw values obtained from the DVG are not assigned to any attributes if transaction request 2410C is accepted for commit. Instead, transformation function F1 is to be applied to the next value obtained from the DVG, and the output of F1 is to be assigned to attribute Obj1.Attr1, as indicated by attribute/transform tuple 2472A. Similarly, transformation function F2 is to be applied to the result produced by the DVG with ID 2424K, and the result of F2 is to be assigned to another attribute Obj2.Attr2, as indicated by attribute/transform tuple 2472B of AVD 2420D. Using the kinds of alternatives shown in FIG. 24, a rich variety of decoupled attribute value-setting algorithms may be implemented in various embodiments.

Node-Specific Implementations of Deterministic Value Generators

Figure 25:
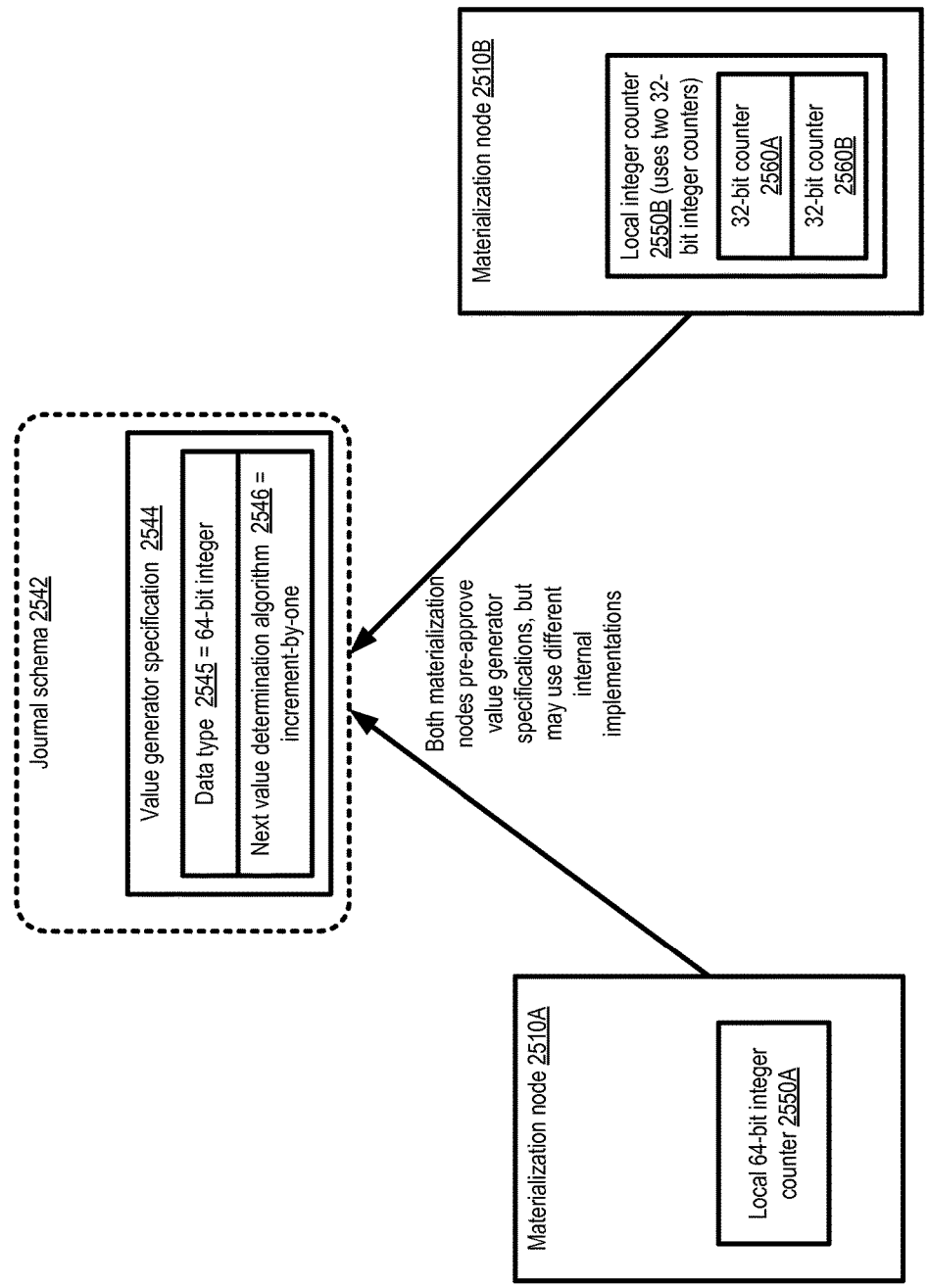
FIG. 25 illustrates examples of respective implementations of a pre-approved deterministic value generator at different materialization nodes, according to at least some embodiments.

As mentioned earlier, not all the materialization nodes of the multi-data-store storage system may have identical capabilities in at least some embodiments. While all the materialization nodes responsible for assigning values to a given data object's attributes may have to comply with the rules indicated in a given DVG specification, the manner in which the DVGs are implemented may differ from one node to another. FIG. 25 illustrates examples of respective implementations of a pre-approved deterministic value generator at different materialization nodes, according to at least some embodiments. In the depicted embodiment, journal schema 2542 includes a DVG specification 2544 which indicates the data type 2545 of the values to be produced is "64-bit integer". The last value produced is to be incremented by one to determine the next value, as indicated in next value determination algorithm field 2546.

The storage system whose operations are governed by journal schema 2542 includes two materialization nodes 2510A and 2510B with different capabilities. Materialization node 2510A supports 64-bit integers natively, while materialization node 2510B only supports 32-bit integers natively. In order to comply with the journal schema 2542, materialization node 2510A may implement a local 64-bit integer counter 2550A. In contrast, at materialization node 2510B, the implementation 2550B for a counter corresponding to DVG specification 2544 may include two separate 32-bit counters 2560A and 2560B (e.g., with counter 2560A being used for the upper or more-significant 32 bits and counter 2560B being used for the lower or less-significant 32 bits). Both materialization nodes may have pre-approved the DVG specification 2544 in accordance with the acceptability verification algorithm discussed earlier, e.g., after ensuring that they can implement the rules indicated in the specification, even though the internal implementation of the DVG differs from one node to the other.

Figure 26:
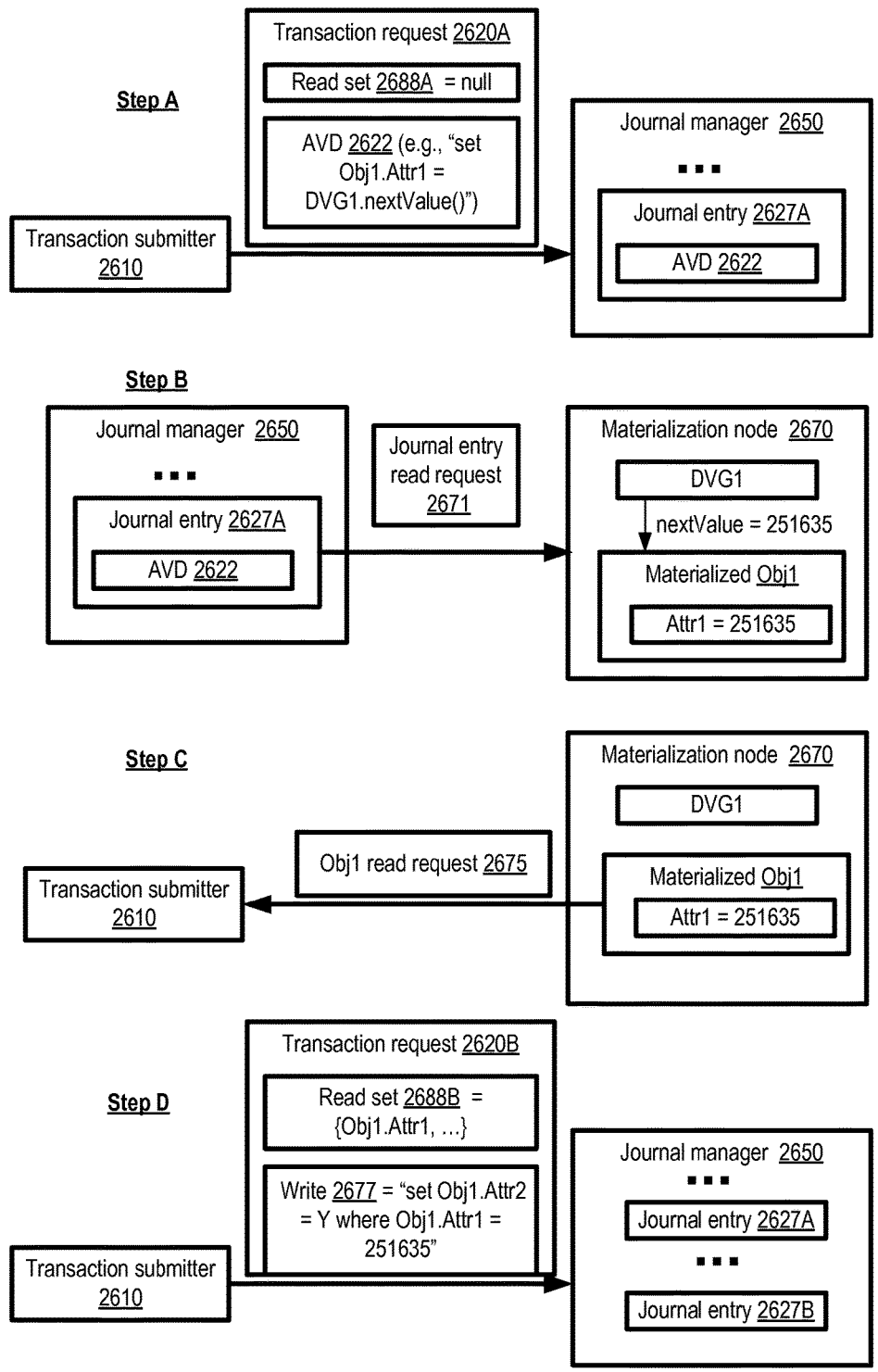
FIG. 26 illustrates an example of a pair of linked transaction requests, in which the first transaction request of the pair is used to obtain an attribute value to be used in the second transaction request, according to at least some embodiments.

Linked Transaction Requests Depending on the application being implemented using the multi-data-store database, a transaction-submitting entity may sometimes need to use the value assigned using an AVD of one transaction request to prepare a different transaction request. The value assigned using a deterministic value generator instance at one of the materialization nodes may be read by the transaction submitter to prepare the second transaction. FIG. 26 illustrates an example of a pair of linked transaction requests, in which the first transaction request of the pair is used to obtain an attribute value to be used in the second transaction request, according to at least some embodiments. In step A of the set of operations, transaction submitter 2610 prepares transaction request 2620A locally and submits the request to a journal manager 2650. The request 2620A includes an attribute value-setting directive 2622, requesting that an attribute Obj1.Attr1 be set to the next value obtained from a deterministic value DVG1. Transaction request 2620A is accepted for commit by the journal manager 2650, and a corresponding committed transaction entry 2662A containing the AVD 2622 is appended to the journal. In some applications, the first of the two linked transaction requests (2620A) may have a null or empty read set 2688A—e.g., the primary or sole purpose of the transaction request may be to obtain a value for Obj1.Attr1 from DVG1, regardless of the state of any other object or attribute. According to the optimistic concurrency control algorithm discussed herein, conflict detection involves checking whether a read set of a proposed transaction could have been modified or overwritten by a subsequent commit (as discussed in the context of FIG. 15, for example). This means that a transaction request with a null read set cannot have a read-write conflict. Therefore, unless other factors such as logical constraint violations influence the commit decision, a transaction request such as 2620A may be highly likely to be accepted for commit.

After the entry 2627A is appended to the journal, read request 2671 may be submitted by the materialization node 2670 as part of its sequential examination of the journal, as indicated in Step B of FIG. 26. In response to detecting AVD 2622 in entry 2627A, the value of Obj1.Attr1 may be obtained and stored at materialization node 2670 using a local instance of DVG1. In the depicted example, DVG1 is an integer counter, and the integer value 251635 is assigned to Obj1.Attr1. Next, in Step C of FIG. 26, the transaction submitter 2610 issues a read request 2675 to the materialization node to obtain the value of Obj1.Attr1 (and/or other attributes of Obj1 or other data objects) as part of the preparation of a new transaction request which requires the value of Obj1.Attr1.

A second transaction request 2620B (logically linked to request 2620A) may then be generated, with a read set 2688B which includes Obj1.Attr1, and submitted to the journal manager. In the depicted example, a write 2677 in the new transaction may be directed to a different attribute (Obj1.Attr2) of an object identified by the value generated using transaction 2620A, although such writes are not a requirement. In various embodiments, the linked transaction design pattern illustrated in FIG. 26 may be used often in applications which require the assignment of new identifiers to newly-created objects at high rates.

Figure 27:
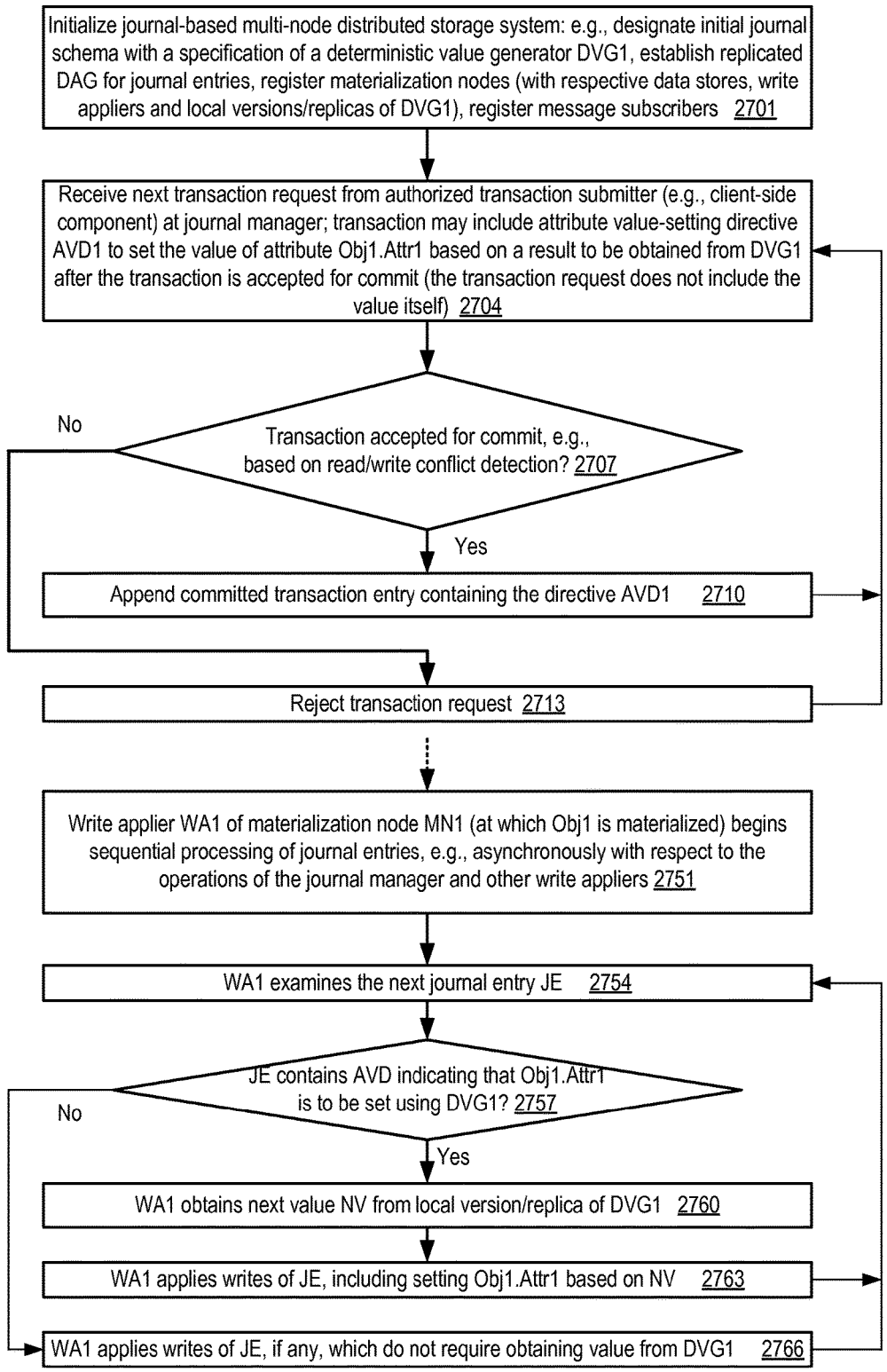
FIG. 27 is a flow diagram illustrating aspects of operations that may be performed at a multi-data-store storage system at which replicated deterministic value generators implemented at materialization nodes may be used to reduce contention for some types of write operations, according to at least some embodiments.

Methods for Reducing Contention at Journal-Based Databases Using Deferred Assignments FIG. 27 is a flow diagram illustrating aspects of operations that may be performed at a multi-data-store storage system at which replicated deterministic value generators implemented at materialization nodes may be used to reduce contention for some types of write operations, according to at least some embodiments. As shown in element 2701, a multi-node journal-based distributed storage system or database may be initialized. A log-structured journal (e.g., implemented using a replication DAG) with an associated journal manager responsible for making commit decisions with respect to transaction requests may be established as part of the initialization. An initial version of a journal schema which governs various aspects of the operations of the database may also be identified. The journal schema may include an indication of a data-store-independent transaction language to be used for submitting transaction requests, the attributes and properties of various data objects to be materialized at materialization nodes, and a specification of at least one deterministic value generator (DVG1) to be used to assign values to a particular data object attribute. The data-store-independent transaction language may indicate the syntax to be used for specifying attribute value-setting directives which refer to deterministic value generators such as DVG1. One or more materialization nodes may also be registered as consumers or readers of journal entries, e.g., with respective data stores and data store managers including write appliers responsible for propagating writes from committed transaction entries of the journal to the materialization nodes. In some embodiments, one or more message subscribers may also be registered. The journal manager may start processing received transaction requests after the initialization is complete. In at least one embodiment, new DVGs may be added to the journal schema later, e.g., using a proactive acceptability verification protocol (analogous to that illustrated in FIG. 11 for message language changes) to ensure that all the nodes which would be affected by the addition of the new DVG can process directives related to the new DVG.

A particular transaction request comprising an attribute value-setting directive AVD1 may be received by the journal manager from an authorized transaction submitter, e.g., a client-side component of the storage system (element 2704). AVD1 may indicate that a particular attribute Obj1.Attr1 of a data object Obj1 is to be assigned a value to be obtained using DVG1 after the proposed transaction is committed (if the transaction is committed at all). The proposed transaction may not include or specify the value to be assigned to Obj1.Attr1; instead, it may simply request that DVG1 be used to assign the value at one or more materialization nodes. By deferring the determination of the value to be assigned until materialization time, instead of obtaining the value during transaction preparation, transaction submitters may avoid having to contend with other transaction submitters for obtaining similar kinds of deterministically-generated values in the depicted embodiment.

The journal manager may execute an optimistic concurrency control algorithm to determine whether the proposed transaction is acceptable for commit. For example, the read set of the proposed transaction and write sets of a subset of previously-committed transaction entries in the journal may be analyzed to determine whether a read-write conflict exists between the proposed transaction and the previously-committed transactions. The subset of previously-committed transaction entries may be selected based on a conflict check delimiter of the proposed transaction, as discussed earlier in the context of FIG. 15. Some of the previously-committed transactions may include attribute value-setting directives (AVDs) of their own (e.g., indicated as part of their write set descriptors) in the depicted embodiment. If the journal manager accepts the proposed transaction for commit based on its commit analysis (including read-write conflict detection), as determined in element 2707, a new committed transaction entry including AVD1 (and still not specifying the value to be assigned to Obj1.Attr1, which is yet to be determined) may be added to the journal (element 2710). Otherwise, the proposed transaction may be rejected (element 2713). It is noted that if the proposed transaction is rejected, the value that was to be assigned to Obj1.Attr1 is not computed in the depicted embodiment. Thus, for example, if DVG1 was based on an integer counter, a new value may not have to be obtained from the counter for Obj1.Attr1 unless the proposed transaction is committed, thereby avoiding "wasting" values from the counter. After completing the processing of one transaction request, the journal manager may process the next transaction request (repeating operations corresponding to elements 2704-2713).

Asynchronously with respect to the operations of the journal manager, a particular write applier WA1 (e.g., a component of a data store manager of a materialization node MN1 at which Obj1 is to be materialized) may analyze the committed transaction entries of the journal in sequential order (e.g., in order of commit sequence numbers indicated in the entries) (element 2751). As part of the sequential analysis, WA1 may examine a particular journal entry JE (element 2754). If JE includes an AVD (such as AVD1) to set a value for an attribute materialized at MN1 using DVG1 (as determined in element 2757), the next value NV may be obtained from DVG1. The manner in which the next value is to be obtained (e.g., by incrementing a previous value, decrementing a previous value, obtaining a pseudo-random bit sequence, etc.) may be indicated in the DVG1 specification which is part of the journal schema of the storage system; in at least some embodiments, a materialized version of the journal schema including the DVG1 specification may be stored at MN1. The value of Obj1.Attr1 may be assigned based on NV (e.g., either using NV without modification, or using a transformation function on NV as indicated in AVD1 or in the DVG1 specification). The write to Obj1.Attr1 and any other writes indicated in JE which are applicable to MN1 may be materialized (element 2763). If JE did not include any AVDs pertaining to DVG1 and Obj1 attributes (as also determined in element 2757), WA1 may apply any other writes relevant to MN1 (element 2766), which may not require the use of DVG1. Operations corresponding to element 2754 onwards may be repeated for the next journal entry as part of WA1's sequential analysis of the journal. Similar operations to those shown with respect to WA1 may be performed by other write appliers or data store managers configured to support attribute value-setting directives.

Figure 28:
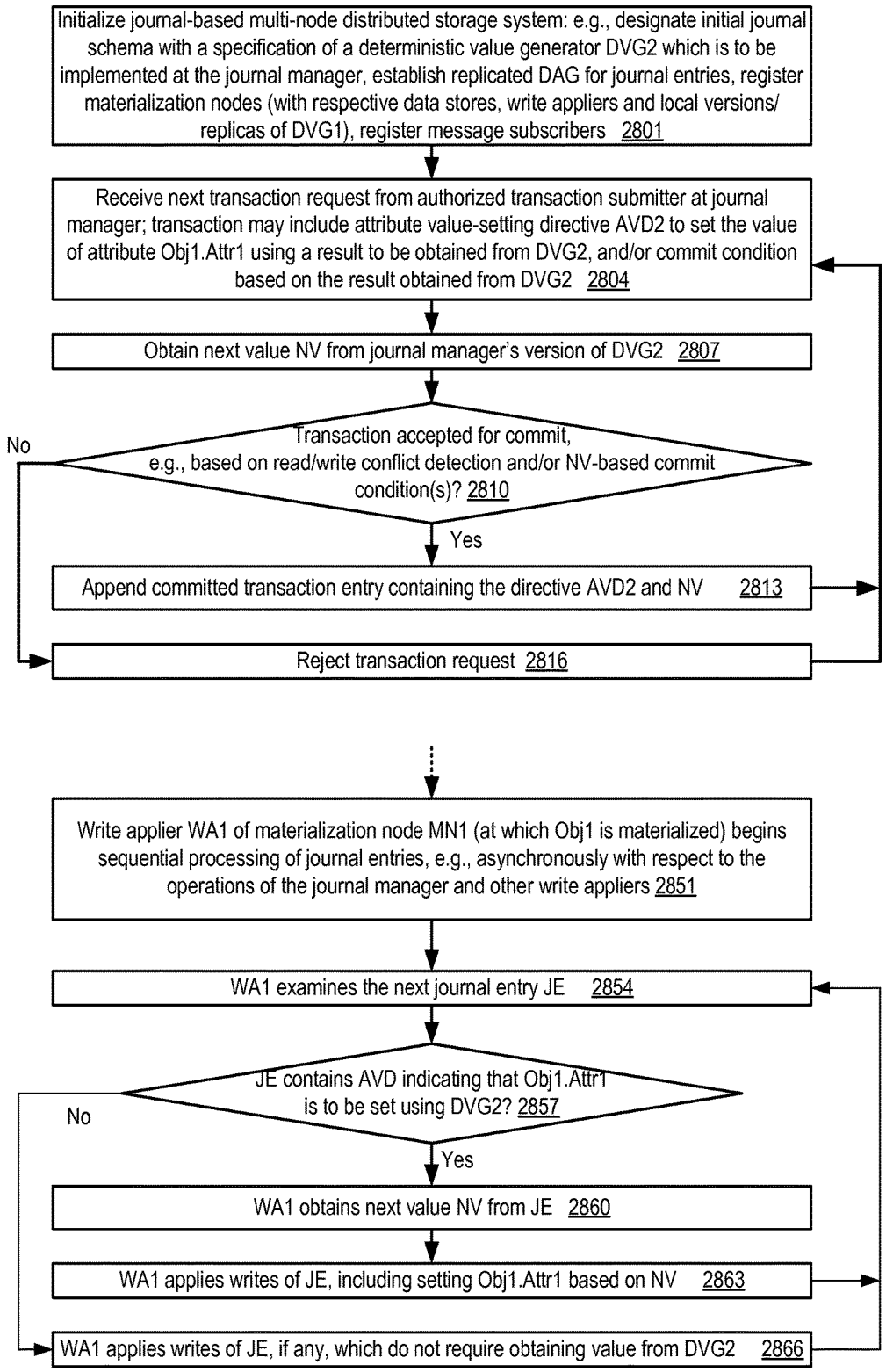
FIG. 28 is a flow diagram illustrating aspects of operations that may be performed at a multi-data-store storage system at which deterministic value generators implemented at a journal manager may be used to reduce contention for some types of write operations, according to at least some embodiments.

As discussed earlier, in some embodiments one or more deterministic value generators may be implemented at a journal manager rather than at materialization node(s). FIG. 28 is a flow diagram illustrating aspects of operations that may be performed at a multi-data-store storage system at which deterministic value generators implemented at a journal manager may be used to reduce contention for some types of write operations, according to at least some embodiments. As shown in element 2801, a multi-node journal-based distributed storage system or database may be initialized. The initialization may include similar operations to those indicated in element 2701 of FIG. 27. A log-structured journal (e.g., implemented using a replication DAG) with an associated journal manager responsible for making commit decisions with respect to transaction requests may be established as part of the initialization. The journal manager may be capable of implementing at least some deterministic value generators locally (e.g., at one or more nodes of the replication DAG, such as an acceptor node). An initial version of a journal schema which governs various aspects of the operations of the database may be identified. The journal schema may include an indication of a data-store-independent transaction language to be used for submitting transaction requests, the attributes and properties of various data objects to be materialized at materialization nodes, and a specification of at least one deterministic value generator (DVG2) to be implemented at or by the journal manager. The data-store-independent transaction language may indicate the syntax to be used for specifying attribute value-setting directives which refer to deterministic value generators such as DVG1. One or more materialization nodes may also be registered as consumers or readers of journal entries, e.g., with respective data stores and data store managers including write appliers responsible for propagating writes from committed transaction entries of the journal to the materialization nodes. In some embodiments, one or more message subscribers may also be registered. The journal manager may start processing received transaction requests after the initialization is complete.

A particular transaction request comprising an attribute value-setting directive AVD2 referring to the journal-based value generator DVG2 may be received by the journal manager from an authorized transaction submitter, e.g., a client-side component of the storage system (element 2804). AVD2 may indicate that a particular attribute Obj1.Attr1 of a data object Obj1 is to be assigned a value to be obtained using DVG2. The proposed transaction may not include or specify the value to be assigned to Obj1.Attr1; instead, it may simply request that DVG2 be used to assign the value. In some embodiments, not all the attributes of the data objects of the database may have to be considered when performing conflict detection—e.g., attributes which are not part of a primary key of a table may be ignored with respect to read-write conflicts (and may not even be represented in the read set descriptors and write set descriptors). In at least one embodiment, the kind of DVG to be used (e.g., journal-based, or materialization node-based) for assigning a value to an attribute may depend on the role of the attribute—e.g., only journal-based DVGs (such as DVG2) may be used for primary key attributes or for attributes for which read-write conflict detection is to be performed, while DVGs implemented at materialization nodes may be usable for other (e.g., non-primary-key attributes or attributes not considered for read-write conflict detection).

In some embodiments, a transaction request with an AVD referencing a journal-based DVG may optionally indicate a commit condition dependent on the value obtained from the DVG. For example, the transaction request may indicate the logical equivalent of the condition "this transaction should be committed only if the next value obtained from DVG2 is no smaller than N" or "this transaction should be committed only if the next value obtained from DVG2 does not result in an out-of-range error or an integer overflow error". In some embodiments, the journal manager may check whether the commit condition is met, and also perform read-write conflict detection, before approving the transaction. In some implementations, the commit condition may be evaluated first, and the read-write conflict detection may be performed only if the criteria indicated in the commit condition are met; in other implementations, the read-write conflict detection may be performed first. A given transaction request may sometimes be rejected, for example, based on determining that the commit condition has not been met, even if a read-write conflict or logical constraint violation has not been detected (or would not have been detected if read-write conflict detection or logical constraint checking were performed).

After receiving the transaction request referencing DVG2, the journal manager may obtain the next value NV from its version of DVG2 (element 2807) in the depicted embodiment. By deferring the determination of the value until the journal process the transaction request, instead of obtaining the value during transaction request preparation, transaction submitters may avoid having to contend with other transaction submitters for obtaining similar kinds of deterministically-generated values in the depicted embodiment. The journal manager may determine whether the transaction is acceptable for commit, e.g., using NV to verify that the commit conditions (if any were indicated in the transaction request) are met, and/or implementing its usual optimistic concurrency control algorithm for read-write conflict detection. For example, the read set of the proposed transaction and write sets of a subset of previously-committed transaction entries in the journal (which may include their own values of results obtained from DVGs) may be analyzed to determine whether a read-write conflict exists between the proposed transaction and the previously-committed transactions. The subset of previously-committed transaction entries may be selected based on a conflict check delimiter of the proposed transaction, as discussed earlier in the context of FIG. 15. If the journal manager accepts the proposed transaction for commit based on its analysis (e.g., including read-write conflict detection, and/or commit condition checking), as determined in element 2810, a new committed transaction entry including NV and AVD2 may be added to the journal (element 2813). In some implementations, the NV may be included as supplemental information of the committed transaction entry (similar to the commit sequence number, which is also generated by the journal manager and may be considered supplemental information), without modifying the write payload, the write set descriptor, or other elements of the transaction request which are incorporated into the entry. For example, in such an implementation, the write payload indicated in the committed transaction entry (e.g., either as part of AVD2 or separately from AVD2) may still comprise the logical equivalent of "Set Obj1.Attr1 to <the next value obtained from DVG2>", even though the journal manager has determined what the next value is, and has even included the next value in the committed transaction entry.

If the commit condition(s) are not met or if conflicts are detected, the proposed transaction may be rejected (element 2816). If the transaction request is rejected, any of several alternative approaches may be used with respect to the value NV that was obtained from DVG2 in various embodiments. In one embodiment, NV may simply be discarded. In another embodiment, the journal manager may retain NV for use for a different AVD-containing transaction request. In some embodiments, the state of DVG2 may be modified to, in effect, undo the generation of NV—that is, the state may be modified such that the next time a value is obtained from DVG2, NV would be generated again. After completing the processing of one transaction request, the journal manager may process the next transaction request (repeating operations corresponding to elements 2804-2813).

Asynchronously with respect to the operations of the journal manager, a particular write applier WA1 (e.g., a component of a data store manager of a materialization node MN1 at which Obj1 is to be materialized) may analyze the committed transaction entries of the journal in sequential order (e.g., in order of commit sequence numbers indicated in the entries) (element 2851). As part of the sequential analysis, WA1 may examine a particular journal entry JE (element 2854). If JE includes an AVD (such as AVD2) to set a value for an attribute materialized at MN1 using a journal-based value generator DVG2 (as determined in element 2857), the next value NV may be obtained from the JE (element 2860). The value of Obj1.Attr1 may be assigned based on NV. The write to Obj1.Attr1 and any other writes indicated in JE which are applicable to MN1 may be materialized (element 2863). If JE did not include any AVDs pertaining to DVG2 and Obj1 attributes (as also determined in element 2857), WA1 may apply any other writes relevant to MN1 (element 2866. Operations corresponding to element 2854 onwards may be repeated for the next journal entry as part of WA1's sequential analysis of the journal. Similar operations to those shown with respect to WA1 may be performed by other write appliers or data store managers configured to support attribute value-setting directives. In some embodiments, a given transaction request may include references to both types of DVGs—those implemented at materialization nodes (as discussed in the context of FIG. 27) and those implemented at the journal manager (as discussed in the context of FIG. 28), in which case a write applier may obtain values from the local versions of the materialization node-based DVGs and use journal-manager-supplied values for the AVDs referencing the remaining DVGs. In one embodiment, only one of the two types of DVGs may be supported—either DVGs implemented at the journal manager, or DVGs implemented at materialization nodes.

It is noted that in various embodiments, some of the operations shown in the flow diagrams of FIG. 17, FIG. 18*a*, FIG. 18*b*, FIG. 27 and FIG. 28 may be implemented in a different order than that shown in the figure, or may be performed in parallel rather than sequentially. Additionally, some of the operations shown in one or more of the flow diagrams may not be required in one or more implementations.

Use Cases

The techniques and algorithms described above, of supporting transactional messages and deferred assignment of attributes for certain types of writes at a multi-data-store journal-based storage system or database whose state changes are indicated in respective journal entries may be useful in a variety of environments. Adding the capability to register message subscriber nodes, which do not have to store data content but may respond to messages containing work requests that are to be fulfilled only if an associated state change is accepted for commit, enables the implementation of many types of workflows. For example, the procedure for fulfilling a client request for a new virtual machine at a virtualized computing service may require various tasks to be performed by different lower-level services, and some of the tasks implemented at the lower-level services may be triggered using transactional messages which do not require data to be materialized. The algorithms for deferring assignment of attribute values to materialization time or commit analysis time, instead of determining the values during transaction preparation, may be helpful in reducing contention for counters and other value generators which may be used for unique identifiers or other purposes. Deferring attribute value determination may also reduce wastage of the values in some cases (e.g., when the values are determined at materialization time), since new values may only be used for committed transactions (i.e., values need not be used up for aborted or rejected transactions).

Illustrative Computer System

Figure 29:
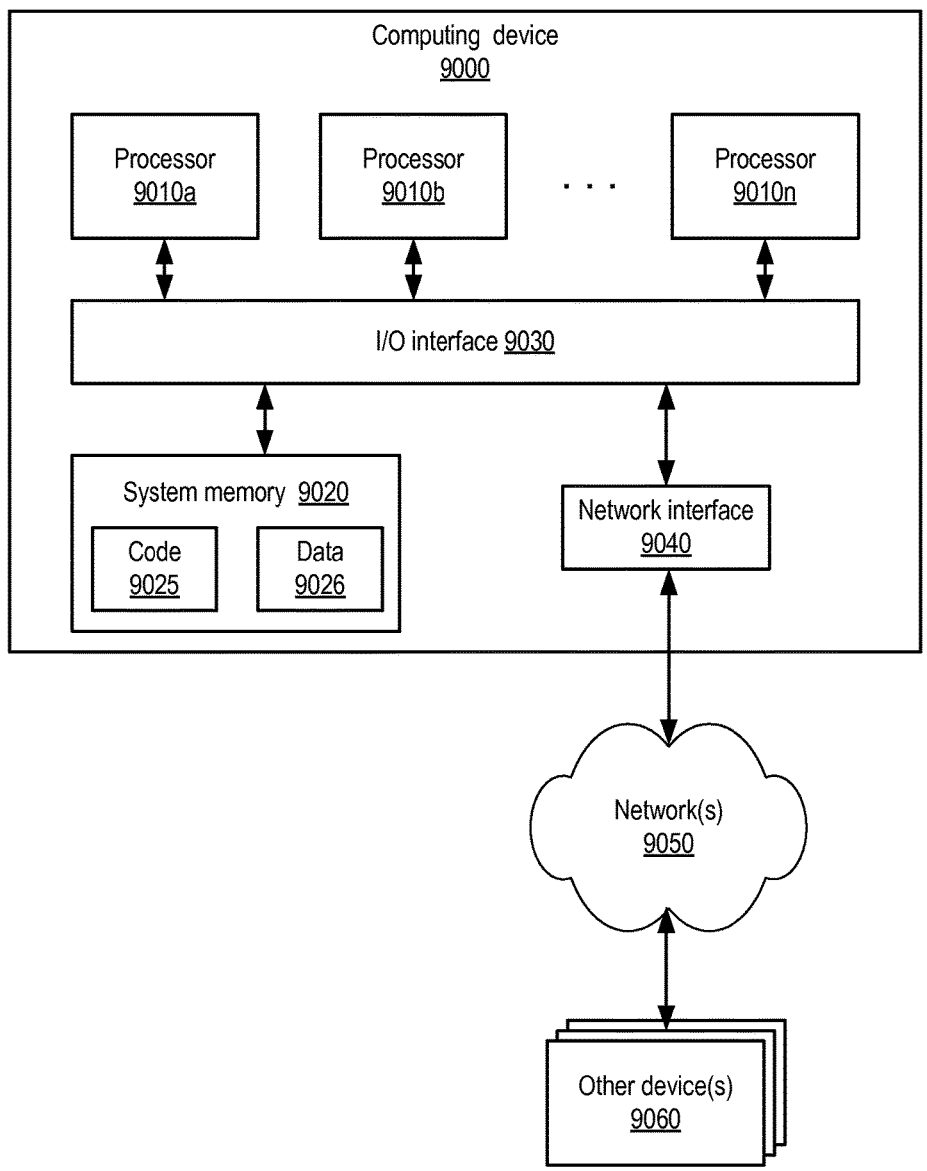
FIG. 29 is a block diagram illustrating an example computing device that may be used in at least some embodiments.

In at least some embodiments, a server that implements one or more of the techniques described above for transaction management, transactional message processing and deferred attribute value determination at a journal-based multi-data-store storage system (including for example the operations of journal managers, data store managers, client-side components, write appliers, message subscribers and the like) may include a general-purpose computer system that includes or is configured to access one or more computer-accessible media. FIG. 29 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 28, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 28 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 29 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
a journal manager implemented at one or more computing devices of a multi-data-store database, wherein the multi-data-store database comprises a first data store manager of a first data store; and
one or more message subscribers including a first message subscriber implemented at one or more computing devices;
wherein the journal manager is configured to:
accept a first transaction request for commit, based at least in part on analysis of (a) a read set descriptor of the first transaction request and (b) respective write set descriptors of a selected subset of committed transaction entries in a journal of the multi-data-store database, wherein the first transaction request includes (a) a write directed to a data object materialized at the first data store and (b) an indication of a first message to be stored in the journal in the event that the first transaction request is accepted for commit;
append a new committed transaction entry corresponding to the first transaction request to the journal, wherein the new committed transaction entry indicates (a) the write directed to the data object and (b) the first message;
wherein the first data store manager is configured to:

in response to examining the new committed transaction entry as part of the first data store manager's sequential analysis of the journal, apply the write to the data object; and wherein the first message subscriber is configured to:
in response to examining the new committed transaction entry as part of the first message subscriber's sequential analysis of the journal, initiate, without applying the write indicated in the new committed transaction entry, an operation requested in the first message, wherein the first message subscriber's sequential analysis is performed asynchronously with respect to the first data store manager's sequential analysis.

2. The system as recited in claim 1, wherein the journal manager is configured to:
append, in response to a second transaction request, a second committed transaction entry to the journal, wherein the second committed transaction entry includes a second message indicated in the second transaction request, and wherein the second committed transaction entry does not indicate a write to be applied at a data store of the multi-data-store storage system.

3. The system as recited in claim 1, further comprising a second message subscriber implemented at one or more computing devices of the multi-data-store database, wherein the second journal message subscriber is configured to:
in response to examining the new committed transaction entry, initiate one or more other operations indicated by the first message.

4. The system as recited in claim 1, wherein the journal manager is configured to:
append, to the journal, a committed transaction entry representing a version of a journal schema of the multi-node storage system, wherein the version of the journal schema includes an indication of (a) a set of attributes of the data object, and (b) a message representation language, wherein the first message is formatted in the message representation language.

5. The system as recited in claim 1, wherein the journal message subscriber is configured to:
prepare a second transaction request, wherein the second transaction request includes a second write directed to a different data object materialized at a different data store of the multi-data-store storage system, wherein the second write indicates that the operation indicated in the first committed transaction entry has been completed by the first journal message subscriber; and
submit the second transaction request to the journal manager.

6. A method, comprising:
accepting, by a journal manager implemented at one or more computing devices of a multi-data-store storage system, a first transaction request for commit, wherein said accepting is based at least in part on a conflict detection operation of an optimistic concurrency control protocol, wherein the first transaction request includes (a) a write directed to a first data store of the multi-data-store storage system and (b) a first message to be stored in a journal of committed transaction entries in the event that the first transaction request is accepted for commit;
appending, by the journal manager, a new committed transaction entry corresponding to the first transaction request to the journal, wherein the new committed transaction entry comprises respective indications of (a) the first message and (b) the write directed to the first data store;
in response to examining, by a data store manager implemented at one or more computing devices associated with the first data store, the new committed transaction entry during sequential analysis of the journal, applying, by the first data store manager, the write to a data object of the first data store; and
in response to examining, by a first journal message subscriber implemented at one or more computing devices of the multi-data-store storage system, the new committed transaction entry during sequential analysis of the journal, initiating, by the first journal message subscriber without materializing the write indicated in the new committed transaction entry, one or more operations indicated by the first message.

7. The method as recited in claim 6, further comprising:
appending, by the journal manager in response to a second transaction request, a second committed transaction entry to the journal, wherein the second committed transaction entry includes a second message indicated in the second transaction request, and wherein the second committed transaction entry does not indicate a write to be applied at a data store of the multi-data-store storage system.

8. The method as recited in claim 6, further comprising:
preparing, at a transaction-submitter component of the multi-data-store storage system, the first transaction request in accordance with a first version of a journal schema of the multi-data-store storage system, wherein the first version of the journal schema includes an indication of (a) a set of attributes of the data object and (b) a message representation language to be used to indicate the first message.

9. The method as recited in claim 8, further comprising:
verifying, by the transaction-submitter component prior to transmitting a second transaction request to the journal, wherein the second transaction request indicates a proposed change to the message representation language, that at least the first journal message subscriber has approved the proposed change to the message representation language.

10. The method as recited in claim 6, further comprising:
registering, by the journal manager, the first journal message subscriber as a consumer of the journal's committed transaction entries, wherein said registering is responsive to receiving a message subscription request.

11. The method as recited in claim 6, wherein said the one or more operations comprise:
preparing a second transaction request; and
submitting the second transaction request to the journal manager.

12. The method as recited in claim 6, wherein the message includes an indication of one or more intended recipients, including the first journal message subscriber.

13. The method as recited in claim 12, wherein the message includes an indication that contents of the message are not to be provided to an entity which is not among the one or more intended recipients.

14. The method as recited in claim 6, further comprising:
in response to examining, by a second journal message subscriber implemented at one or more computing devices of the multi-data-store storage system, the new committed transaction entry, initiating, by the second journal message subscriber without materializing the write indicated in the new committed transaction entry, one or more other operations indicated by the first message.

15. The method as recited in claim 6, wherein the new committed transaction entry indicates a validity period of the first message, further comprising:
   detecting, based on an examination of the new committed transaction entry by a second journal message subscriber implemented at one or more computing devices of the multi-data-store storage system, that the validity period has expired; and
   determining, by the second journal message subscriber in response to said detecting, that the one or more operations indicated by the first message are not to be initiated by the second journal message subscriber.

16. The method as recited in claim 6, wherein the multi-data-store storage system stores configuration information of a virtualized computing service of a provider network, wherein the first committed transaction entry indicates that pre-launch configuration operations for a particular virtual machine have been completed, and wherein said initiating the one or more operations includes initiating a launch of the particular virtual machine.

17. A non-transitory computer-accessible storage medium storing program instructions that when executed on one or more processors:
   accept a first transaction request for commit, based at least in part on a conflict detection operation of an optimistic concurrency control protocol, wherein the first transaction request includes (a) a write directed to a data object materialized at a first materialization node of a journal-based multi-node storage system and (b) an indication of a first message to be stored in a journal of committed transaction entries of the multi-node storage system in the event that the first transaction request is accepted for commit;
   append a new committed transaction entry corresponding to the first transaction request to the journal, wherein the new committed transaction entry indicates (a) the first message and (b) the write directed to the data object;
   in response to a particular read request from a first message subscriber node of the multi-node storage system, provide at least a portion of the new committed transaction entry to the first message subscriber node.

18. The non-transitory computer-accessible storage medium as recited in claim 17, wherein the instructions when executed on the one or more processors:
   append, in response to a second transaction request, a second committed transaction entry to the journal, wherein the second committed transaction entry includes a second message indicated in the second transaction request, and wherein the second committed transaction entry does not indicate a write to be applied to a data object at a materialization node of the multi-node storage system.

19. The non-transitory computer-accessible storage medium as recited in claim 17, wherein the instructions when executed on the one or more processors:
   append, to the journal, a committed transaction entry representing a first version of a journal schema of the multi-node storage system, wherein the first version of the journal schema includes an indication of (a) a set of attributes of the data object and (b) a message representation language to be used to indicate the first message.

20. The non-transitory computer-accessible storage medium as recited in claim 17, wherein the first message indicates one or more operations to be performed by a recipient of the message, wherein the one or more operations include:
   preparing a second transaction request; and
   submitting the second transaction request to the journal manager.

* * * * *